(12) United States Patent
Grimaldi et al.

(10) Patent No.: US 12,099,968 B2
(45) Date of Patent: Sep. 24, 2024

(54) UTILIZING NEAR-FIELD COMMUNICATIONS TO SELECT THIRD PARTY PRODUCTS/SERVICES FOR ORDERING FROM THIRD PARTY INVENTORY MANAGEMENT COMPUTER SYSTEMS AND METHODS OF USE THEREOF

(71) Applicant: TCI Acquisition Company, Inc., South Lake, TX (US)

(72) Inventors: Mike Grimaldi, Boca Raton, FL (US); Samantha Grimaldi, Boca Raton, FL (US); Guillaume Riviere, Delray Beach, FL (US); Eric Weiss, Fond Du Lac, WI (US)

(73) Assignee: TCI Acquisition Company, Inc., South Lake, TX (US)

( * ) Notice: Subject to any disclaimer, the term of this patent is extended or adjusted under 35 U.S.C. 154(b) by 0 days.

(21) Appl. No.: 17/570,231

(22) Filed: Jan. 6, 2022

(65) Prior Publication Data
US 2022/0215334 A1 Jul. 7, 2022

Related U.S. Application Data

(63) Continuation of application No. 17/149,435, filed on Jan. 14, 2021, now abandoned, which is a (Continued)

(51) Int. Cl.
*G06Q 10/087* (2023.01)
*G06Q 30/02* (2023.01)
(Continued)

(52) U.S. Cl.
CPC .......... *G06Q 10/087* (2013.01); *G06Q 30/02* (2013.01); *G06Q 30/0247* (2013.01);
(Continued)

(58) Field of Classification Search
None
See application file for complete search history.

(56) References Cited

U.S. PATENT DOCUMENTS

| | | | |
|---|---|---|---|
| 2011/0070833 A1* | 3/2011 | Perkins | H04W 84/22 455/41.1 |
| 2012/0028577 A1* | 2/2012 | Rodriguez | H04N 21/44008 340/407.1 |

(Continued)

*Primary Examiner* — Matthew T Sittner
(74) *Attorney, Agent, or Firm* — GREENBERG TRAURIG, LLP

(57) ABSTRACT

In some embodiments, an exemplary computer system may include a non-transient memory, electronically storing program code; and a computer processor, when executing the program code, may be configured to manage a virtual business, offering a plurality of real-life third-party products of a third party, real-life third-party services of the third party, or both, in a virtual reality realm, where the updatable graphical user interface includes each respective visual representation of each respective real-life third-party product, each respective real-life third-party service, or both; and receive near-field communications from a plurality of computing devices associated with a plurality of users to select a plurality of programmed visual objects linked to at least one third-party computer inventory of the third party to enable to place, by activating each programmed visual object, a plurality of real-life orders for a plurality of real-life third-party products, real-life third-party services, or both, while remaining within the virtual reality realm.

20 Claims, 60 Drawing Sheets

Related U.S. Application Data continuation of application No. 16/389,319, filed on Apr. 19, 2019, now abandoned, which is a continuation of application No. 14/987,697, filed on Jan. 4, 2016, now Pat. No. 10,268,985.

(60) Provisional application No. 62/099,297, filed on Jan. 2, 2015.

(51) Int. Cl.
*G06Q 30/0241* (2023.01)
*G06Q 30/06* (2023.01)
*G06Q 30/0601* (2023.01)
*G07F 17/32* (2006.01)

(52) U.S. Cl.
CPC ......... *G06Q 30/0277* (2013.01); *G06Q 30/06* (2013.01); *G06Q 30/0641* (2013.01); *G07F 17/3223* (2013.01); *G07F 17/3241* (2013.01); *G07F 17/3255* (2013.01); *G07F 17/3286* (2013.01)

(56) References Cited

U.S. PATENT DOCUMENTS

| | | | |
|---|---|---|---|
| 2012/0231814 A1* | 9/2012 | Calman | G06Q 50/16 455/456.3 |
| 2014/0074583 A1* | 3/2014 | Harvey | G06Q 30/02 705/14.39 |
| 2014/0378220 A1* | 12/2014 | Fuller | A63F 13/822 463/31 |
| 2015/0178821 A1* | 6/2015 | Mishra | G06Q 30/0643 705/26.7 |
| 2016/0055672 A1* | 2/2016 | Lundin | A63F 13/212 340/870.07 |

* cited by examiner

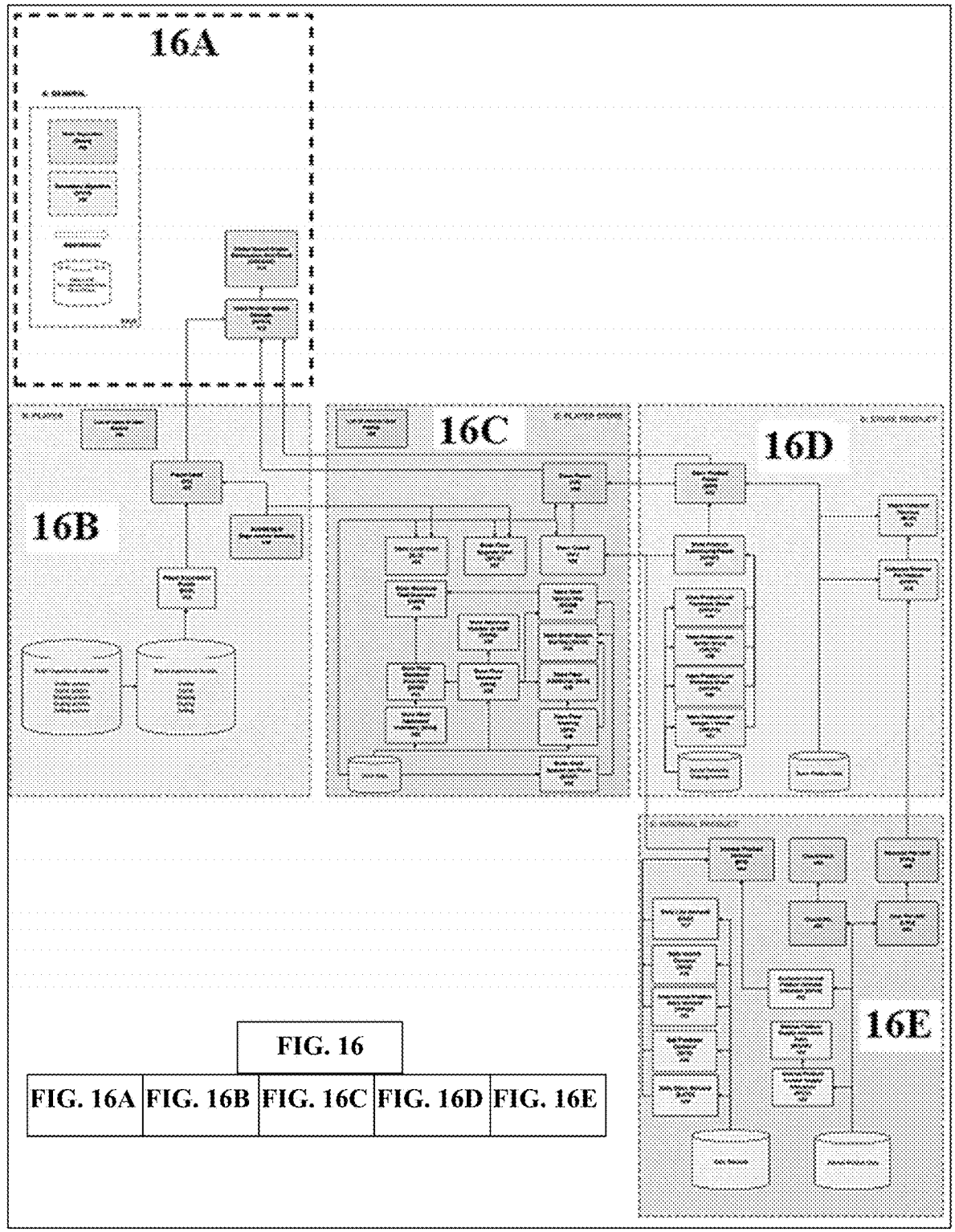

*Review per product the top seller*

Review the user rank

UTILIZING NEAR-FIELD COMMUNICATIONS TO SELECT THIRD PARTY PRODUCTS/SERVICES FOR ORDERING FROM THIRD PARTY INVENTORY MANAGEMENT COMPUTER SYSTEMS AND METHODS OF USE THEREOF

RELATED APPLICATIONS

This application is a continuation of U.S. patent application Ser. No. 14/987,697, filed Jan. 4, 2016, entitled "ELECTRONIC GAMING PLATFORMS ALLOWING USERS TO REAL-TIME ADDITION OF THIRD PARTY PRODUCTS/SERVICES WHILE MAINTAINING PERSISTENT ELECTRONIC LINKS TO THIRD PARTY INVENTORY MANAGEMENT COMPUTER SYSTEMS AND METHODS OF USE THEREOF", which claims the priority of U.S. provisional patent application No. 62/099,297, filed Jan. 2, 2015, entitled "SYSTEMS AND METHODS FOR DELIVERING A GAME TO A USER CONFIGURED TO ALLOW FOR A VIRTUAL SHOPPING EXPERIENCE," which are incorporated herein by reference in their entirety for all purposes.

TECHNICAL FIELD

In some embodiments, the present invention relates to electronic gaming platforms allowing users to real-time addition of third party products/services while maintaining persistent electronic links to third party inventory management computer systems and methods of use thereof.

BACKGROUND

There are video games allowing users to build virtual realities (e.g., houses, cities, etc.) where players can move freely through a virtual world.

BRIEF SUMMARY

In some embodiments, the present invention is directed to a specifically programmed virtual gaming computer system, including: at least one specialized computer machine, including: a non-transient memory, electronically storing particular computer executable program code; and at least one computer processor which, when executing the particular program code, becomes a specifically programmed computer processor of the specifically programmed virtual gaming computer system that is configured to concurrently perform, for each of at least a thousand of users, at least the following operations: electronically causing, via a first computer network, to display at least one specialized dynamic real-time updatable graphical user interface, including: a plurality of specialized tools programmed to allow each user to operate a virtual business offering real-life products, services, or both in a virtual reality realm; where the plurality of programmed specialized tools comprises: at least one tool programmed to allow a particular user to add to a visual representation of a particular virtual business at least one real-life product, service, or both, which are being displayed via an electronic on-line presence of a third party; where the specifically programmed virtual gaming computer system is configured to at least: i) create at least one software object to represent the at least one real-life product or the at least one service and 2) maintain an electronic interface with a computer inventory management program of the third party to track availability and fulfillment of the at least one real-life product and the at least one real-life service; electronically and continuously calculating a product placement priority score value for each of at least a thousand products, services, or both; where the calculating the product placement priority score value is based, at least in part, on: i) a product value of a particular product or a particular service, ii) a product advertisement value of the particular product or the particular service, iii) a user status value of the particular user who offers the particular product or the particular service, and iv) a business value of the particular virtual business that the particular user uses to offer the particular product or the particular service; and electronically and visually promoting each product and each service within the virtual reality realm, based on a corresponding product placement score value.

In some embodiments, the electronic on-line presence is a website.

In some embodiments, the electronic on-line presence is an application programmed for portable electronic devices.

In some embodiments, the product value is based, at least in part, on: a quality rating of the particular product or the particular service and profitability value of the particular product or the particular service.

In some embodiments, the product advertisement value is based, at least in part, on: a number of unique shares and a pre-determined advertising factor.

In some embodiments, the user status value is based, at least in part, on: points accumulated by the particular user within the virtual reality realm.

In some embodiments, the electronically and visually promoting each product and each service based on the corresponding product placement score value, including: adjusting a visual presentation of each product and each service based on the corresponding product placement score value.

In some embodiments, the present invention is directed to a computer-implemented method, including: electronically causing, by a specifically programmed virtual gaming processor, via a first computer network to display at least one specialized dynamic real-time updatable graphical user interface, including: a plurality of specialized tools programmed to allow each user to operate a virtual business offering real-life products, services, or both in a virtual reality realm; where the plurality of programmed specialized tools comprises: at least one tool programmed to allow a particular user to add to a visual representation of a particular virtual business at least one real-life product, service, or both, which are being displayed via an electronic on-line presence of a third party; creating, by the specifically programmed virtual gaming processor, at least one software object to represent the at least one real-life product or the at least one service; maintaining, by the specifically programmed virtual gaming processor, an electronic interface with a computer inventory management program of the third party to track availability and fulfillment of the at least one real-life product and the at least one real-life service; electronically and continuously calculating, by the specifically programmed virtual gaming processor, a product placement priority score value for each of at least a thousand products, services, or both; where the calculating the product placement priority score value is based, at least in part, on: i) a product value of a particular product or a particular service, ii) a product advertisement value of the particular product or the particular service, iii) a user status value of the particular user who offers the particular product or the particular service, and iv) a business value of the particular virtual business that the particular user uses to offer the particular product or the particular service; and electronically and visually promoting, by the specifically programmed virtual gaming processor, each product and each service within the virtual reality realm, based on a corresponding product placement score value.

BRIEF DESCRIPTION OF THE DRAWINGS

The present invention will be understood and appreciated more fully from the following detailed description of the preferred embodiments, taken in conjunction with the drawings in which.

Figure 1:
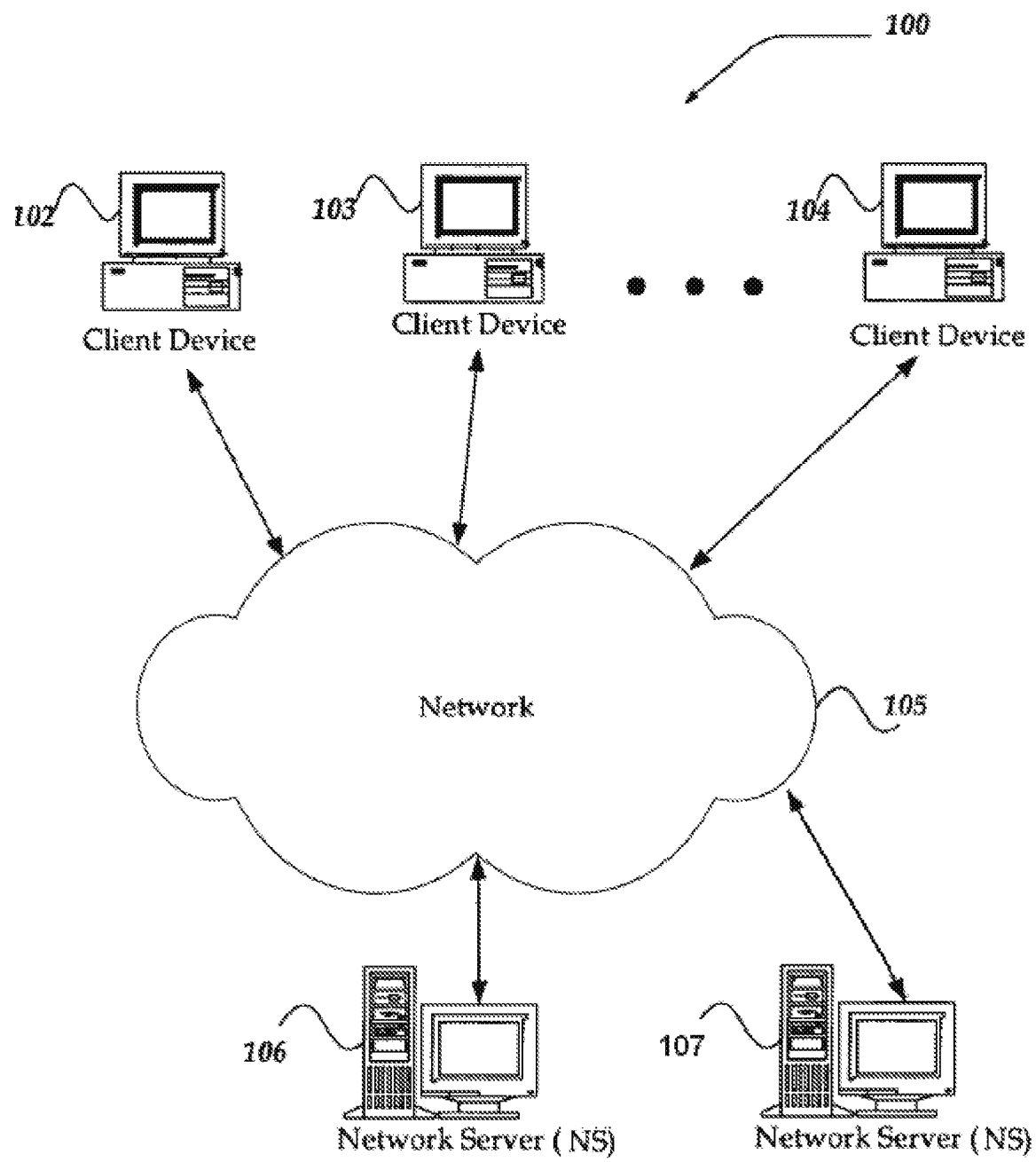
FIG. 1 illustrates a block diagram of an exemplary virtual gaming platform's architecture accordance with some embodiments of the present invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, a "virtual store" refers to (1) a brick-and-mortar store (e.g., Target store, Bloomingdale's, etc.) and/or online store (e.g., Overstock, Amazon, etc.) and/or (2) a store that solely exists in the game (i.e., the store does not exist outside of the game).

In some embodiments, the system(s) of the present invention is/are a game(s) configured to deliver a plurality of shopping events to at least one user. In some embodiments, the system(s) of the present invention is/are a game(s) configured to deliver a plurality of shopping events to a plurality of users. In some embodiments, the game can be configured to be played on any device having a graphical user interface, where a device can be a mobile phone, tablet, terminal, computer, watch, etc. In some embodiments, a shopping event can include purchasing a product/service, placing a product/service in a virtual store, marketing a product/service, offering and/or accepting money for a good/service, generating a receipt of purchase, or any other typical activities associated with shopping. In some embodiments, the game is configured to allow each user of a plurality of users to (i) shop for, (ii) discover, (iii) purchase, (iv) market, or any combination thereof, products and/or services from active domestic and/or international merchants, companies/brands, suppliers, or any combination thereof. In some embodiments, the game is configured to allow each user of a plurality of users to operate/manage a virtual store. In some embodiments, the game is configured to allow each user of a plurality of users to select at least one product/service and virtually place at least one product/service in the virtual store. In some embodiments, the game is configured to identify at least one purchase of the at least one product/service in the virtual store. In some embodiments, the game is configured to award at least one reward when the at least one product/service is purchased by at least one other user (e.g., a second user, a third user, a fourth user, etc.) of a plurality of users. In some embodiments, the game can be configured to allow each user of a plurality of users to identify, market, advertise, offer for sale, buy, or any combination thereof, actual products/services. In some embodiments, the game can be configured to allow a user to obtain the actual products/services at retail or service location (e.g., for pick-up and/or use in the store location) and/or by typical delivery methods.

In some embodiments, the system(s) of the present invention is/are a game(s) configured to allow a plurality of users to open, grow, close, manage, or any combination thereof, at least one virtual store. In some embodiments, the game is configured to allow the plurality of users to open, grow, close, manage, or any combination thereof, a plurality of virtual stores (e.g., 2, 3, 4, 5, 6, 7, 8, 9, 10, etc.). In some embodiments, the game is configured to allow each user to stock each virtual store with the products/services identified by the user. In some embodiments, the game is configured to allow a greater amount of products/services to be sold in a larger store. In some embodiments, the game is configured to allow physically larger products/services to be sold in a larger store. In some embodiments, the game is configured to allow a store to be virtually occupied by 1-1,000,000 items (for example, but not limited to, rings, lip gloss, wallets, etc.). In some embodiments, the game is configured to allow a user to stock a store with 1-100,000 items. In some embodiments, the game is configured to allow a user to stock a store with 1-10,000 items. In some embodiments, the game is configured to allow a user to stock a store with 1-1,000 items. In some embodiments, the game is configured to allow a user to stock a store with 1-100 items. In some embodiments, the game is configured to allow a user to stock a store with 1-50 items. In some embodiments, the game is configured to allow a user to stock a store with 1-10 items. In some embodiments, the game is configured to allow a user to stock a store with 10-1,000,000 items. In some embodiments, the game is configured to allow a user to stock a store with 50-1,000,000 items. In some embodiments, the game is configured to allow a user to stock a store with 100-1,000,000 items. In some embodiments, the game is configured to allow a user to stock a store with 1,000-1,000,000 items. In some embodiments, the game is configured to allow a user to stock a store with 10,000-1,000,000 items. In some embodiments, the game is configured to allow a user to stock a store with 100,000-1,000,000 items.

In some embodiments, the game is configured to allow a user to stock a larger store with larger merchandise, e.g., but not limited to, bicycles, cars, motorcycles, posters, furniture, etc. In some embodiments, larger merchandise can occupy a virtual space in the virtual store comparable to actual measurements of the merchandise.

In some embodiments, the inventive system(s) of the present invention is/are a game(s) configured to operate in real-time. In some embodiments, a virtual tracking number is assigned to each item purchased by a user.

In some embodiments, it is understood that an illustrative inventive system of the present invention (the illustrative virtual gaming platform) is programmed to allow a plurality of users to concurrently perform in real-time each and every action/operation described herein with respect to being performed by and/or for a single user. In some embodiments, the plurality of user includes at least 100 users. In some embodiments, the plurality of user includes at least 1,000 users. In some embodiments, the plurality of user includes at least 10,000 users. In some embodiments, the plurality of user includes at least 100,000 users. In some embodiments, the plurality of user includes at least 1,000,000 users. In some embodiments, the plurality of user includes at least 1,000,000,000 users.

In some embodiments, the system(s) of the present invention is/are a game(s) configured to allow a user to view an inventory of a virtual store similar to an actual experience of shopping in a brick-and-mortar store, e.g., inventory viewed by walking through aisles of a store. In some embodiments, the user is allowed to view a virtual store in a manner similar to view locations as displayed by Google Earth, where users can travel to the store, to see the store from the exterior at various angles where the user can virtually walk/travel through the aisles of a store, browse book shelves, shop racks of clothes, or any other typical actions associated with general shopping patterns of a shopper in a brick-and-mortar store.

In some embodiments, the system(s) of the present invention is/are a game(s) configured to allow at least 1,000 users to shop simultaneously, where shopping can include, e.g., but not limited to, browsing, researching, paying, receiving, etc. In some embodiments, at least 10,000 users can shop simultaneously. In some embodiments, at least 100,000 users can shop simultaneously. In some embodiments, at least 1,000,000 users can shop simultaneously. In some embodiments, at least 10,000,000 users can shop simultaneously. In some embodiments, at least 100,000,000 users can shop simultaneously. In some embodiments, at least 1,000,000,000 users can shop simultaneously.

In some embodiments, the system(s) of the present invention is/are a game(s) configured to deliver identifying features to a user regarding specific items (e.g., tagged items), where, as a non-limiting example, a "Schwinn bike" can include 1,000 bikes, where non-limiting examples of each of the 1,000 Schwinn bikes are: "classic deluxe 7 women's," "tango tandem," "town & country," "fiesta," "hornet," "meridian," or any other product identified as a Schwinn bicycle. In some embodiments, the specific item (e.g., tagged item) can be a "Revlon lip product," which can, include 1,000 Revlon lip products, where non-limiting examples of each of the 1,000 Revlon lip products can include products from the "Colorburst™," "Colorstay™," or "ultra HD™" product lines, as non-limiting examples: Colorburst™ lacquer balm having a Coquette shade, Colorstay™ overtime lipcolor having a Forever Pink shade, ultra HD™ lip lacquer having a HD Pink Ruby shade, or any similar products as marketed in these or similar Revlon product lines.

In some embodiments, the system(s) of the present invention is/are a game(s) configured to allow a user to (i) advertise at least one product/service and/or (ii) store the at least one product/service, where the advertising and/or storing can be recorded/used by other virtual platforms, e.g., but not limited to, social networks (e.g., but not limited to, Facebook, LinkedIn, MySpace, Twitter, Pinterest, etc.). In some embodiments, the game allows a status of the virtual store to grow/increase within a community when a user actively manages the virtual store (e.g., but not limited to, buying, selling, marketing, or any combination thereof, product/services). In some embodiments, the game is configured to allow both game advertising and external advertising. External advertising opportunities include but not limited to traditional and digital media sources such as Radio Ads, TV Ads, Billboards, Social Media Banner Ads, etc. In game advertising includes but not limited to billboards, radio broadcasts, banner ads, direct peer to peer communication and alerts. In some embodiments, a status can grow/increase by creating a larger store, moving a store to a location of higher traffic, adding socially acknowledged higher profile features to the store (e.g., but not limited to, a helipad, a limo service, a personal shopper, etc.). In some embodiments, an increased status is directly proportional to the increased virtual currency the store earns, e.g., per hour, day, week, month, year, etc. In some embodiments, the game is configured to offer real products/services for sale and receive tender for purchasing the real products/services. In some embodiments, the game is configured to illustrate at least one game board, where the game board can be a community (e.g., town, city, hamlet, etc.) that is currently in existence (e.g., New York, New York; London, England; Paris, France, etc.). In some embodiments, the game is configured to illustrate customers entering and leaving the virtual store(s). In some embodiments, the game is configured to illustrate customer groups or crowds indicating level of activity in the virtual store(s).

In some embodiments, the system(s) of the present invention is/are a game(s) configured to deliver a shopping experience to at least one user (i.e., a shopper, where the shopper can be a buyer and/or seller of product(s)/service(s)). In some embodiments, the game is configured to allow a user to launch (i.e., start) the game and provide a plurality of opportunities to the user to participate in typical shopping events, e.g., but not limited to, locate products and/or services using any typical search parameter, e.g., but not limited to: geolocation searching, combination of key word, geography, product names, descriptions, price point, or any combination thereof.

In some embodiments, the system(s) of the present invention is/are a game(s) configured to deliver at least one prompt to the user, where the prompt provides a selection of products/services to the user to allow the user to identify the products/services of interest to that user. In some embodiments, some non-limiting examples of products provided to the user in the prompt can be: a watch from Zurich, Switzerland, a handbag from Santa Monica, California, shoes from Florence, Italy etc. In some embodiments, some non-limiting examples of services provided to the user in the prompt can be: a lunch in Tokyo, Japan, or a dinner in New York City, N.Y., etc.

In some embodiments, the system(s) of the present invention is/are a game(s) configured to present an illustrative news feed (e.g., including pictures of products/services) to a user, where the news feed can include products/services that competing virtual stores are stocking and/or selling, products/services that a plurality of users are purchasing, products/services that are newly available for purchasing/stocking, etc. In an embodiment, for example, the game will provide a plurality of images of actual Men's Swiss Watches to a user (e.g., but not limited to, displaying the plurality of images in a grid form) in response to a user initiating a search specifying "Men's Swiss Watches". In some embodiments, the game is configured to visually display details about a product. In some embodiments, the game is configured to allow a user to add/remove products/services to a virtual shopping cart. In some embodiments, the game is configured to allow a user to virtually place/identify products/services as "favorites". In some embodiments, the game is configured to allow a user to virtually place/identify products/services as products/services the user is not interested in.

In some embodiments, the system(s) of the present invention is/are a game(s) configured to allow a user to virtually search and/or browse products/services. In some embodiments, the game is configured to allow a user to identify a product/service as a "favorite" item. In some embodiments, the game is configured to allow a user to buy products/services using a typical eCommerce platform (e.g., Amazon using Paypal). In some embodiments, the game is configured to allow a user to build the user's game statistics using passive and/or interactive methods. In some embodiments, the game is configured to allow a user to earn increased virtual currency by offering shopping mini-games. In an embodiment, for example, a mini-game is delivered to a user, and upon completion of the game, the user is awarded 25 additional cents. In some embodiments, the game is configured to allow a user to choose a virtual currency (e.g., coins, dollars, cents, yen, etc.). In an embodiment, for example, the awarded cents are virtual tender that can be used for increasing the size of the user's store and/or buy more expensive products/services. In some embodiments, the awarded money can be provided to the user to allow the user to purchase real products/services. In some embodiments, the awarded money cannot be used to purchase real products/services. In some embodiments, the awarded money can be provided to the user to allow the user to gain an increased status of the virtual store (e.g., addition of a percentage of store space (5%, 10%, 15%, 20%, 25%, 30%, 35%, 40%, 45%, 50%, etc.), or moving the location of the virtual store to a location of higher traffic (e.g., from Ithaca, New York to New York City, N.Y.)). In some embodiments, the awarded money can be obtained in the form of cash back payments. In some embodiments, the awarded money can be obtained in the form of commissions on the sale of products. In some embodiments, the awarded money can be increased the player earning additional experience or performing actions.

In some embodiments, the system(s) of the present invention is/are a game(s) configured to deliver a news feed to a user, where the news feed includes a text entry location having an auto-complete functionality. In some embodiments, the text entry location can be at a centrally located part of the screen, e.g., the top of the screen. In some embodiments, the system is configured to identify a search string input by a user. In some embodiments, each word in the search string can be visually encapsulated (e.g., the word is placed in a shape (e.g., a pill shape, a block shape, etc.)). In some embodiments, the system of the present invention allows each word to be deleted by the user, where each word is independent of other words in the search string. In some embodiments, the system of the present invention is configured to query each word provided by the user, where the query compares the word provided by the user to words stored (i.e., "tagged words" or "tags") in a database. In some embodiments, the tagged words/tags can be identifiers of specific products, e.g., but not limited to, "Rolex" is a tag for "gold Rolex watch," "Revlon" is a tag for "Revlon lipstick shade 100", etc. In some embodiments, the database is configured to include product tags, keywords, business names, places, addresses, brands, or any combination thereof. In some embodiments, the search string can be configured to remain in place until, e.g., the user types in another search string, the user searches a link from within a city, the user searches a link within a category search, the user searches a store or another user, or any combination thereof.

Figure 5A:
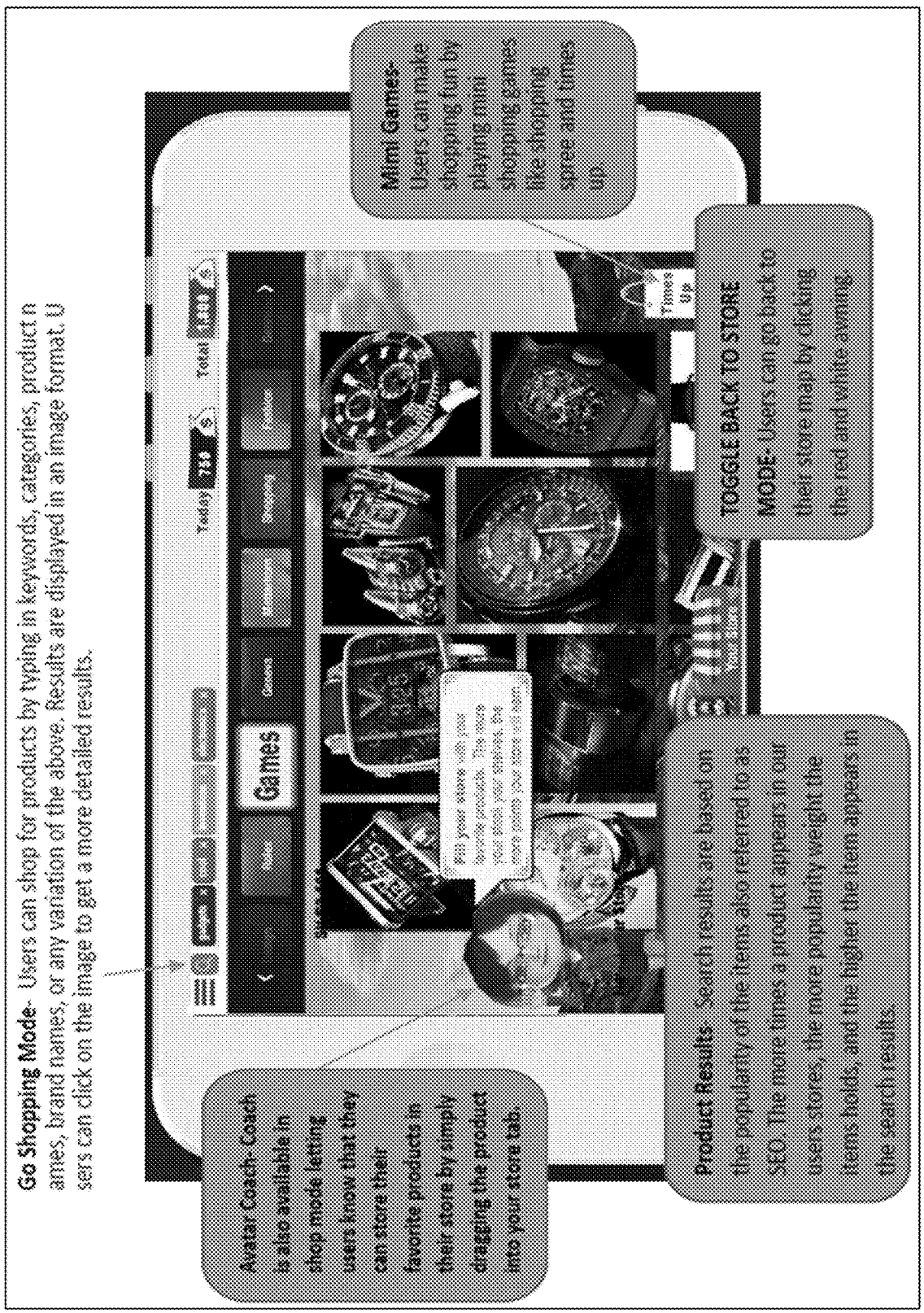
Figure 5B:
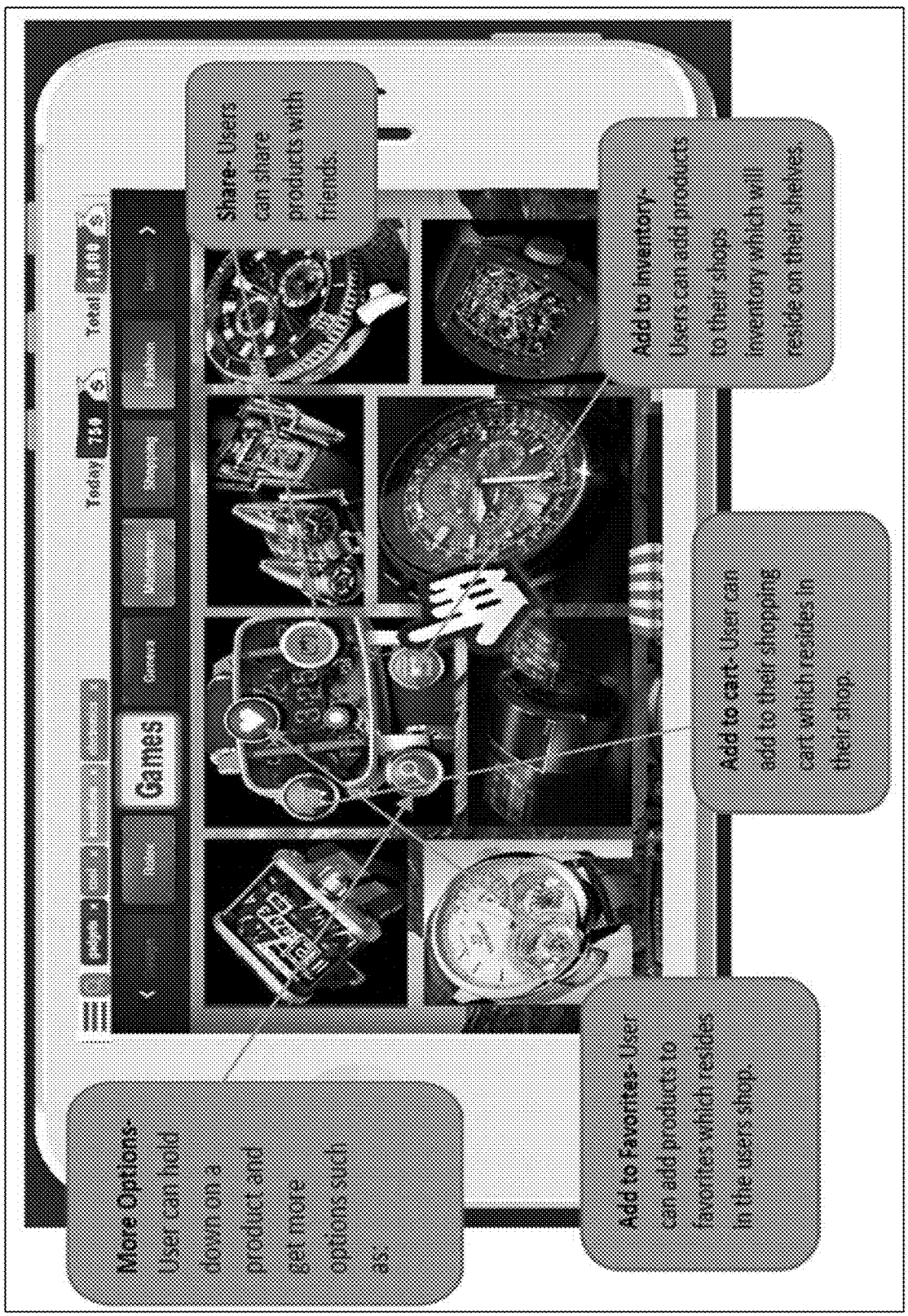

FIG. 5A illustrates an embodiment of the present invention, showing features of the system including: a coach, product results, modes, mini games on a GUI. FIG. 5B illustrates an embodiment of the present invention, showing features of the system including sharing abilities, adding items to a cart, inventory, favorites, or any combination thereof on a GUI.

Figure 6A:
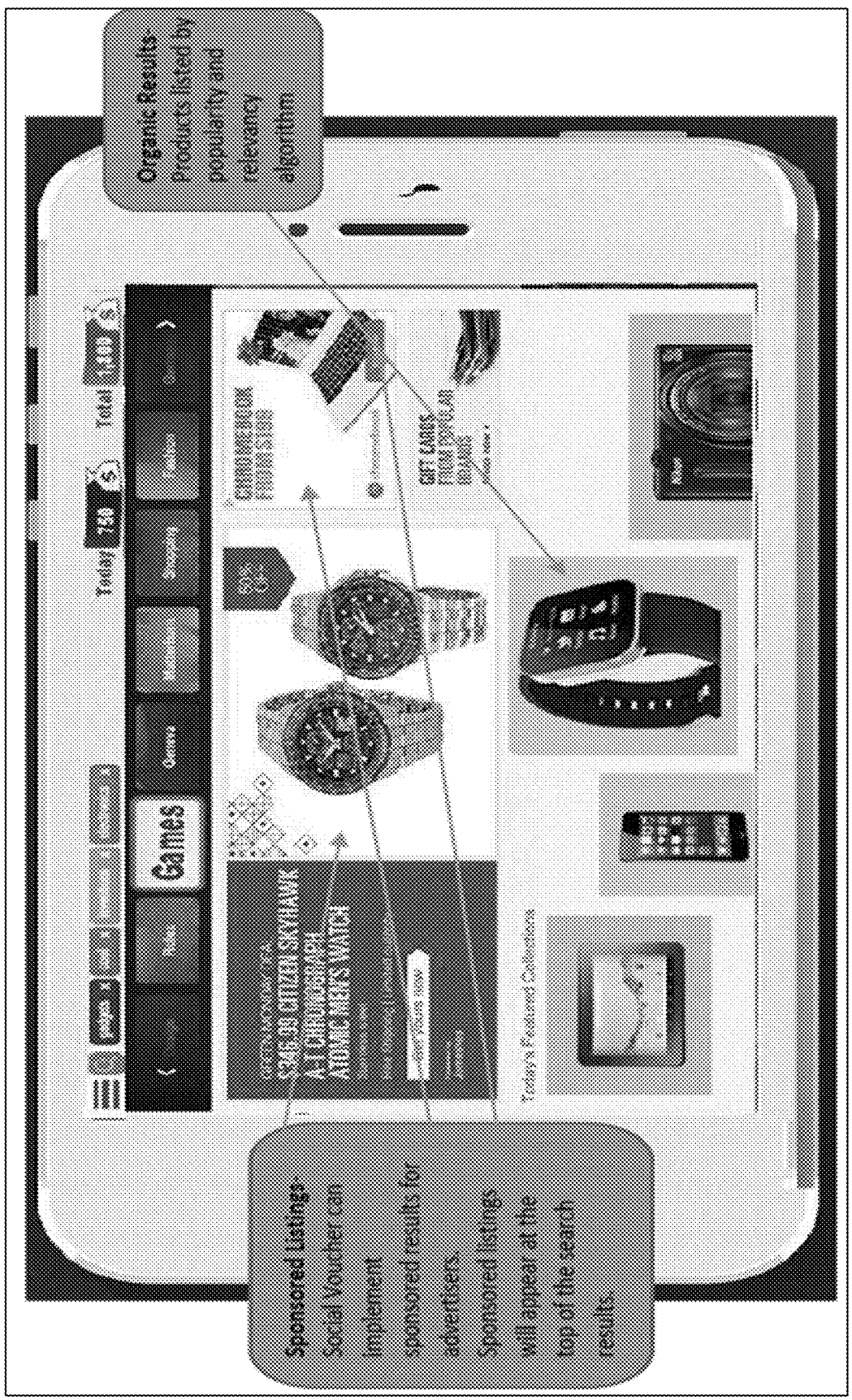
Figure 6B:
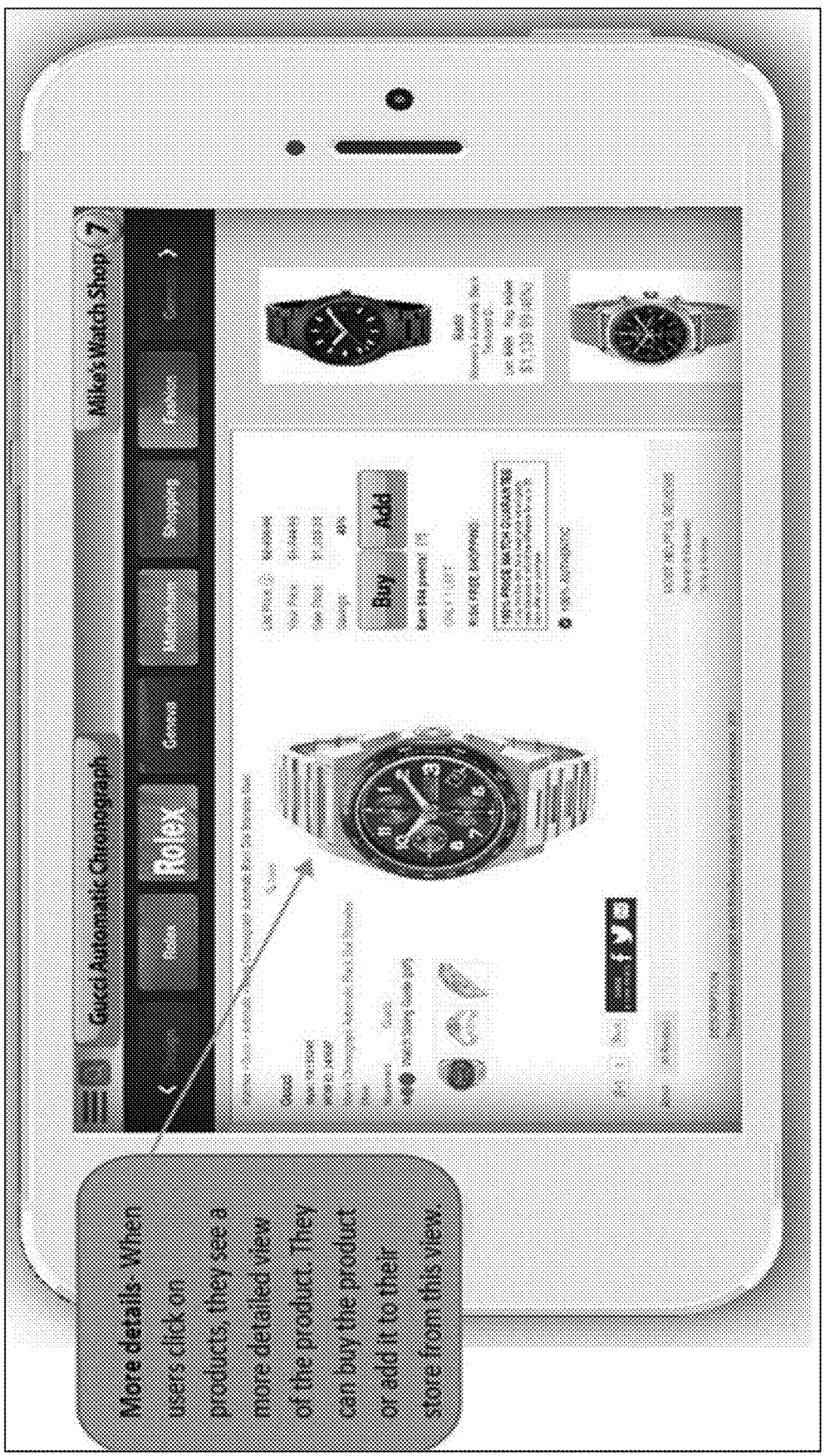

FIG. 6A illustrates an embodiment of the present invention, showing features of the system including: sponsored listings and organic results on a GUI. FIG. 6B illustrates an embodiment of the present invention, showing features of the system including gathering additional details regarding products/services on the GUI.

Figure 7A:
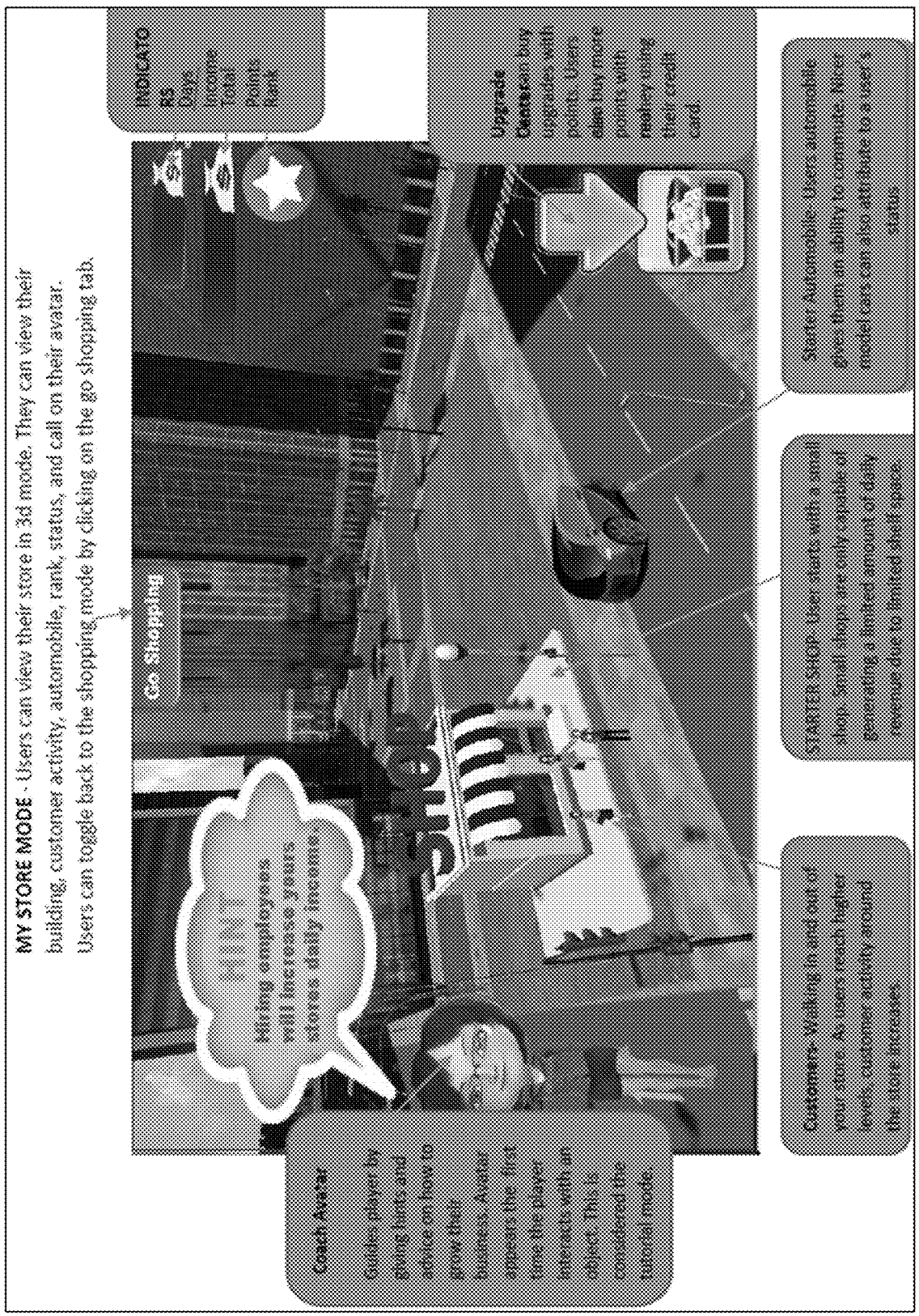
Figure 7B:

FIG. 7A illustrates an embodiment of the present invention, showing features of the system including: the parameters of "my store mode", including the coach avatar, customers, starter shop, starter automobile, indicators, and upgrade center on the GUI. FIG. 7B illustrates an embodiment of the present invention, showing features of the system including: providing hints to a user on the GUI.

Figure 8A:
Figure 8B:
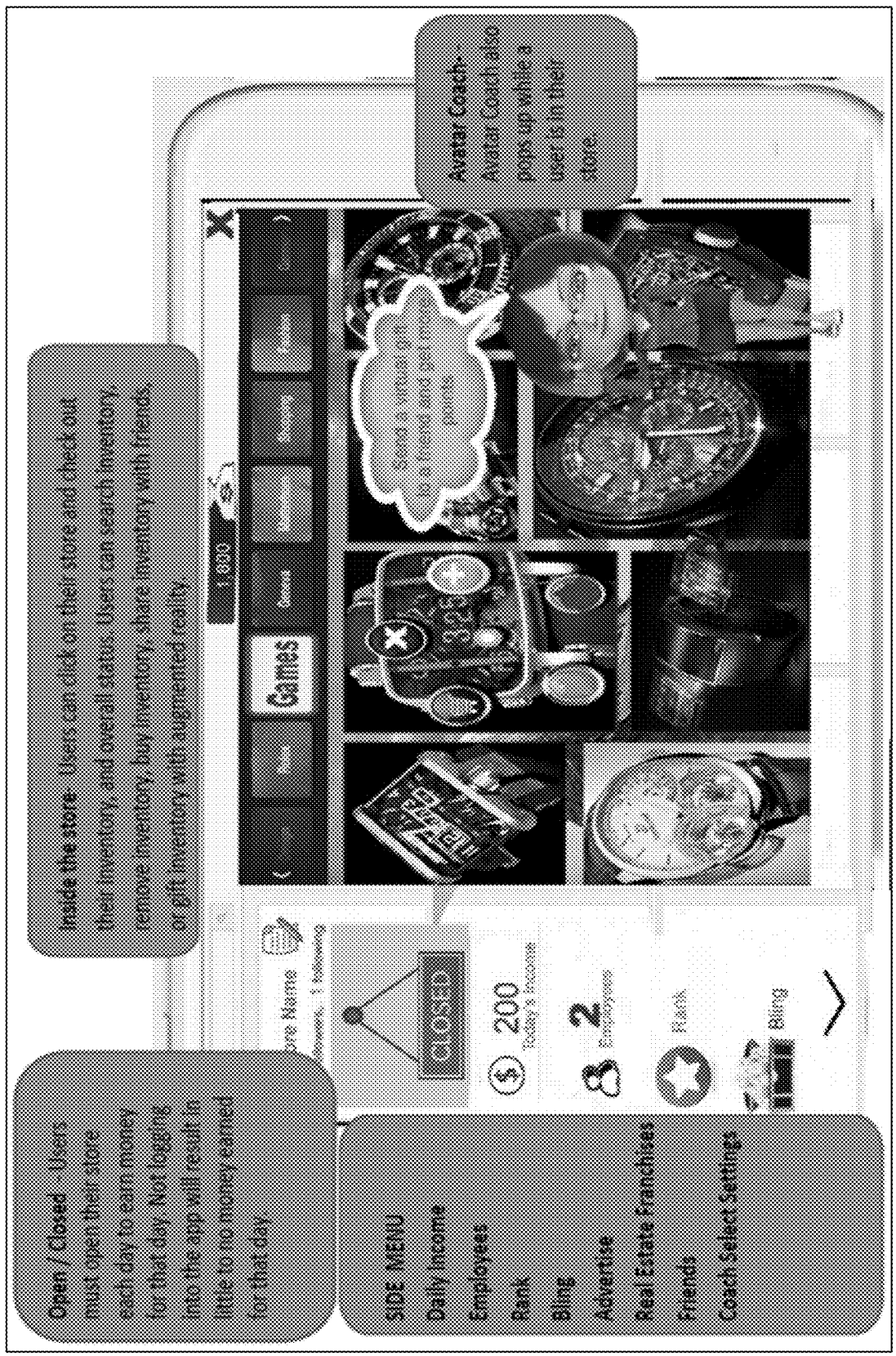

FIG. 8A illustrates an embodiment of the present invention, showing features of the system including: upgrading the user's store, construction activity, and increasing speed of construction on the GUI. FIG. 8B illustrates an embodiment of the present invention, showing features of the system including: identifying open/closed status of the user's store, store virtual inventory, avatar coach, and side menu including further details on the GUI.

Figure 9A:
Figure 9B:
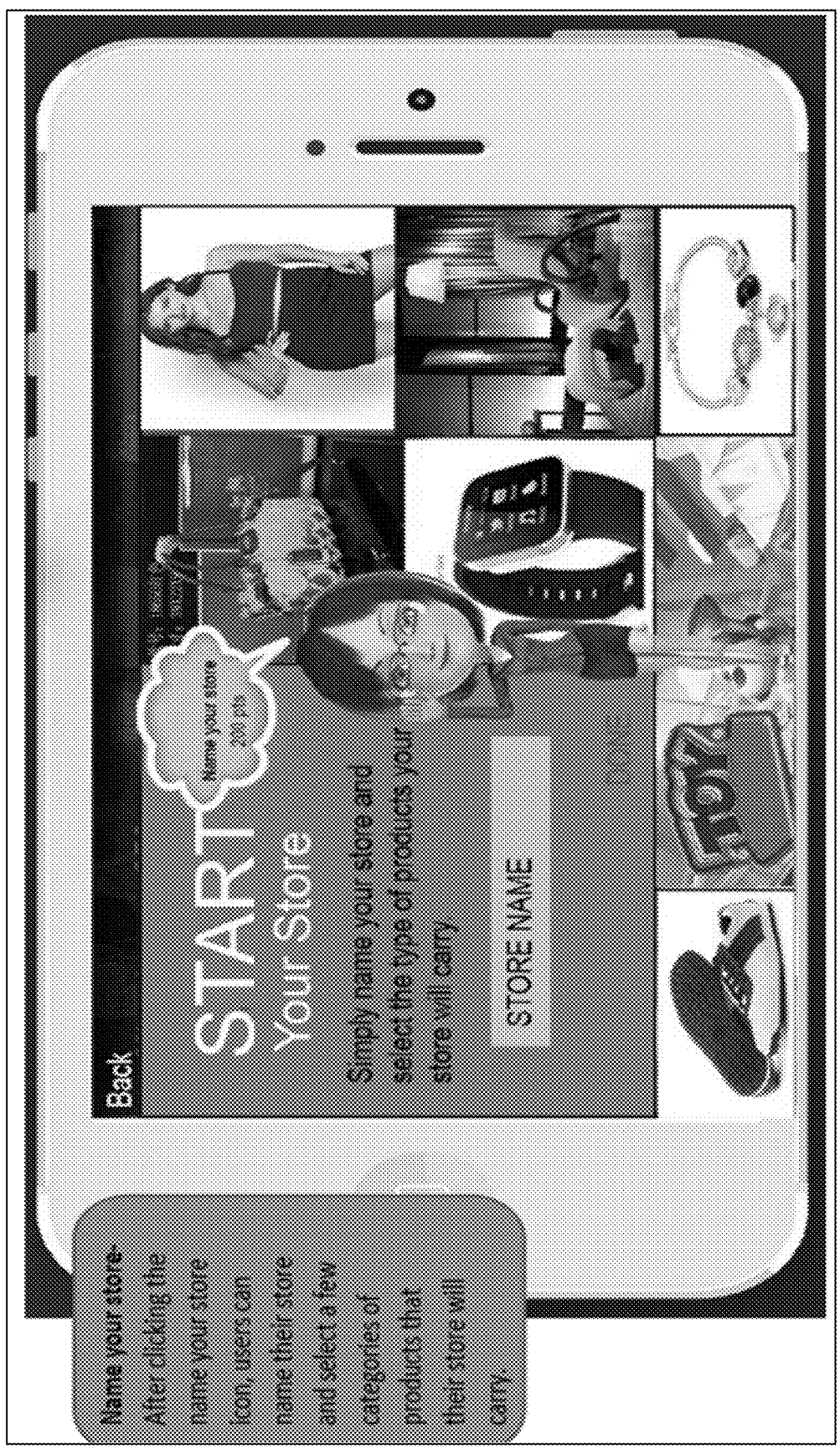

FIGS. 9A and 9B illustrate embodiments of the present invention, showing features of the system including information regarding the name of the store on the GUI.

Figure 10A:
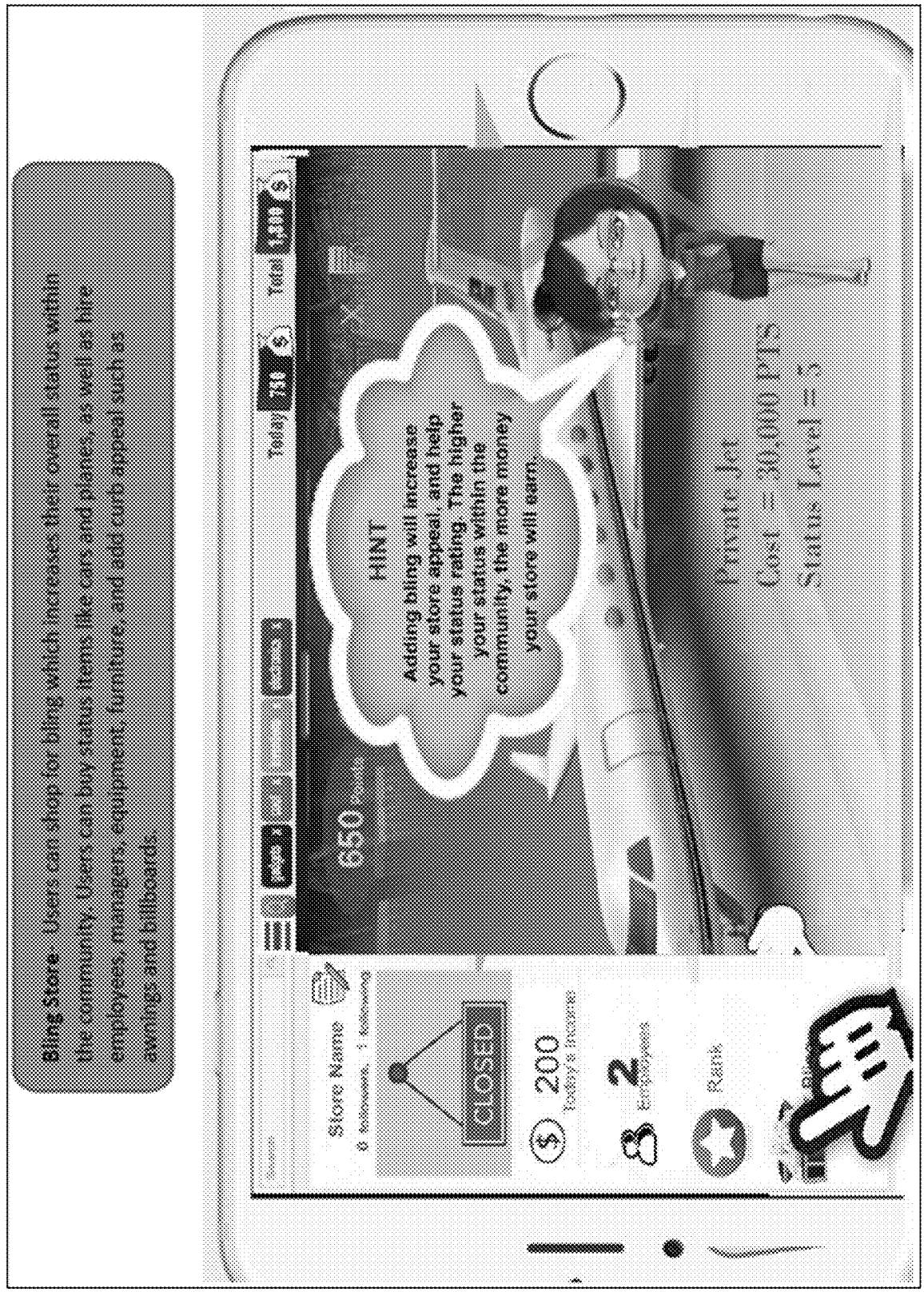

FIG. 10A illustrates an embodiment of the present invention, showing features of the system including information regarding shopping for bling, e.g., a private jet, on the GUI.

Figure 10B:
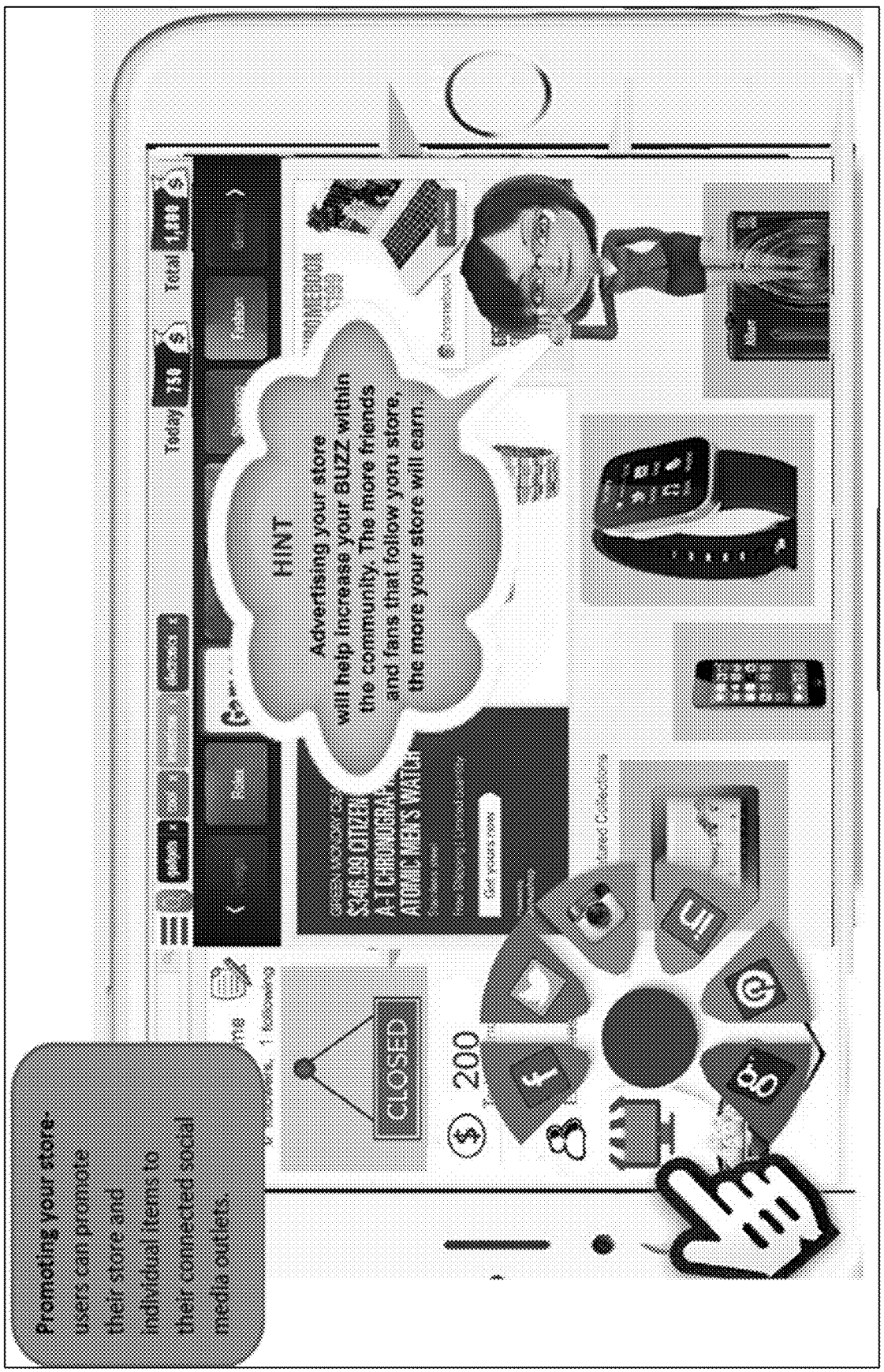

FIG. 10B illustrates an embodiment of the present invention, showing features of the system including information regarding promoting the store on the GUI.

Figure 11A:
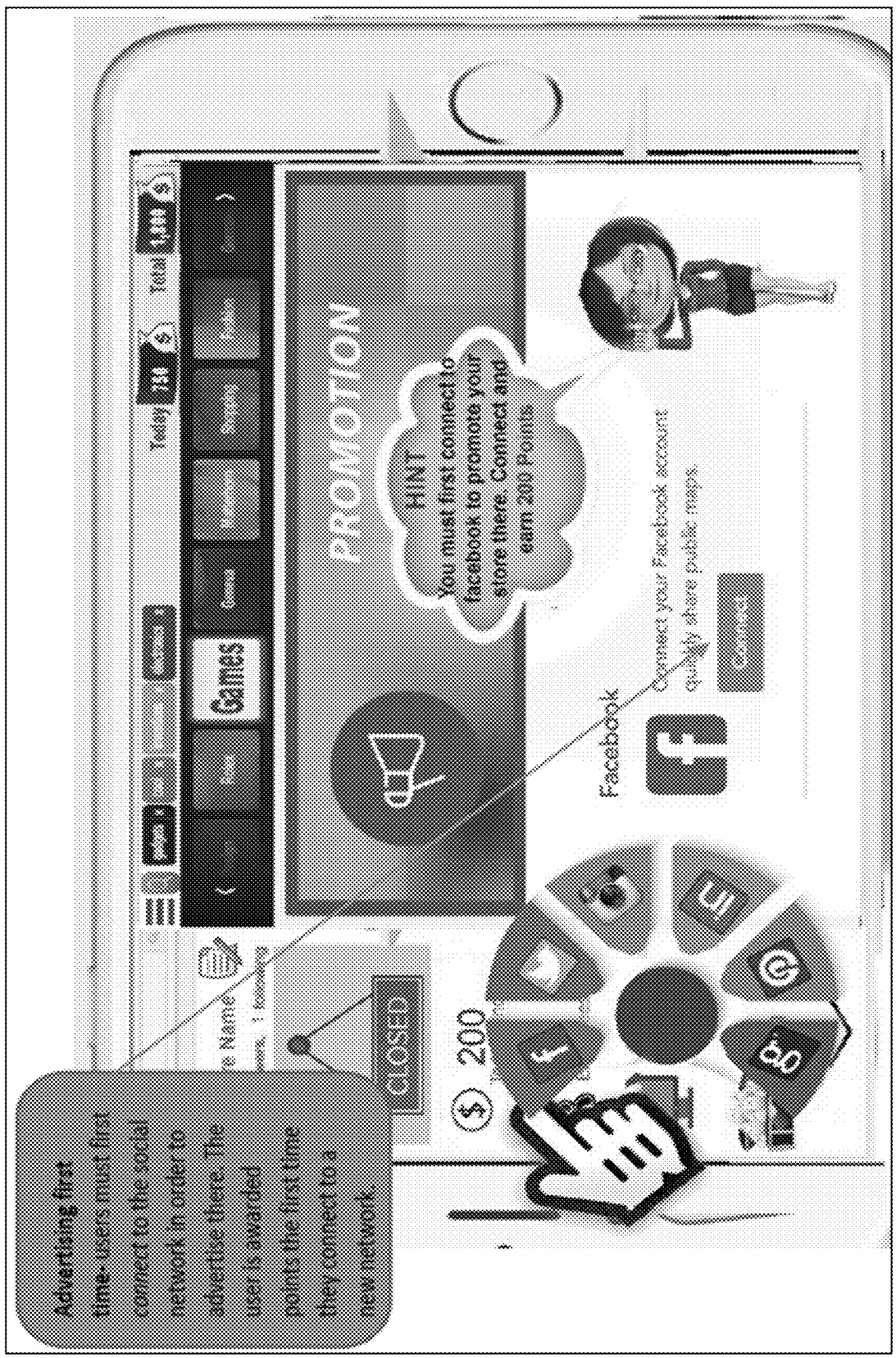

FIG. 11A illustrates an embodiment of the present invention, showing features of the system including information regarding advertising the store through various social media websites (e.g., Facebook, etc.) on the GUI.

Figure 11B:
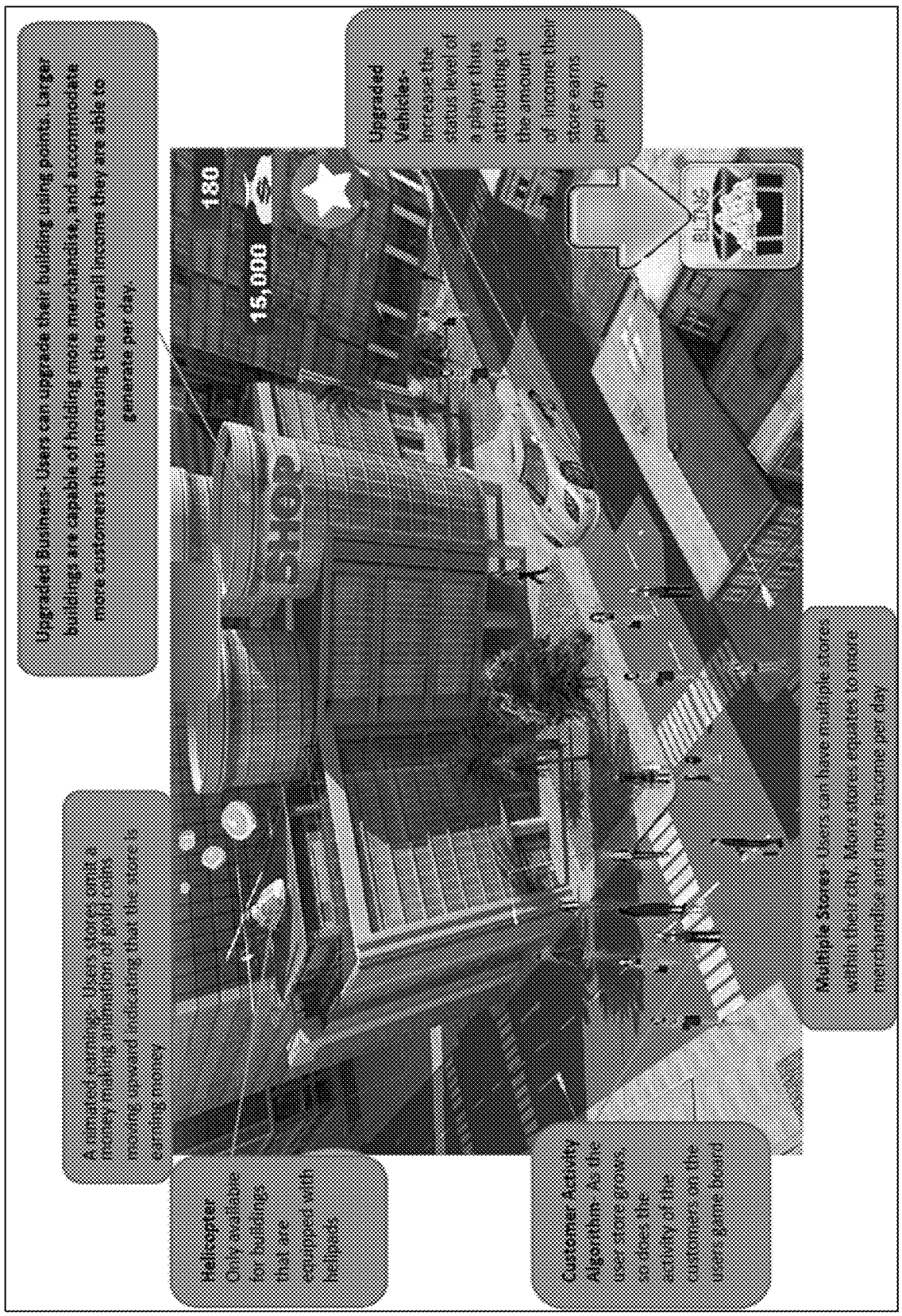

FIG. 11B illustrates an embodiment of the present invention, showing features of the system including information regarding features that can be upgraded using the game of the inventive system (i.e., an advanced level of the shopping game) on the GUI.

Figure 12A:
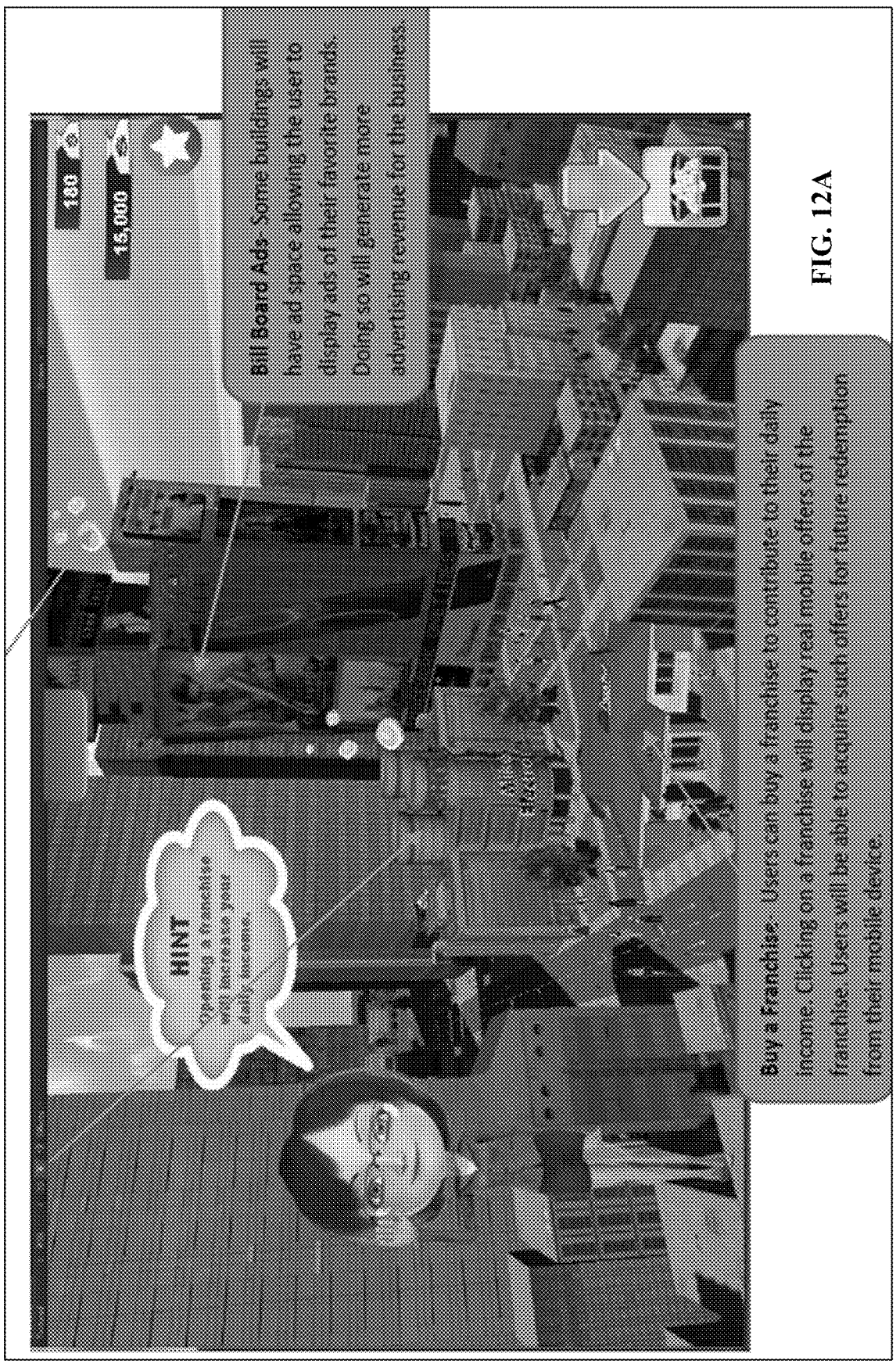
Figure 12B:
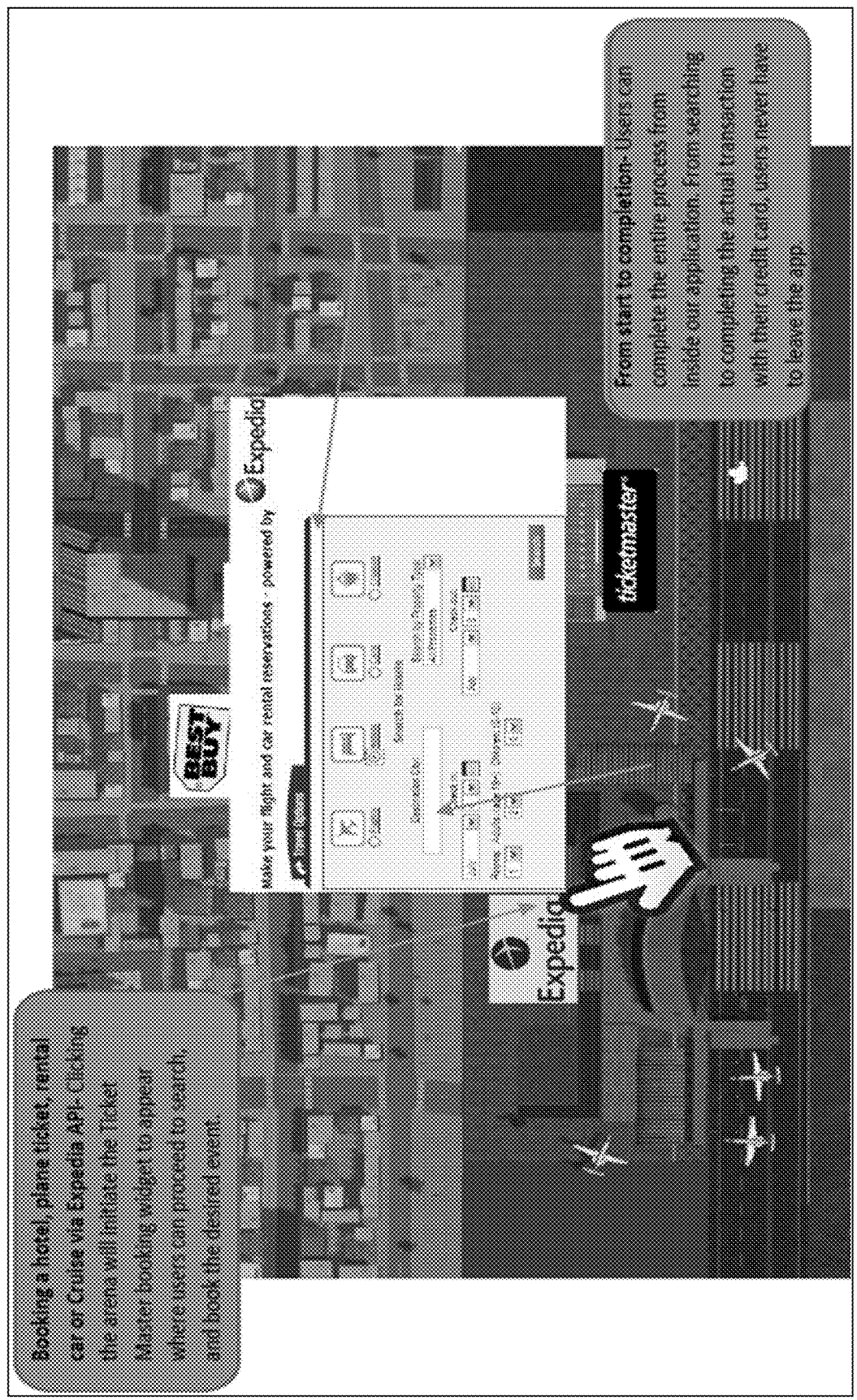

FIG. 12A illustrates an embodiment of the present invention, showing features of the system including information regarding buying a franchise and/or billboard ads on the GUI. FIG. 12B illustrates an embodiment of the present invention, showing features of the system including information regarding booking a real hotel stay using the game of the system of the present invention on the GUI.

Figure 13A:
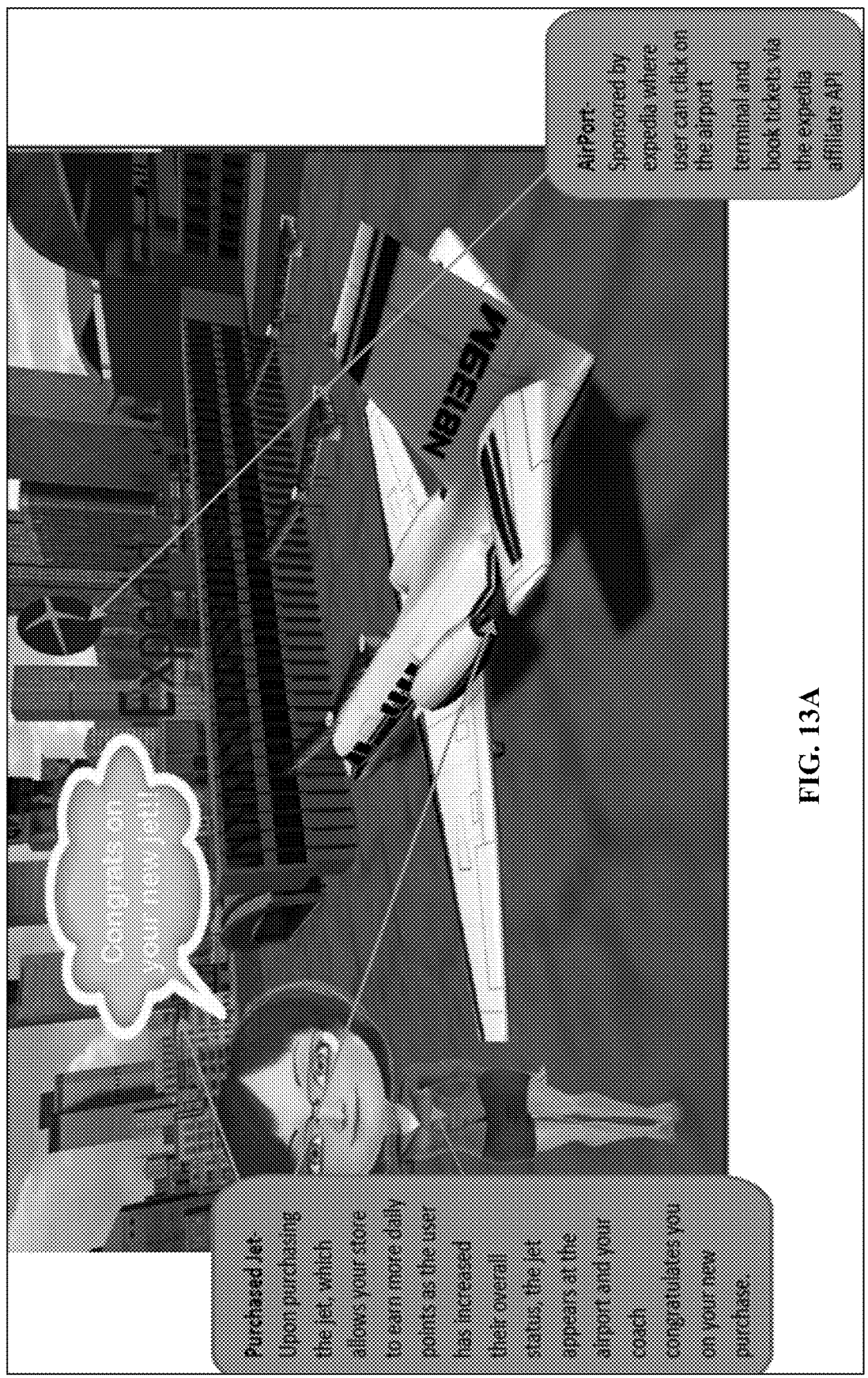
Figure 13B:

FIG. 13A illustrates an embodiment of the present invention, showing features of the system including information regarding purchasing a jet and the impact this purchase can have for purchased plane trips on the GUI through the game. FIG. 13B illustrates an embodiment of the present invention, showing features of the system including purchasing real tickets (e.g., using Ticketmaster) on the GUI through the game.

Figure 14A:
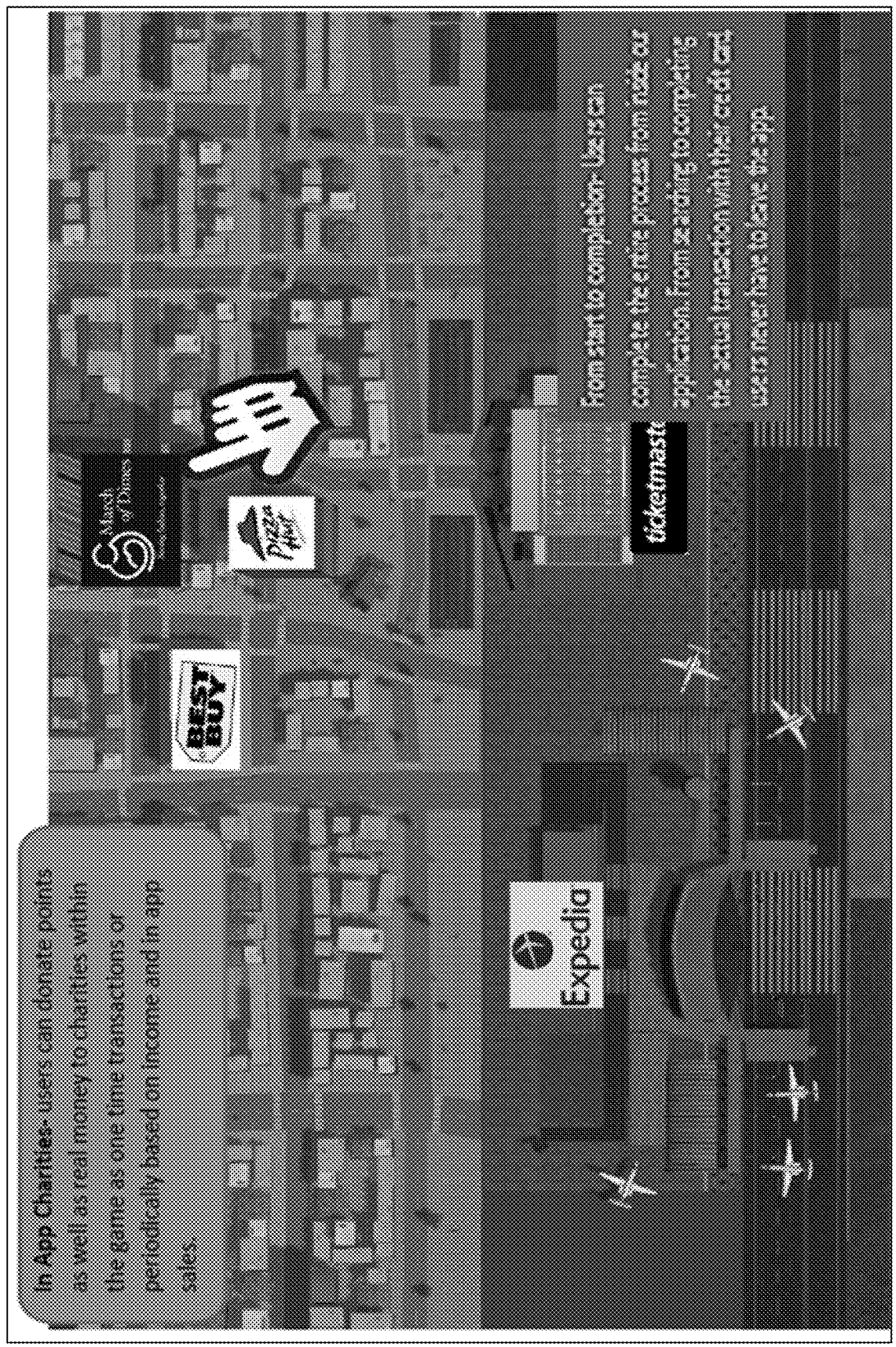
Figure 14B:
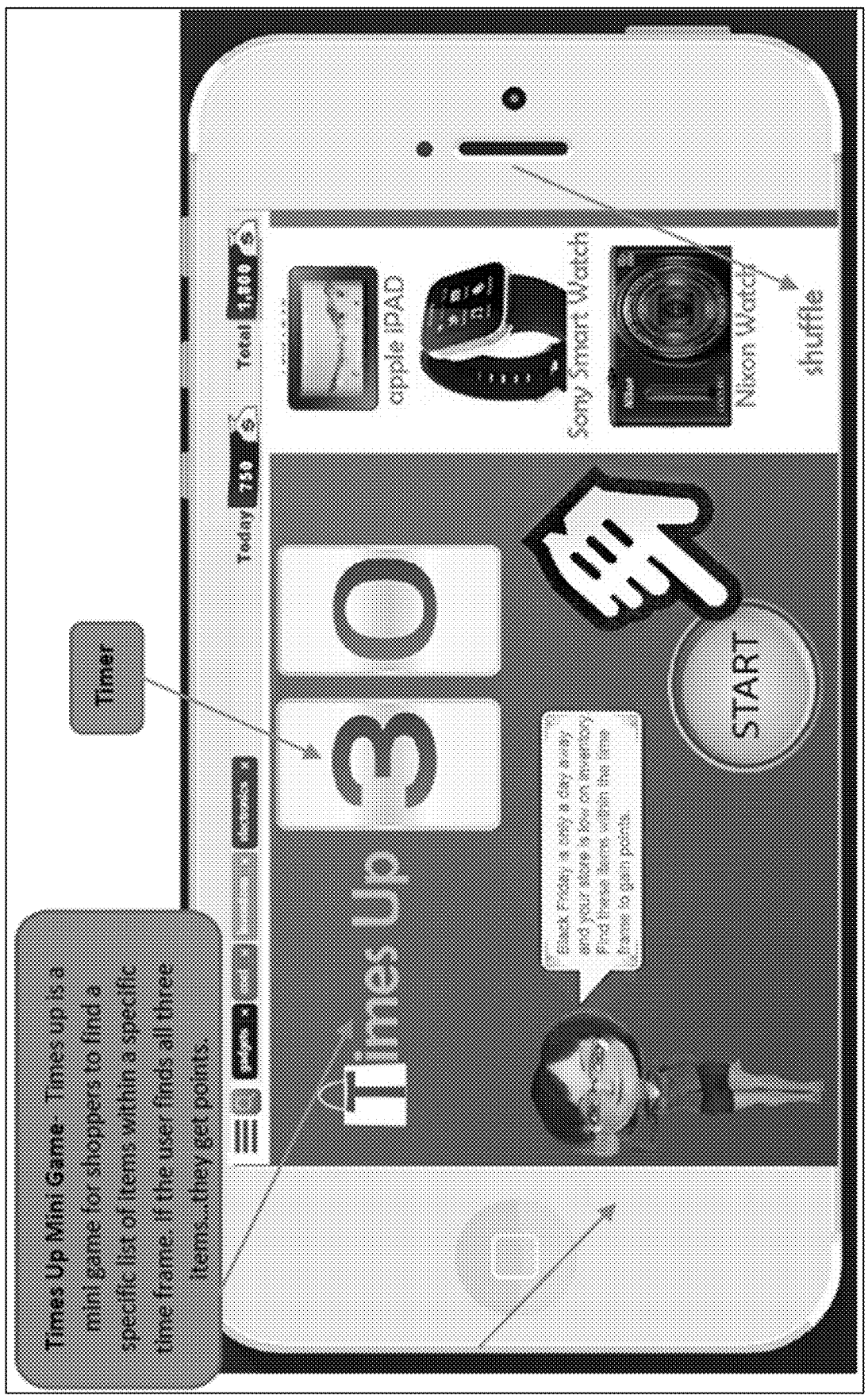

FIG. 14A illustrates an embodiment of the present invention, showing features of the system including donating points (or real money) to charities on the GUI. FIG. 14B illustrates an embodiment of the present invention, showing features of the system including a mini-game (i.e., a timed game within the game of the inventive system) on the GUI.

Figure 15A:
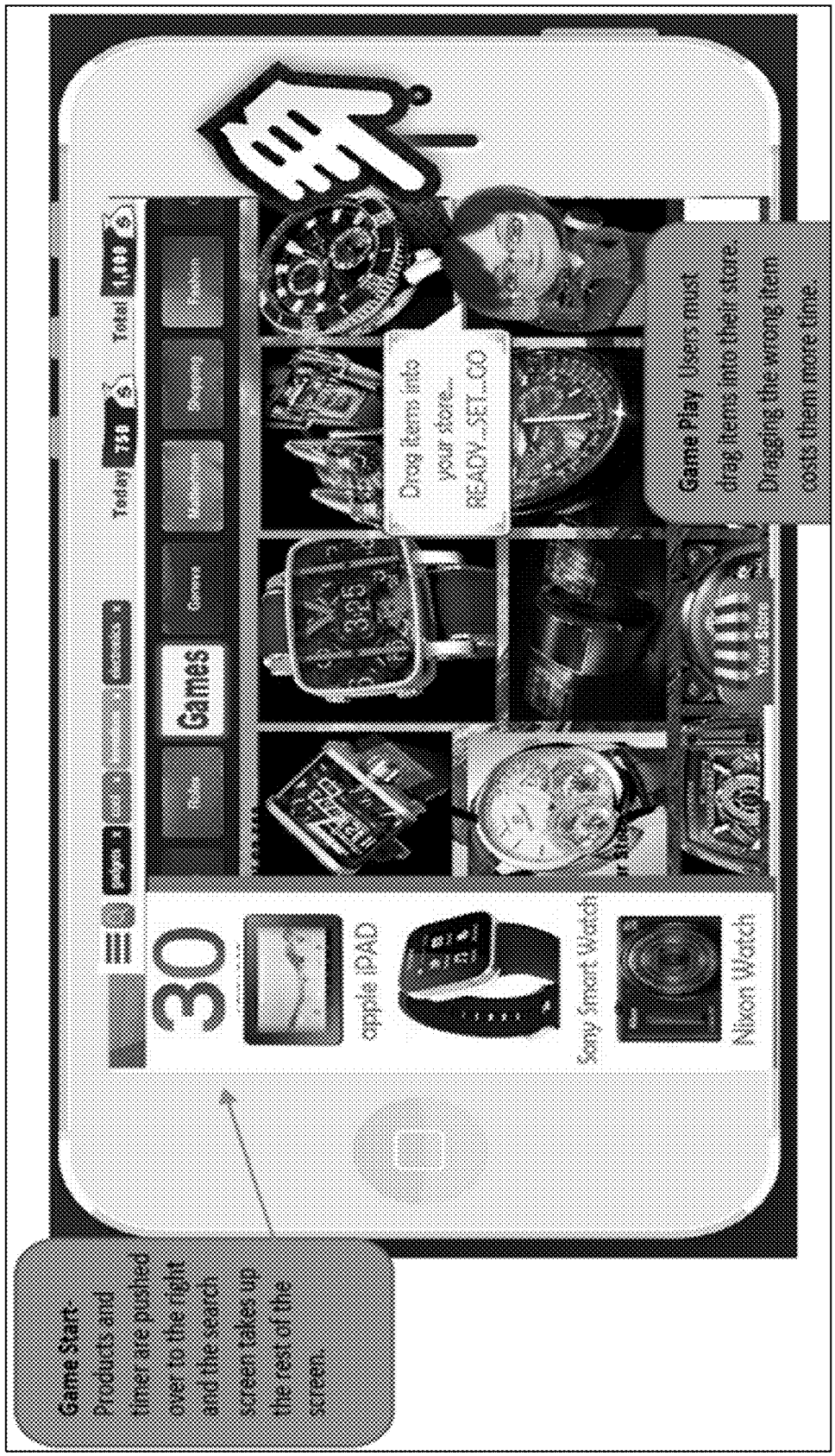
Figure 15B:
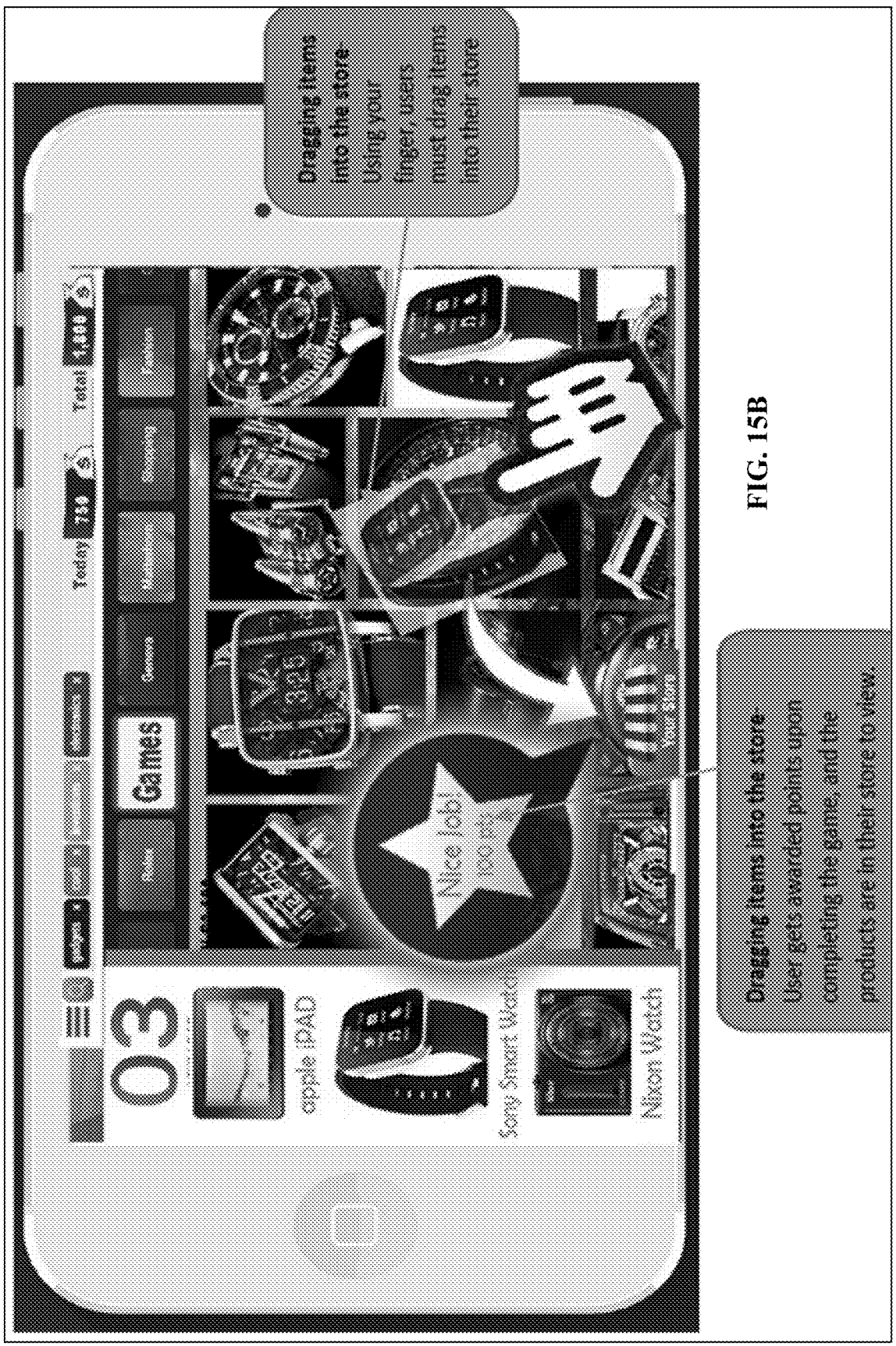
Figure 16A:
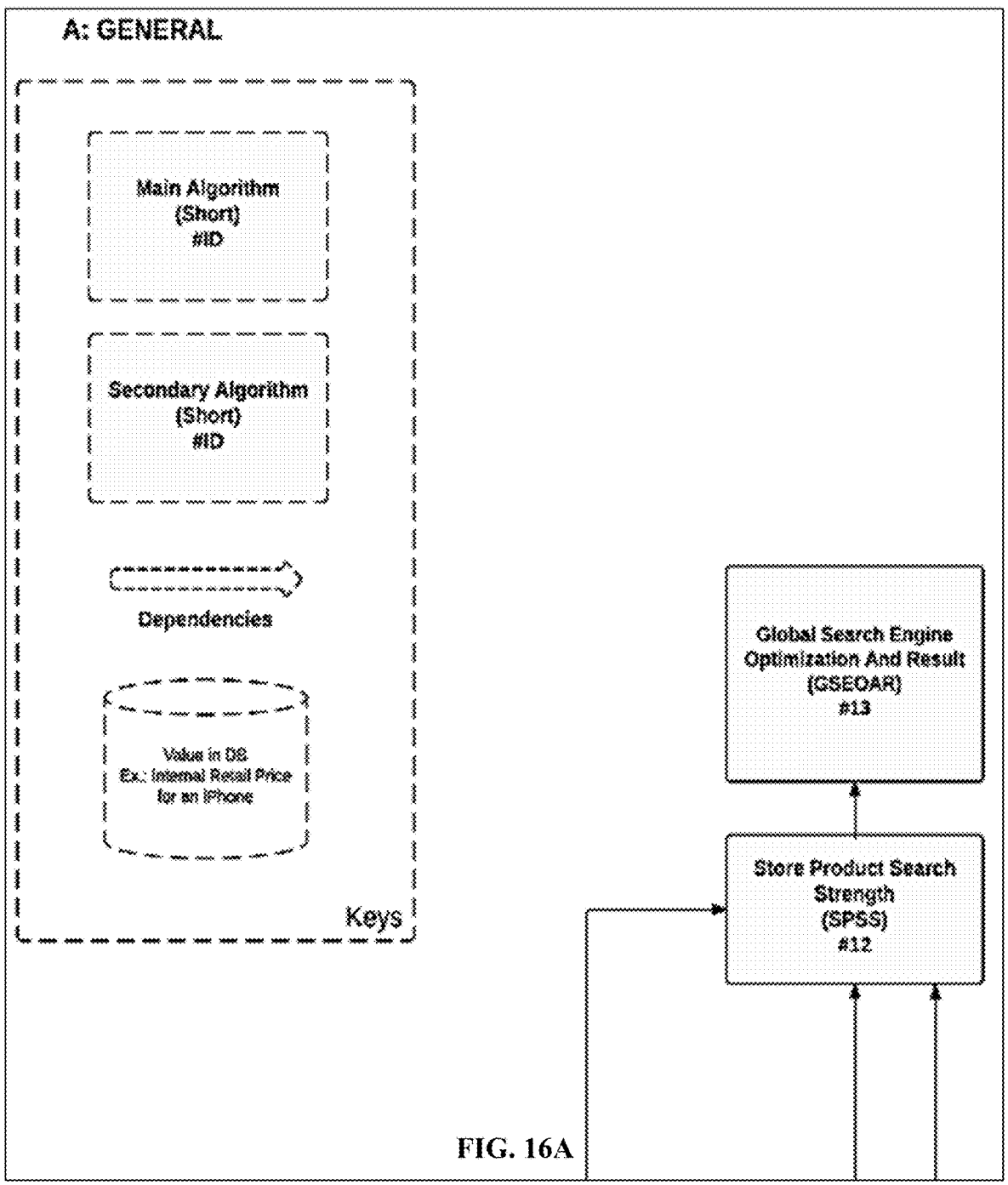
Figure 16B:
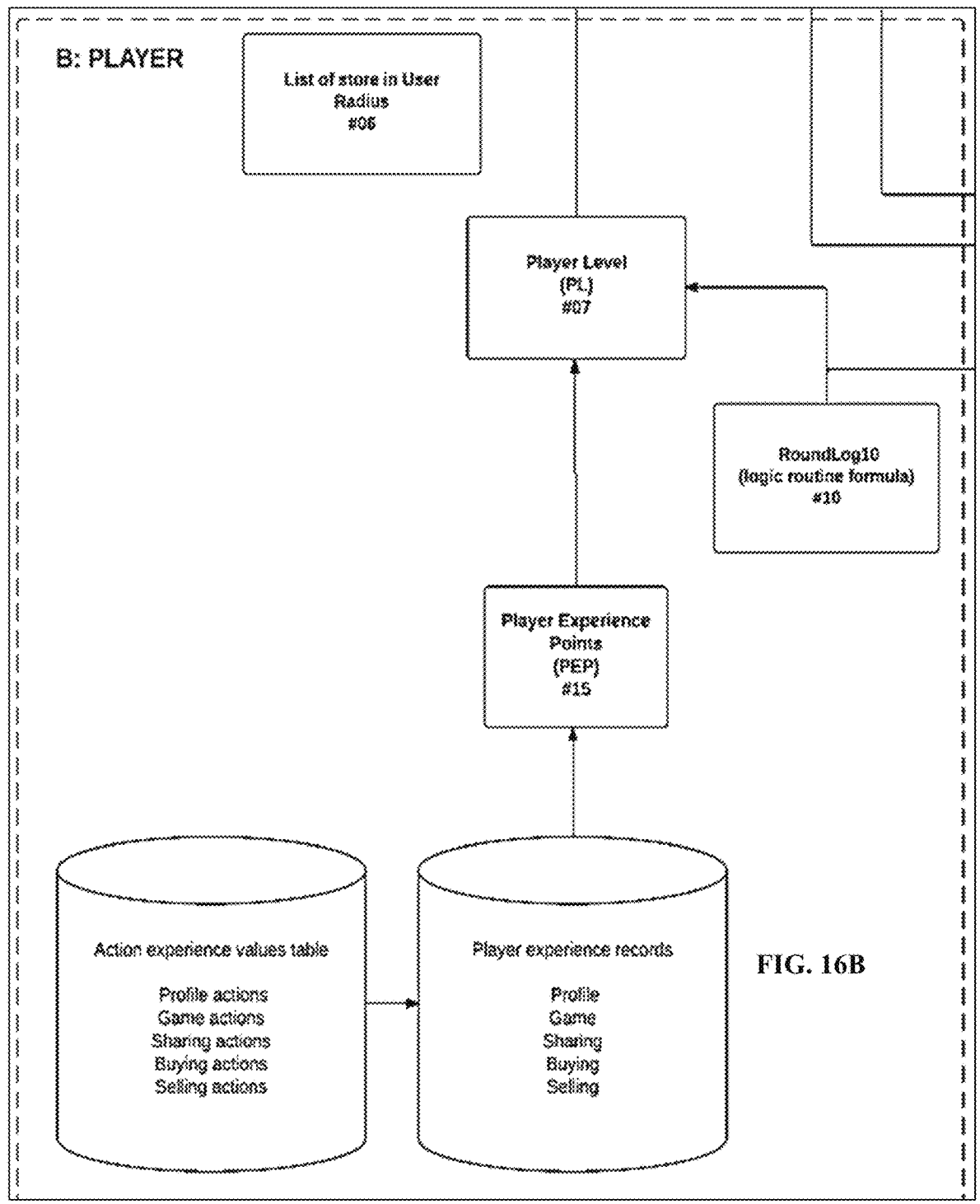
Figure 16C:
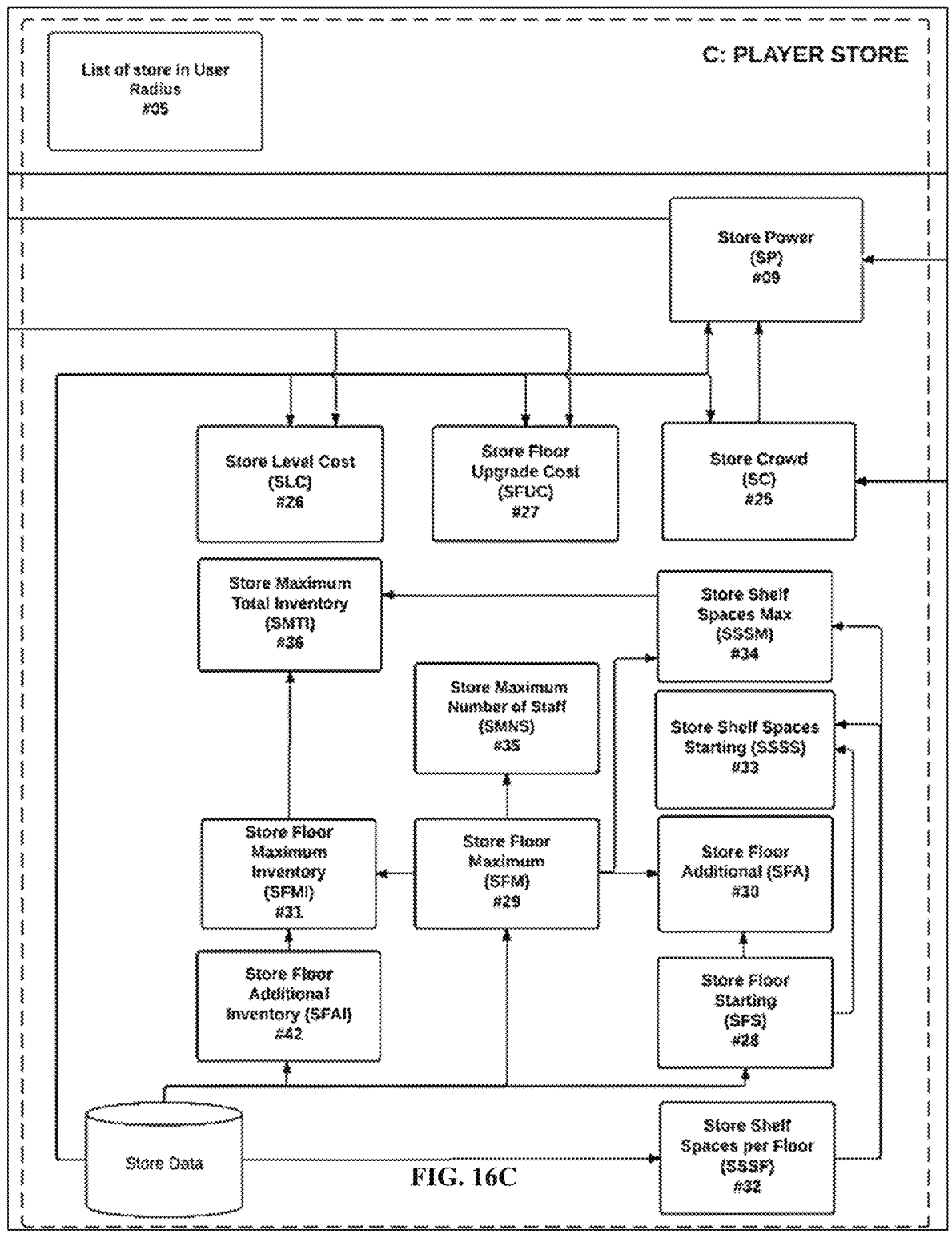
Figure 16D:
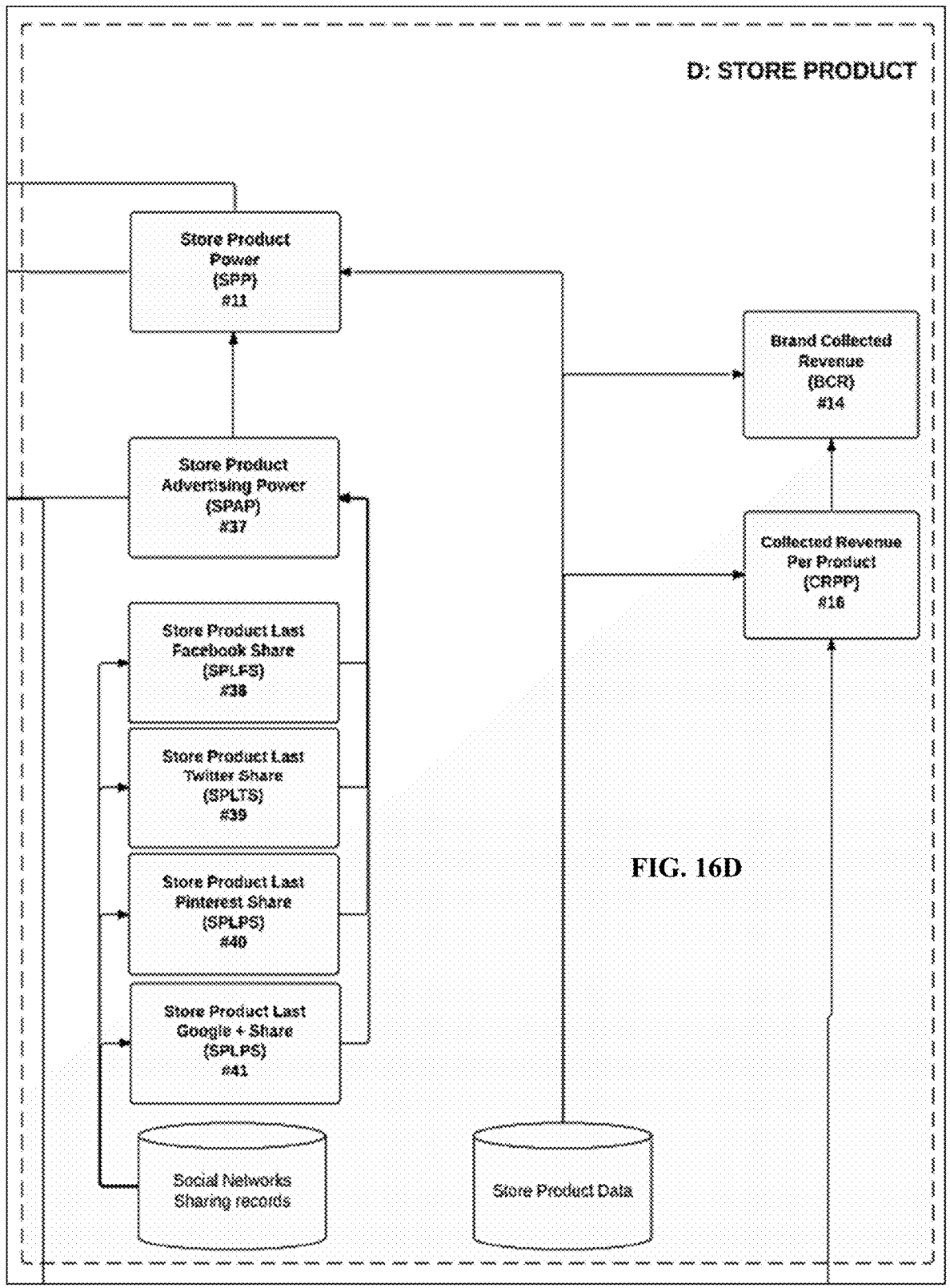
Figure 16E:
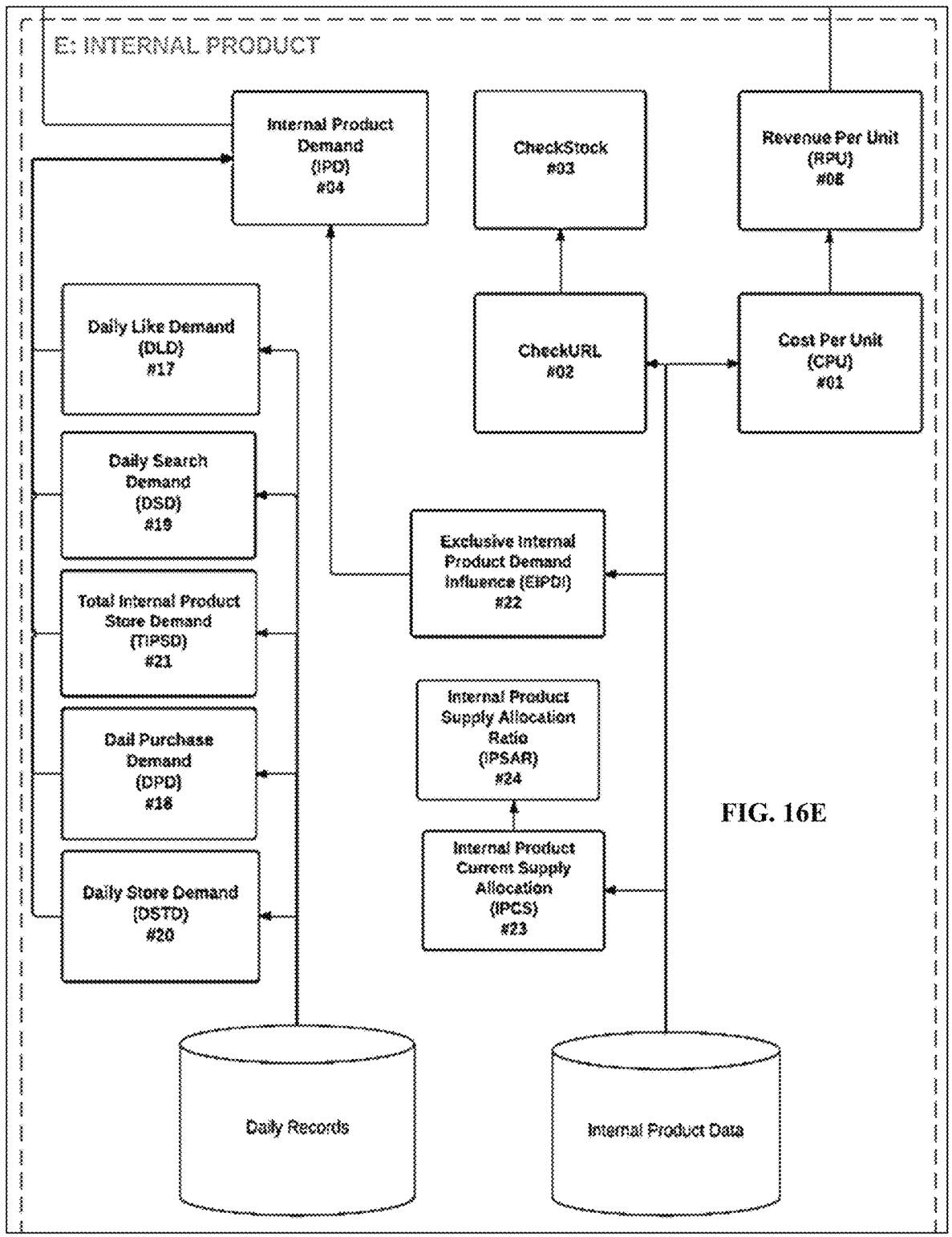

FIGS. 15A and 15B illustrate embodiments of the present invention, showing additional features of the system regarding a mini-game on the GUI.

An Illustrative Example of PRODUCT PLACEMENT PRIORITY (PPP) in Accordance with Some Embodiments of the Present Invention In some embodiments, the PPP determines each products placement and/or relative size in a search result and/or the generic news feed. For example, Each Product will have a PPP score which is used as a seed value for the Ranking or Placement in the search result. For example, the PPP Score can be calculated as follows:

PPP Score=(Product Value+Product Advertisement Value+Player Status Value+Store Value)*random number.

In some embodiments, the illustrative inventive programmed virtual platform of the present invention can assign a Product Value (e.g., but not limited to, scored as values from 1-100) to each product or service. For example, the Product Value is a value attributed to a unique product or service, and is independent of the store or player's actions. This is a global value stored with the product or service itself and every store that caries it will have this same value.

Below are illustrative exemplary non-limiting calculations that are related to the Product Value parameter and can be utilized by the illustrative inventive programmed virtual platform of the present invention to manage the displayed visual output:

1) Product Value=Quality Rating+Profitability
2) Quality Rating=Reviews Score+Return Percentage+Stores Listed
3) Review Score=(Sales−Returns)/Sales*Return Factor+Review Rating*Review Factor
4) Review Rating=Vendor Product Rating*Review Factor
5) Review Factor=set to integer (start at 100)
6) Vendor Product Rating=Unique to each supplier. Normalize Scale from (0-1)
7) Profitability=List Price/Our Cost*Profit Factor
8) Profit Factor=set to integer (start at 100)
9) Stores Listed=Appearance in All Stores/Total Players*Listed Factor
10) Listed Factor=set to integer (start at 100)
11) Product Advertisement Value=Number of Unique Shares*Ad Factor
12) Ad Factor=set to integer (start at 100)
13) Player Status Value=Sum of all Bling Points (or activity points)*Player Status Factor
14) Player Status Factor=set to integer (start at 100)
15) Product Image Size: Image size keeps same aspect ratio as original. The original long axis of the image is scaled to 600 pixels and then further scaled to a value between 20-100% using the Image Scale Factor of that size during run time. In some embodiments, the illustrative inventive programmed virtual platform of the present invention can manipulate Images to put them into a collage to fit within viewing space; therefore, maximizing the screen space coverage.
16) Image Scale Factor=PPP score (normalized between 20% and 100% of 600 pixels) and then rounded to values that are multiples of 25 pixels with a max size of 600 pixels.

An Illustrative Example of Algorithm-Driven Rule Engine Implementation in Accordance with Some Embodiments of the Present Invention (FIG. 16)

Tables 1 lists various algorithms that the illustrative inventive programmed virtual platform of the present invention can utilize in accordance with some embodiments of the present invention, as outlined in an exemplary workflow of FIG. 16 (parts 16A-16E), to manage at least 1) the players activities and product/service-related actions within the game environment and 2) a manner how the game environment interfaces with other computer systems (e.g., inventory management/fulfillment systems of actual real-life businesses).

TABLE 1

| 1 | Cost Per Unit | CPU |
|---|---|---|
| 2 | CheckURL | CheckURL |
| 3 | CheckStock | CheckStock |
| 4 | Internal Product Demand | IPD |
| 5 | List of Stores in Search Radius | |
| 6 | List of Stores in User Radius | |
| 7 | Player Level | PL |
| 8 | Revenue Per unit | RPU |
| 9 | Store Power | SP |
| 10 | RoundLog10 | RoundLog10 |
| 11 | Store Product Power | SPP |
| 12 | Store Product Search Strength | SPSS |
| 13 | Global Search Engine Optimization And Result | GSEOAR |
| 14 | Brand Collected Revenue | BCR |
| 15 | Player Experience Points | PEP |
| 16 | Collected Revenue Per Product | CRPP |
| 17 | Daily Like Demand | DLD |
| 18 | Daily Purchase Demand | DPD |
| 19 | Daily Search Demand | DSD |
| 20 | Daily Store Demand | DSTD |
| 21 | Total Internal Product Store Demand | TIPSD |
| 22 | Exclusive Internal Product Demand Influence | EIPDI |
| 23 | Internal Product Current Supply Allocation | IPCS |
| 24 | Internal Product Supply Allocation Ratio | IPSAR |
| 25 | Store Crowd | SC |
| 26 | Store Level Cost (SLC) | SLC |
| 27 | Store Floor Upgrade Cost (SFUC) | SFUC |
| 28 | Store Floor Starting (SFS) | SFS |
| 29 | Store Floor Maximum (SFM) | SFM |
| 30 | Store Floor Additional (SFA) | SFA |
| 31 | Store Floor Maximum Inventory (SFMI) | SFMI |

TABLE 1-continued

| | | |
|---|---|---|
| 32 | Store Shelf Spaces per Floor (SSSF) | SSSF |
| 33 | Store Shelf Spaces Starting (SSSS) | SSSS |
| 34 | Store Shelf Spaces Max (SSSM) | SSSM |
| 35 | Store Maximum Number of Staff (SMNS) | SMNS |
| 36 | Store Maximum Total Inventory (SMTI) | SMTI |
| 37 | Store Product Advertising Power | SPAP |
| 38 | Store Product Last Facebook Share | SPLFS |
| 39 | Store Product Last Twitter Share | SPLTS |
| 40 | Store Product Last Pinterrest Share | SPLPS |
| 41 | Store Product Last Google +Share | SPLGS |
| 42 | Store Floor Additional Inventory | SFAI |

Tables 2-42 illustrate operational details for various algorithms listed in Table 1.

TABLE 2

| | |
|---|---|
| Algorithm ID | 01 |
| Name | Cost Per Unit |
| Short | CPU |
| Summary | Cost for one unit of an Internal product at a time (in Stocket Bucks) |
| Detail Description | Cost per unit indicates the cost of one virtual good that is carried in a store. This cost is based upon the real retail cost of the good, if available and then multiplied by a random factor that has an effect of some products being more profitable than others. The Cost Per Unit is set as a fraction of the Retail Cost and is calculated be the Retail Cost divided by the Retail Cost Factor. |
| Formula | =Retail Cost/Retail Cost Factor |

TABLE 3

| | |
|---|---|
| Algorithm ID | 02 |
| Name | CheckURL |
| Short | CheckURL |
| Summary | Check a product URL |
| Detail Description | Check if a product URL is still valid |
| Formula | Check internet<br>Call Product URL, if return HTTP error return false, if HTTP OK, return true Check Native URL |

TABLE 4

| | |
|---|---|
| Algorithm ID | 03 |
| Name | CheckStock |
| Short | CheckStock |
| Summary | Check is a product is still valid or not |
| Detail Description | Check if a product still exist in the system and remove it if necessary |
| Formula | The Internal Product has a double value element with functions: InternalProductValidation<br>Value 1: Date of Last Check<br>Value 2: LastValidation<br>Function Check Stock<br>case 1: Date of last Check = Today<br>return LastValidation<br>case 2: Date of last Check = Not today<br>LastValidation = CheckURL(productID)<br>DateofLastCheck = today<br>return LastValidation |

TABLE 5

| | |
|---|---|
| Algorithm ID | 04 |
| Name | Internal Product Demand |
| Short | IPD |
| Summary | Level of product demand |
| Detail Description | The Internal Product Demand Measures the relative demand of a given product in the system. The higher the demand, the higher it's GSEOaR will be as well as many other functions in the system that utilize Product Demand, these include Crowd Size and Virtual Sales Volumes. |
| Formula | The calculation of the Out is the following:<br>temp_level = 0<br>temp_level += search_demand_weight * DSD result<br>temp_level += store_demand_weight * DSTD result<br>temp_level += purchase_demand_weight * DPD result<br>temp_level += like_demand_weight * DLD result<br>temp_level += total_ip_demand_weight * TIPSD result<br>temp_level = temp_level*EIPDI<br>level = max 10 ( | temp_level/ level_demand_increment | )<br>Out = level |

TABLE 6

| | |
|---|---|
| Algorithm ID | 05 |
| Name | List of Stores in Search Radius |
| Short | |
| Summary | returns users and stores in a circular area based on the user's location and out to a distance or the Search Radius |
| Detail Description | The List of Stores in a Search Radius is a list of store names that is generated by a search result of a user. The Search Radius is a user defined distance from the users stated location outward, defining a circular search area. All stores in this search area are returned as a list of results of store names. As an example if the user sets the Search Radius to 20 miles, the search result returns all the users and their store names within a radius of 20 miles from the user's location. The result will return all users within the 20 mile search radius. |
| Formula | Ordered List |

TABLE 7

| | |
|---|---|
| Algorithm ID | 06 |
| Name | List of Stores in User Radius |
| Short | |
| Summary | returns users and stores in a circular area up to the number of of users specified in the user radius. The result returns the closest users expanding outward from the user until the number specified is met. |
| Detail Description | The List of Stores in a User Radius is a list of store names that is generated by a search result of a user. The Search User Radius is a user defined number of Users radiating outward from the users stated location outward, defining a circular search area. All Users and User's stores in this search area are returned as a list of results of store names. As an example if the user sets the User Radius to 20, the search result is the closest other 20 users, near the user's location. The result will be limited to only 20 users regardless of distance to the user. |
| Formula | Ordered List |

TABLE 8

| | |
|---|---|
| Algorithm ID | 07 |
| Name | Player Level |
| Short | PL |
| Summary | Player level calculation |
| Detail Description | The Player Level is an indication of the player's experience and effort in the application. Currently this is capped at level 20. As the player level increases, the player's points and opportunity to earn additional revenue is increased. A player's commission and cash back on sales is based on a linear equation of the players level with the maximum awarded to a player at level 20. A player's level is determined by an algorithm and is based on experience earned with game play and shopping behavior. This includes buying products, searching for products, advertising products, upgrading a store and city, adding followers, adding new products sharing products, stocking products and earning virtual currency. |
| Formula | Experience Points needed to get this level: RoundLog10(player_factor_exponential^player level-2)*player_factor_base) |

TABLE 9

| | |
|---|---|
| Algorithm ID | 08 |
| Name | Revenue_Per_unit |
| Short | RPU |
| Summary | Revenu Per Unit in function of the CPU calculated with a random factor |
| Detail Description | Revenue per unit, simple linear equation of the cost with a factor. The basic calculation is the cost per unit times the product demand. A random value is also added along with any modifiers set by the system. |
| Formula | RPU = Integer roundup [IPD × (CPU + (Random (1,Max Rev))) × Product Revenue Special Factor] Max Rev = Maximum Revenue set for all products in super admin as INT, start at a value of 100 Product Revenue Special Factor = Special game characteristic for that product. Maybe due to a promotion we are running or in game event. This is set to one normally. If other than one, we may need to apply a time factor to it, whereas the special runs for a limited amount of time then reverts to 1. IMPORTANT: The RPU is set when the product is ingested the first time then it doesn't change |

TABLE 10

| | |
|---|---|
| Algorithm ID | 09 |
| Name | Store Power |
| Short | SP |
| Summary | Power of one store depending on the Store Crowd |
| Detail Description | |
| Formula | total = 0 total += store_brand_factor*nob total += store_crowd_factor*SC total += store_product_power_factor*tpp return total*store_level*store_level_factor using: nob = ΣBrand Number of Brand in the Mall tpp = ΣSPP Total Product Power sl Store Level |

TABLE 11

| | |
|---|---|
| Algorithm ID | 10 |
| Name | RoundLog10 |
| Short | RoundLog10 |
| Summary | Log10 Round |
| Detail Description | With this formula we can have a number round at his maximum digit (178863 will be round 200000) |
| Formula | = round(x, -ROUNDDOWN(log(x)/log(10),0)) |

TABLE 12

| | |
|---|---|
| Algorithm ID | 11 |
| Name | Store Product Power |
| Short | SPP |
| Summary | Product game power will influence Store power |
| Detail Description | The Store Product Power (unique product) is the sum of the product demand and the store advertising power, multiplied by the exclusive strength of the product. |
| Formula | Store Product Power = [IPD + SPAP] * SPEM SPEM if no exclusive 1 If copper exclusive 2 if silver exclusive 4 if gold exclusive 10 |

TABLE 13

| | |
|---|---|
| Algorithm ID | 12 |
| Name | Store Product Search Strength |
| Short | SPSS |
| Summary | = Racking Level in the search competition |
| Detail Description | The "Store Product Search Strength" Algorithm will define the power of a product for the competition with other products, the highest power wins the search competition. It's the store power * the player power (player level) * store product power |
| Formula | SPSS = SP*PL*SPP |

TABLE 14

| | |
|---|---|
| Algorithm ID | 13 |
| Name | Global Search Engine Optimization And Result |
| Short | GSEOAR |
| Summary | Search result sorting system |
| Detail Description | Global ranking system that ranks individual products against other products in the system. When a search for a product is conducted, all products that meet the search criteria are returned in an ordered list. This list is generated by comparing the Store Product Search Strength against the other results. These are then displayed in an ordered list with the highest ranked product returned a the top of the list and progressing downward to lower ranked products. |
| Formula | Ranking System: 1/ Each store holding this product (having this store product) is in the competition 2/ Each store have a specific SPSS for this product 3/ The store with the highest SPSS win the competition 4/ If 2 or more best store have equal SPSS the biggest crowd is the winner, if equal a random system is used |

TABLE 15

| | |
|---|---|
| Algorithm ID | 14 |
| Name | Brand Collected Revenue |
| Short | BCR |
| Summary | Aggregation of Virtual Sales for Each Brand Store (goes to zero after moved to bank) |
| Detail Description | Aggregation of Virtual Sales for Each Brand Store (goes to zero after moved to bank) |
| Formula | The BCR is the sum of CRPP for this brand<br>Function 1: How many Stocket Bucks inside the BCR<br>Function 2: Empty the BCR<br>The atomicity of these functions is not a priority as the real numbers are not visible to the user |

TABLE 16

| | |
|---|---|
| Algorithm ID | 15 |
| Name | Player Experience Point |
| Short | PEP |
| Summary | Aggregation of Player Action as experience point |
| Detail Description | Aggregation of Player Actions stored in the Database and linked to the player ID |
| Formula | The PEP is the sum of the following actions using a table of corresponding Experience points:<br>Profile actions<br>Game actions<br>Sharing actions<br>Buying actions<br>Selling actions |

TABLE 17

| | |
|---|---|
| Algorithm ID | 16 |
| Name | Collected Revenue Per Product |
| Short | CRPP |
| Summary | Sum of RPU on a product basis (goes to zero after moved to bank)<br>Buffer/Collection of RPU for a product |
| Detail Description | Sum of RPU on a product basis (goes to zero after moved to bank)<br>Buffer/Collection of RPU for a product |
| Formula | The CRPP is basically a buffer to collect the RPU upon generation. 2 functions:<br>Function 1: How many Stocket Bucks inside the the CRPP<br>Function 2: Empty the CRPP<br>The atomicity of these functions is not a priority as the real numbers are not visible to the user |

TABLE 18

| | |
|---|---|
| Algorithm ID | 17 |
| Name | Daily Like Demand |
| Short | DLD |
| Summary | Level of like demand for an internal product GLOBAL |
| Detail Description | The Like Demand measures the number of times users have expressed that they like the product over a given time period and is then averaged and weighted. Like Demand is a calculation of the number of likes a unique product acquires over a given time period and then multiplied by the like_demand_weight_factor. The Like Demand is a factor in determining overall product demand for a given product and contributes to the Global Search Engine Optimization and Results calculations (GSEOaR). A high Like Demand will boost product demand as well as the product's GSEOaR. |

TABLE 18-continued

| | |
|---|---|
| Formula | get UT current day<br>sum like value for day - 1 to day −1 - demand time interval<br>result = | like search value/ demand_time_interval |<br>Out = result |

TABLE 19

| | |
|---|---|
| Algorithm ID | 18 |
| Name | Daily Purchase Demand |
| Short | DPD |
| Summary | Level of purchase demand for an internal product GLOBAL |
| Detail Description | The Daily Purchase Demand indicates the actual number of purchases of the given product. These are real purchases and not virtual purchases. These are tracked both by internal means and by external product suppliers and represent sales generated by users of the system. As product sales increase, the relative worth of that product increases. This is represented both in the demand of the product, the amount of virtual sales that are made for the product and by virtual crowds attributed to the product. |
| Formula | get UT current day<br>sum purchase value for day - 1 to day −1 - demand_time_interval<br>result = | sum purchase value/ demand_time_interval |<br>Out = result |

TABLE 20

| | |
|---|---|
| Algorithm ID | 19 |
| Name | Daily Search Demand |
| Short | DSD |
| Summary | Level of search demand for an internal product GLOBAL |
| Detail Description | The Daily Search Demand indicates the number of times the product is present in a search result. Search results may occur by searching for a product name, brand name, keyword, tag, associated user or store name, related product or other methods. Search Demand is aggregated on a daily basis and reset. Increased search demand increases a product's overall demand as well as its GSEOaR. |
| Formula | get UT current day<br>sum search value for day - 1 to day −1 - demand_time_interval<br>result = | sum search value/ demand_time_interval |<br>Out = result |

TABLE 21

| | |
|---|---|
| Algorithm ID | 20 |
| Name | Daily Store Demand |
| Short | DSTD |
| Summary | Level of store demand for an internal product GLOBAL |
| Detail Description | The Daily Store Demand is a measure of the number of unique stores that carry the given product. The greater the number of stores the product is carried in, the greater the product demand will be and its GSEOaR.<br>store_value = Internal Product Total Added to Store - Internal Product Total Removed from store (if != 0 |0) |

TABLE 21-continued

| | |
|---|---|
| Formula | sum store_value for day - 1 to day -1 - demand_time_interval |
| | result = \| sum store value/ demand_time_interval \| |
| | Out = result |

TABLE 22

| | |
|---|---|
| Algorithm ID | 21 |
| Name | Total Internal Product Store Demand |
| Short | TIPSD |
| Summary | Simple agregator of store demand |
| Detail Description | This algorithm is a simple data set/get algorithm to keep track of the total store with this product on a shelf |
| Formula | If add: +1 to this agregator, It's call when: a product is added to a store |
| | If remove: −1 to this agregator, it's call when: a product is remove from a store (by the user/by the depletion + outdated product with checkstock) |
| | if get : return agregator |

TABLE 23

| | |
|---|---|
| Algorithm ID | 22 |
| Name | Exclusive Internal Product Demand Influence |
| Short | EIPDI |
| Summary | Simple table value |
| Detail Description | This algorithm return the internal product modifier for a exclusive product |
| Formula | if no exclusive     1 |
| | If copper exclusive  1.1 |
| | if silver exclusive  1.2 |
| | if gold exclusive    1.4 |

TABLE 24

| | |
|---|---|
| Algorithm ID | 23 |
| Name | Internal Product Current Supply Allocation |
| Short | IPCS |
| Summary | Number of product currently in the game |
| Detail Description | The Internal Product Current Supply Allocation measures the current level of inventory of virtual goods in the system. This allocation is increased as product demand increases. The system allows for 10,000 virtual units for each level of demand for the product. |
| Formula | set is a table lookup value |
| | get is '= Σ Inventory(Product Type) |

TABLE 25

| | |
|---|---|
| Algorithm ID | 24 |
| Name | Internal Product Supply Allocation Ratio |
| Short | IPSAR |
| Summary | % of internal product supply inventory/current supply allocation |
| Detail Description | The Internal Product Supply Allocation Ratio is a percentage of the entire product allocation currently in inventory in users stores. This ratio is an indication of how active users are restocking the given product. This indirectly is related to overall product activity and product demand. |
| Formula | % ( internal product supply inventory)/IPCS |

TABLE 26

| | |
|---|---|
| Algorithm ID | 25 |
| Name | Store Crowd |
| Short | SC |
| Summary | This is the sum of the store crowd |
| Detail Description | The Store Crowd is the sum of all the factors that add crowd to the store. |
| | The factors include the Product Demand, the store followers, the sum of the store product advertising power and city upgrades. |
| Formula | total = 0 |
| | total += [Σ internal products demand (IPD) in the mall] * crowd_product_weight |
| | total += [Σ user followers] * crowd_followers_weight |
| | total += [Σ SPAP]* crowd_adv_weight |
| | total += [Σ city upgrades]* crowd_city_upgrades_weight |
| | total += [Σ store upgrades] * crowd_store_upgrades_weight |
| | total = round(total) |
| | Note: The crowd maximum visible is set to a variable crowd_maximum_visible |
| | Note: City upgrades are city discoverable |

TABLE 27

| | |
|---|---|
| Algorithm ID | 26 |
| Name | Store Level Cost (SLC) |
| Short | SLC |
| Summary | Cost of Building |
| Detail Description | The is the cost of the building at the designated level. |
| Formula | =RoundLog10(store_cost_exponentiel$^{\wedge}$(store level-1)*store_cost_factor) |

TABLE 28

| | |
|---|---|
| Algorithm ID | 27 |
| Name | Store Floor Upgrade Cost (SFUC) |
| Short | SFUC |
| Summary | Cost per floor (additional) |
| Detail Description | Cost to add an additional floor at the current building level. |
| Formula | =RoundLog10(store_cost_floor_exponentiel$^{\wedge}$(store level-1)*store_cost_floor_factor) |

TABLE 29

| | |
|---|---|
| Algorithm ID | 28 |
| Name | Store Floor Starting (SFS) |
| Short | SFS |
| Summary | Starting Number of Floors |
| Detail Description | Starting number of floors at the current building level. |
| Formula | rounddown(2$^{\wedge}$(store level-4)*10) |

TABLE 30

| | |
|---|---|
| Algorithm ID | 29 |
| Name | Store Floor Maximum (SFM) |
| Short | SFM |
| Summary | Maximum Number of Floors |
| Detail Description | Maximum number of floors of the building at its current level. |
| Formula | rounddown(2$^{\wedge}$(store level-3)*10) |

TABLE 31

| | |
|---|---|
| Algorithm ID | 30 |
| Name | Store Floor Additional (SFA) |
| Short | SFA |
| Summary | Difference between previous |
| Detail Description | Additional floors available to add to current building before reaching maximum at that level. |
| Formula | SFM (store level)- SFS (store level) |

TABLE 32

| | |
|---|---|
| Algorithm ID | 31 |
| Name | Store Floor Maximum Inventory (SFMI) |
| Short | SFMI |
| Summary | Maximum Inventory Per Product |
| Detail Description | Maximum inventory allowed on current store floor at the current building level. |
| Formula | SFM(store level)*SFAI(store level) |

TABLE 33

| | |
|---|---|
| Algorithm ID | 32 |
| Name | Store Shelf Spaces per Floor (SSSF) |
| Short | SSSF |
| Summary | Number of Products Per Floor |
| Detail Description | Number of Shelf Spaces are the number of products allowed on the current floor. |
| Formula | store level * 9 |

TABLE 34

| | |
|---|---|
| Algorithm ID | 33 |
| Name | Store Shelf Spaces Starting (SSSS) |
| Short | SSSS |
| Summary | Starting Number of product (level with not additional floor) |
| Detail Description | This is the base number of store shelves or products, that the building starts with at its current level. |
| Formula | SFS(store level)*SSSF(store level) |

TABLE 35

| | |
|---|---|
| Algorithm ID | 34 |
| Name | Store Shelf Spaces Max (SSSM) |
| Short | SSSM |
| Summary | Maximum Total Number Products (level with full additional floors) |
| Detail Description | The is the maximum number of shelves or products the store can carry at its current level, assuming all additional floors have been added. |
| Formula | SFM(store level)*SSSF(store level) |

TABLE 36

| | |
|---|---|
| Algorithm ID | 35 |
| Name | Store Maximum Number of Staff (SMNS) |
| Short | SMNS |
| Summary | Maximum number fo staff per floor (1 per floor) = SFM |
| Detail Description | The maximum number of staff allowed on current floor. |
| Formula | SFM (store level) |

TABLE 37

| | |
|---|---|
| Algorithm ID | 36 |
| Name | Store Maximum Total Inventory (SMTI) |
| Short | SMTI |
| Summary | Maximum inventory for a floor (info) |
| Detail Description | The total inventory allowed in the store at its current level assuming all floors have been added. |
| Formula | SSSM(store level)*SFMI(store level) |

TABLE 38

| | |
|---|---|
| Algorithm ID | 37 |
| Name | Store Product Advertising Power |
| Short | SPAP |
| Summary | Power of Adv. on a Product |
| Detail Description | The Store Product Advertising Power is the value boost to a product based on recent advertising activities by the user. Advertising efforts on social media platforms of a given product are added to the product power. Weight factors are used to boost different platforms as desirable. |
| Formula | if [(date of today − SPLFS) < active_time ] then total += facebook_weight<br>if [(date of today − SPLFS) < active_time ] then total += twitter_weight<br>if [(date of today − SPLFS) < active_time ] then total += pinterest_weight<br>if [(date of today − SPLFS) < active_time ] then total += google_plus_weight<br>return total |

TABLE 39

| | |
|---|---|
| Algorithm ID | 38 |
| Name | Store Product Last Facebook Share |
| Short | SPLFS |
| Summary | Date of last share on Facebook |
| Detail Description | This is just a date value, recording the date of the last sharing |
| Formula | date record |

TABLE 40

| | |
|---|---|
| Algorithm ID | 39 |
| Name | Store Product Last Twitter Share |
| Short | SPLTS |
| Summary | Date of last share on Twitter |
| Detail Description | This is just a date value, recording the date of the last sharing |
| Formula | date record |

TABLE 41

| | |
|---|---|
| Algorithm ID | 40 |
| Name | Store Product Last Pinterest Share |
| Short | SPLPS |
| Summary | Date of last share on Pinterest |
| Detail Description | This is just a date value, recording the date of the last sharing |
| Formula | date record |

TABLE 42

| | |
|---|---|
| Algorithm ID | 41 |
| Name | Store Product Last Google+ Share |
| Short | SPLGS |

TABLE 42-continued

| | |
|---|---|
| Summary | Date of last share on G |
| Detail Description | This is just a date value, recording the date of the last sharing |
| Formula | date record |

TABLE 43

| | |
|---|---|
| Algorithm ID | 42 |
| Name | Store Floor Additional Inventory |
| Short | SFAI |
| Summary | Simple linear value |
| Detail Description | Additional inventory for a floor, simple linear value with the store level |
| Formula | store_inventory_factor*sl + store_invetntory_factor_base |

Table 43 identifies certain values as constants which are utilized in the the illustrative algorithms of Tables 2-42.

TABLE 43

| Name | Description |
|---|---|
| coins_to_dollars | 1$ = 1000 coins |
| cost_factor | real $ to coins factor |
| demand_time_interval | demand calculation interval |
| first_search_radius | radius around the search define by the closest 'first_search_radius' number of stores |
| global_supply_allocation | Maximum supply for a store product in the game at all time |
| level_demand_increment | Step for each product base level step |
| like_demand_weight | weight for like demand * 0 for MVP |
| purchase_demand_weight | weight for purchase demand |
| search_demand_weight | Low level weight for search demand |
| store_cost_exponentiel | store cost expo factor |
| store_cost_factor | store cost multiply factor |
| store_cost_floor_exponentiel | store cost expo factor |
| store_cost_loor_factor | store cost multiply factor |
| store_demand_weight | Moderate weight for store demand |
| store_inventory_factor | 25 |
| store_invetntory_factor_base | 125 |
| store_shelf_factor | factor that will influence the store shelf size |
| supply_allocation_weight | Moderate weight for store demand |
| supply_exponentiel | internal supply expo factor |
| supply_factor | internal supply multiply factor |
| third_search_radius | radius around the search define by the closest 'third_search_radius' number of stores |
| third_search_radius_increment | incremental third_search_radius number of stores |
| total_ip_demand_weight | Moderate weight for total store demand |
| facebook_weight | weight of social product sharing in the store product power |
| twitter_weight | weight of social product sharing in the store product power |
| pinterest_weight | weight of social product sharing in the store product power |
| google_plus_weight | weight of social product sharing in the store product power |
| active_time | duration of the social sharing reward |
| crowd_product_weight | Crowd weight for each product |
| crowd_followers_weight | Crowd weight for each follower |
| crowd_adv_weight | Crowd weight for each adv |
| crowd_city_upgrades_weight | Crowd weight for each city upgrade |
| crowd_maximum_visible | |
| store_brand_factor | store power weight values |
| store_product_power_factor | store power weight values |
| store_crowd_factor | store power weight values |
| store_level_factor | store power weight values |
| player_factor_exponential | Player exponential factor for level calculation |
| player_factor_base | Player base factor for level calculation |
| retail_cost_factor | product cost factor |

An Illustrative Example for Digital Object Aggregation, Augmentation and Display of External Digital Content by a User in Accordance with Some Embodiments of the Present Invention In some embodiments, the illustrative inventive programmed virtual platform of the present invention provides a Graphical User Interface (GUI) that allows users to at least, but not limited to, 1) in real-time, identify, select, quantify, augment, organize, copy, edit, and/or reference external content (e.g., information (e.g., textual and/or image-based)) about a product and/or a service being sold/offered/advertised on a third party electronic resource (e.g., a website, an app, etc.), and 2) automatically, in real-time, generate a corresponding software object based on the external content and assign an object name to such software object for, for example but not limited to, tracking and/or manipulation of such object within the inventive gaming realm.

For example, user identifies objects from external sources that are of interest to the user, and that the user wishes to include in a user curated database of objects. In some embodiments, these objects might include, but not limited to, the digital representation of physical and electronic products, services, imagery, video, and audio content.

After the user has identified the Objects of interest, tools and widgets are provided by this method to copy, augment or reference these objects to be represented in a user curated dataset. For example, the illustrative inventive programmed virtual platform of the present invention can utilize a User Datastore which is a digital storage of aggregated content that is associated with a user (e.g., a unique user, a unique group of users). In some embodiments, the illustrative inventive programmed virtual platform of the present invention can utilize the same datastore as a database of objects to represent a digital eCommerce store, services site, and/or other suitable forms of a digital content compilations. In some embodiments, the illustrative inventive programmed virtual platform of the present invention can allow the user to digitally share the same datastore in a variety of methods including, but not limited to: social networks, digital games, email, SMS, Twitter™ and other similarly suitable ways. In some embodiments, the visual representation of the datastore includes websites, desktops, mobile platforms, game consoles, and other electronic software/hardware platforms.

Figure 17:
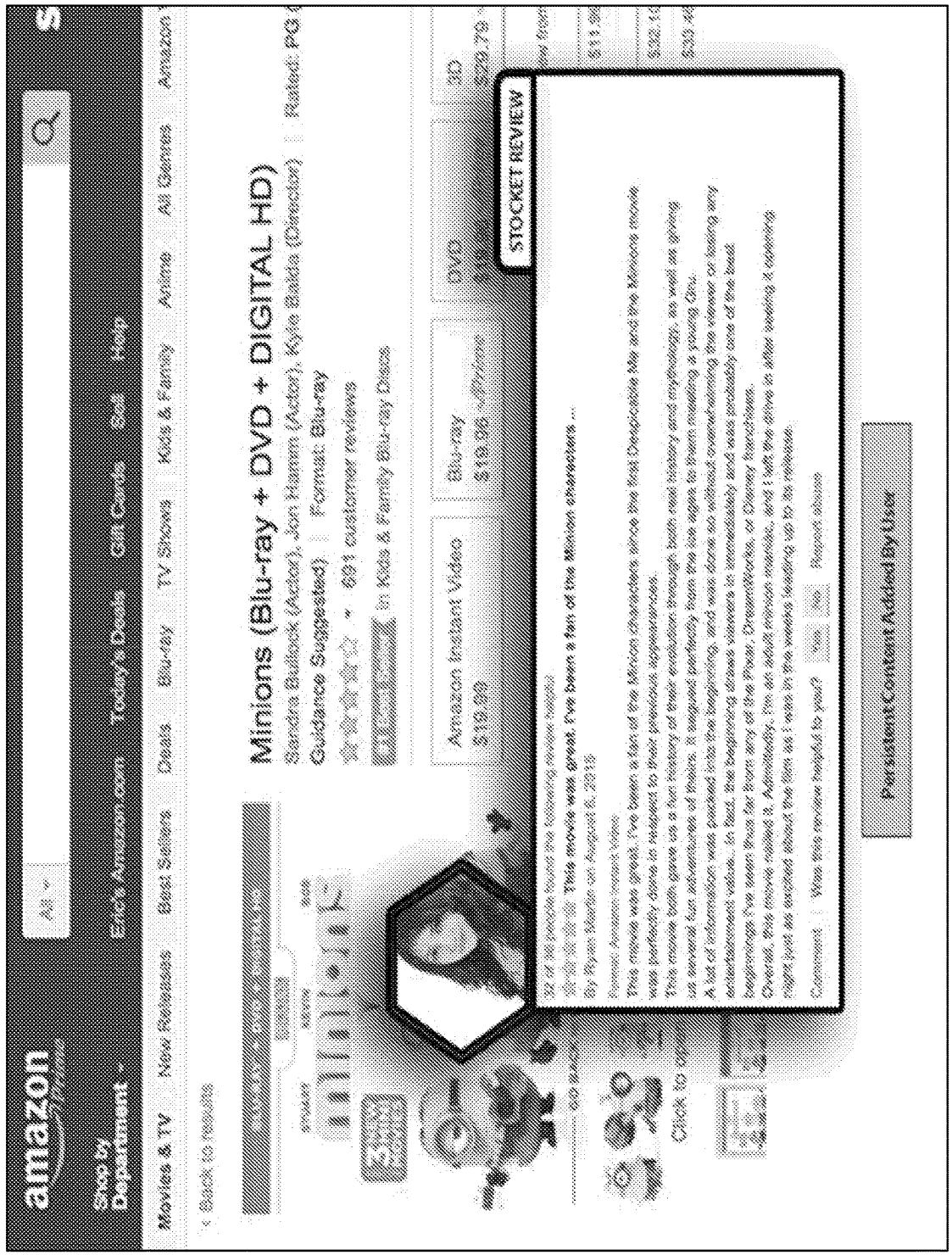

In some embodiments, user generated content as well as content created from the exemplary inventive platform may also be persistent on the external digital content site and discernible by other users of the illustrative system. For example, as shown in FIG. 17, a customer writes a review of a product found on an external site. This review is then viewable by other users. The following illustration example is based on an viewer's review of a movie posted on an external website which the user of the illustrative inventive programmed virtual platform of the present invention comes across and desires to incorporate into his or hers electronic virtual presence managed by the illustrative inventive programmed virtual platform of the present invention.

For example, an external digital object's content in the datastore may include some or all of the following illustrative types of data/information:
Title
URLs
Tracking Cookies
Transparent Data Stored on Target Site
Description
Cost
Inventory Remaining Items
Discount
Reviews
Dates
Social Data
Demographic Data
Content Codes Including:
  Product ID
  Product SKU
  Product Bar Code
  Product UPC
  Duration
  Sizes
  Colors
  Textures
  Materials
  Images
  Video
  Audio In some embodiments, the illustrative inventive programmed virtual platform of the present invention offers the user some of all of the following tools and widgets to allow user to:
Drag select items
Click to identify
Click to select
Add to store
Arrange
Edit
Augment
Comment
Replace
Sharing
Buying
Selling
Re-selling.

In some embodiments, the illustrative inventive programmed virtual platform of the present invention can utilize an illustrative webapp launcher code of Table 44 to allow the user to incorporate the external content into the user's activity within the inventive online realm.

Figure 18:

For example, the illustrative code of Table 44, on the application side (in this case the mobile in app web browser), the illustrative inventive programmed virtual platform of the present invention uses the user information (e.g., user id, store id) to create a Javascript [Method string BuildJavaScript (string whId)], which is interfaced with a third party's Application Programming Interface (API) that is used to add the displayed external digital content site. For example, FIG. 18 exemplifies the user content added to an external website. For example, in FIG. 18, the site, Sierra Trading Post, has 3 different symbol icons placed on the external site:

1) an S symbol (1801) indicates that the Object has identified by the user and the user may click to add this Object in the datastore;

2) the next icon (1802) indicates that the object already exists in the user's warehouse (archived datastore); and 3) the third symbol (1803) of the store represents that the object is in the user's active datastore.

For example, the illustrative code of [Method public void ShowWithJS (string url, string javaScr=" ", Action ponclose=null)] in Table 44 is utilized to add the external digital content to the inventive realm of the present invention which can be:

1) Additional Information
  Product exists in the current user's store
  Other user information that may include:
    Avatar
    Name
    Location
    Statistics
  Any additional game information that may include:
    Product owner
    Game rewards
  Any additional ecommerce information that may include:
    Rewards
    Coupons 2) Additional Actions
  Identify a product or a service
  Interact with other user (product owner)
  Any additional game action that may include:
    Add product to the store
    Remove product to the store
    Share
  Any additional ecommerce action that may include:
    Buy
    Sell
    Re-Sell
    Share on social network When the user interacts with the object on the external digital content site, through this javascript, the result of this interaction is available in the datastore. For example when adding a product, an action is triggered on a server side of the illustrative inventive programmed virtual platform of the present invention to add the product/service. For example, the illustrative added javascript of Table 44 will display a callback information of this action to at least allowing the standard website behavior after adding a product/service, and displaying the correct image of the store on the top of the product/service.

For example, the illustrative added javascript of [Callback in ShowWithJS: Action ponclose] in Table 44 is a call back that can include a request for additional information input from the user.

For example, the javascript in Table 44 only communicates with a server API of the illustrative inventive programmed virtual platform of the present invention and the illustrative datastore, then the mobile application synchronizes with the server API on exit of the in app web browser, by utilizing the javascript [ Method void_Close_WebView( )] in Table 44.

TABLE 44

```
using UnityEngine;
using System.Collections.Generic;
using UnityEngine.UI;
using System;
using Social Voucher;
```

TABLE 44-continued

```
using DG.Tweening;
public enum showOrigin {
        Unknow = 0,
        Warehouse,
        Store
}
public class WebViewLauncher : Singleton<WebViewLauncher>
{
  public UniWebView mainWebView;
  public Canvas _canvas;
        public RectTransform containerOfButtons;
        public GameObject background;
        string jsScr = " ";
        int sInsetUp = 0;
        int sInsetLeft = 0;
        int sInsetDown = 0;
        int sInsetRight = 0;
  List<GSDeactiveBrand> deactiveBrands = new List<GSDeactiveBrand> ( );
  string warehouseId = " "
        string brID = " ";
        showOrigin webFromView = showOrigin.Unknow;
  void Start ( )
  {
    GetDeactiveBrands ( );
        sInsetUp = (int)(containerOfButtons.GetHeight ( ) / _canvas.rectTransform
( ).GetHeight ( ) * UniWebViewHelper.screenHeight);
        // Workaround Android not calculating the tool bar size
        #if UNITY_ANDROID
        // add 48 for the android navigation bar
        sInsetUp += 48;
        #endif
        mainWebView = gameObject.GetComponent<UniWebView>( );
        mainWebView.OnLoadComplete += OnWebLoadComplete;
        mainWebView.insets = new UniWebViewEdgeInsets(sInsetUp,0,0,0);
  }
public void Show (string url, string brandID = " ", Action ponclose = null) {
        if (isBrandDeactivate (brandID)) {
            CommonUtils.ShowAlert ("This brand is not available yet, please come
back later!");
            return;
        }
        brID = brandID;
        UIManager.Instance.Desactivate3D ( );
        WareHouse wh = WareHouseManager.Instance.GetWareHouseOfLoginUser
(brandID);
        ShowWithJS (url, BuildJavaScript (wh !=null ? wh.sceneCode : " "), ponclose);
    }
  public void ShowFromView (string url, string brandID = " ", showOrigin ori =
showOrigin.Unknow)
    {
    if (isBrandDeactivate (brandID)) {
      CommonUtils.ShowAlert ("This brand is not available yet, please come back later!");
      return;
    }
        brID = brandID;
        webFromView = ori;
        UIManager.Instance.Desactivate3D ( );
    WareHouse wh = WareHouseManagerinstance.GetWareHouseOfLoginUser (brandID);
    ShowWithJS (url, BuildJavaScript (wh != null ? wh.sceneCode : " "), null);
  }
  public void ShowWithJS (string url, string javaScr=" ", Action ponclose = null)
  {
    CanvasManager.Instance.HideAllButThis (_canvas);
        gameObject.SetActive (true);
        background.SetActive (true);
        jsScr = javaScr;
        // Add loading call back for a new website
        mainWebView.OnLoadComplete -= OnWebLoadComplete;
        mainWebView.OnLoadComplete += OnWebLoadComplete;
        mainWebView.url = url;
        mainWebView.AddJavaScript(this.jsScr);
        mainWebView.Show ( );
        mainWebView.Load ( );
  }
  string BuildJavaScript (string whId)
  {
    warehouseId = whId;
    string domain = NetworkHelper.kGSdomainJavaScript;
        string javaStr = "javascript:(function
stockit(){document.body.appendChild(document.createElement('script')).src='" + domain + "?r='+
```

TABLE 44-continued

```
Math.floor(Math.random( )*999);document.body.appendChild(document.createElement('script')).
innerHTML = 'var whcode=\"_WAREHOUSE_CODE_\",storeid=\"_STORE ID"\,
access token=\"_ACCESSTOKEN_\";'}( );";
#if UNITY_EDITOR
        javaStr =
"javascript:(function( ){document.body.appendChild(document.createElement('script')).src='" +
domain + "?r=' +
Math.floor(Math.random( )*999);document.body.appendChild(document.createElement('script')).
innerHTML = 'var whcode=\"_WAREHOUSE_CODE_\",storeid=\"_STORE_ID\",
acces_ token=\"_ACCESSTOKEN_\";'}( );";
#endif
        javaStr = javaStr.Replace ("_WAREHOUSE_CODE_", whId);
    javaStr = javaStr.Replace ("_STORE_ID",
SharedDataManager.Instance.ShoppingMallData.Id);
    javaStr = javaStr.Replace ("_ACCESSTOKEN_",
NetworkHelper.Instance.AccessToken);
    return javaStr;
  }
  void GetDeactiveBrands ( )
  {
    NetworkHelper.Instance.GetDeactiveBrands ((response) => {
      if (response != null && response.Data != null) {
        deactiveBrands = response.Data;
      }
    });
  }
  bool isBrandDeactivate (string brandId)
  {
    for (int i = 0; i < deactiveBrands.Count; i++) {
      if (brandId == deactiveBrands [i].Id)
        return true;
    }
    return false;
  }
      public void OnClick_Next ( )
      {
          mainWebView.GoForward ( );
      }
      public void OnClick_Back ( )
      {
          mainWebView.GoBack ( );
      }
      public void OnClick_Reload ( )
      {
          mainWebView.Reload ( );
      }
      public void OnClick_Close( )
      {
          gameObject.SetActive (false);
          background.SetActive (false);
          _Close_WebView ( );
      }
      void _Close_Web_View( ) {
          // Must unactivate the webview ****
          mainWebView.Hide ( );
          // All this should be done with a lambda from the call (onClose Action) ***** To
Be Done
          UIManager.Instance.Activate3D ( );
    CanvasManager.Instance.RecoverPreviousStateOfCanvases ( );
    if (!NetworkHelper.Instance.isInVisitorMode ( )) {
            if (webFromView == showOrigin.Warehouse)
              // From the warehouse
              WareHouse wh =
WareHouseManager.Instance.GetWareHouseOfLoginUser (brID);
            WareHouseManager.Instance.ShowWarehouseView (wh);
          } else if (webFromView == showOrigin.Store) {
            // From the store
            // Refreshing Information from the web view
            SharedDataManager.Instance.UpdateUserStoreInfor ( );
            GSBrand brand = MallDirectoryManager.Instance.GetBrand
(brID);
            StoreDetailManager.Instance.InitStoreDetail
(MallDirectoryManager.Instance.StoreInfo, brand, !NetworkHelper.Instance.isInVisitorMode
( ));
          }
          // From all
          if ( warehouseId == "" {
          WareHouseManager.Instance.RefreshAllWarehouseStatus ( );
          }
      }
```

TABLE 44-continued

```
DOVirtual.DelayedCall (1f, ( ) => {
  Resources.UnloadUnusedAssets ( );
  System.GC.Collect ( );
});
}
// Delagates Methods
void OnDisable ( )
{
    if (mainWebView != null)
       mainWebView.OnLoadComplete -= OnWebLoadComplete;
}
public void OnClick_Buy ( )
{
    mainWebView.EvaluatingJavaScript ("TFR.toggleStockItBtn( );");
}
void OnWebLoadComplete (UniWebView webView, bool success, string errorMessage)
{
    webView.EvaluatingJavaScript ("stockit");
    #if UNITY_EDITOR
    webView.EvaluatingJavaScript (this.jsScr);
    #endif
}
void FinishEvalJavaScript (UniWebView webView, string result)
{
    Debug.Log ("UNINSLOG : Finished JS");
}
UniWebViewEdgeInsets InsetsForScreenOreitation (UniWebView webView,
UniWebViewOrientation orientation)
    {
        UniWebViewEdgeInsets insets = new UniWebViewEdgeInsets (sInsetUp,
sInsetLeft, sInsetDown, sInsetRight); // hard coding the up insets
        return insets;
    } }
```

Figure 19A:
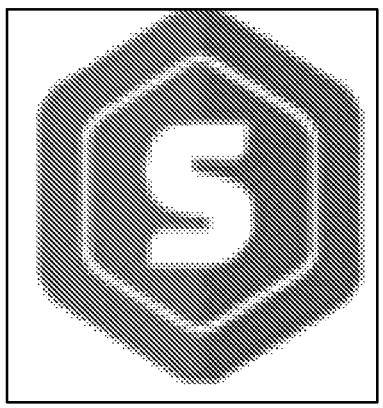

Illustrative Examples of Product/Service Object-Related Rules in Accordance with Some Embodiments of the Present Invention Adding Product/Service-Objects Case 1: If product does not exist in warehouse, not in store
Display Suckit icon in FIG. 19A
Add product to both warehouse and store (warehouse for that product's brand will be built automatically)

Figure 19B:

Case 2: If product exists in store:
Display an icon in FIG. 19B, and it's not clickable (i.e., do nothing)

Figure 19C:
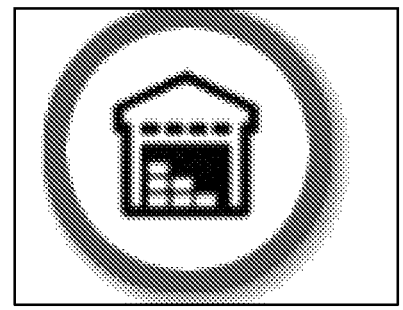
Figure 20:
Figure 21:
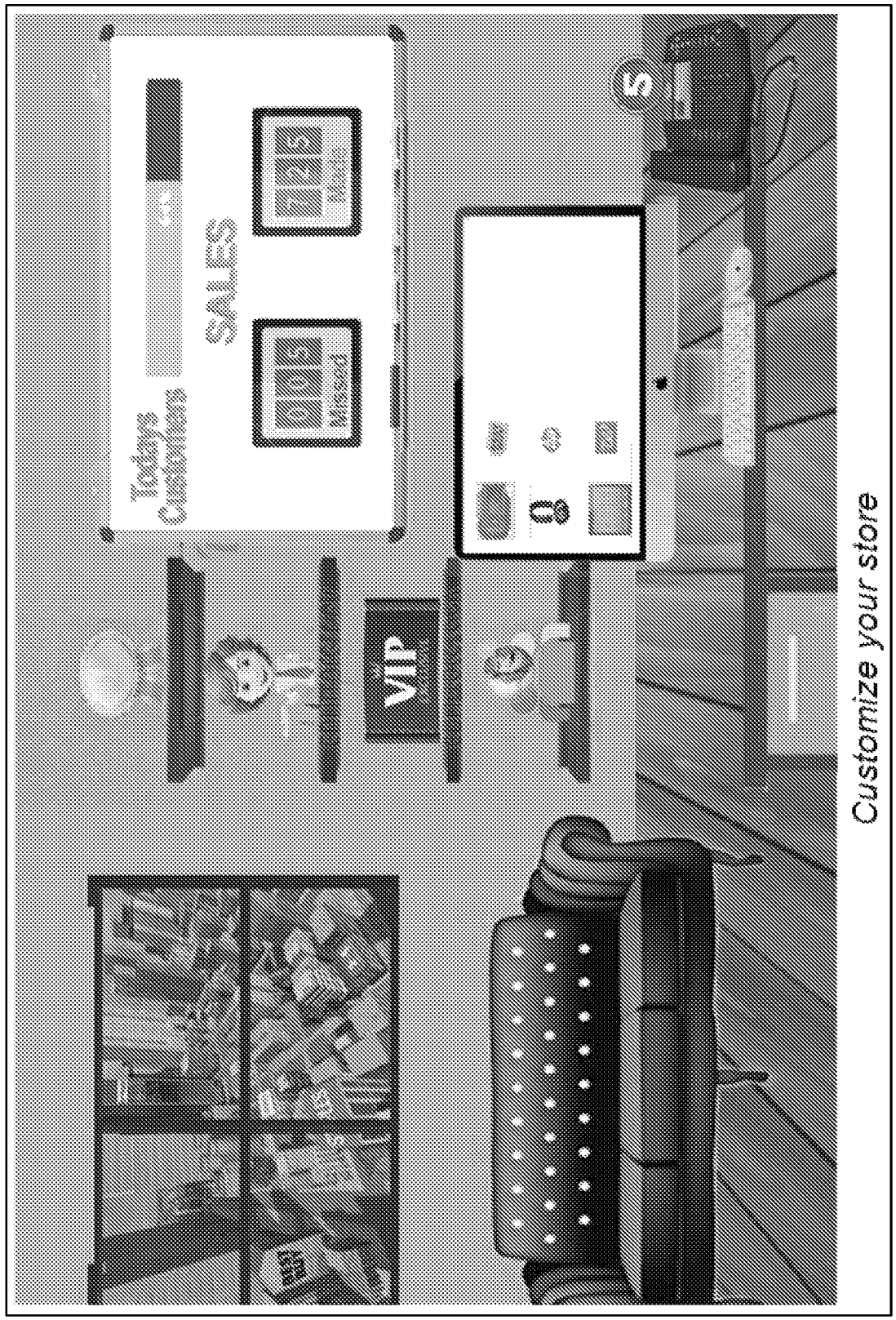
Figure 22:
Figure 23:
Figure 24:
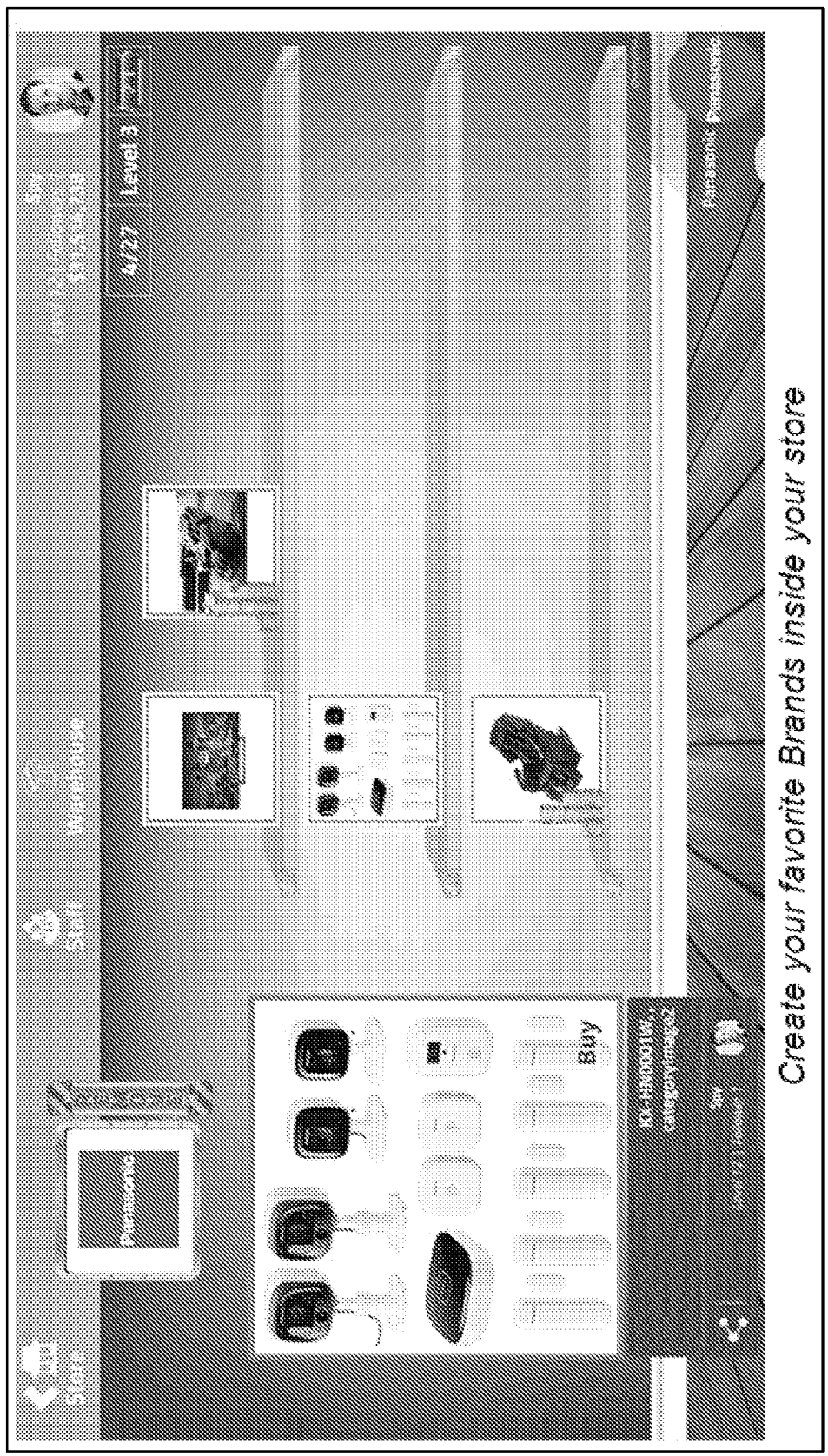
Figure 25:
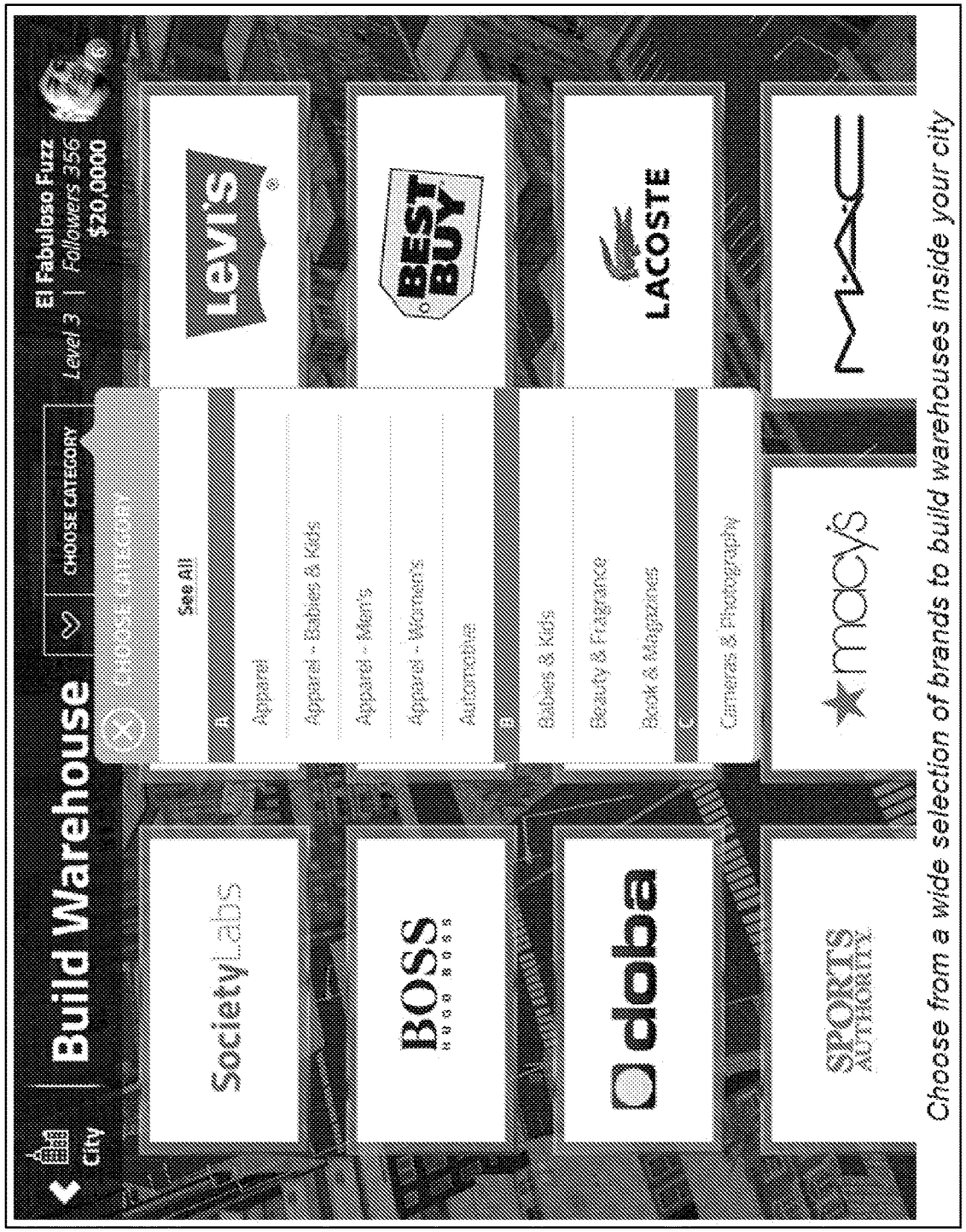
Figure 26:
Figure 27:
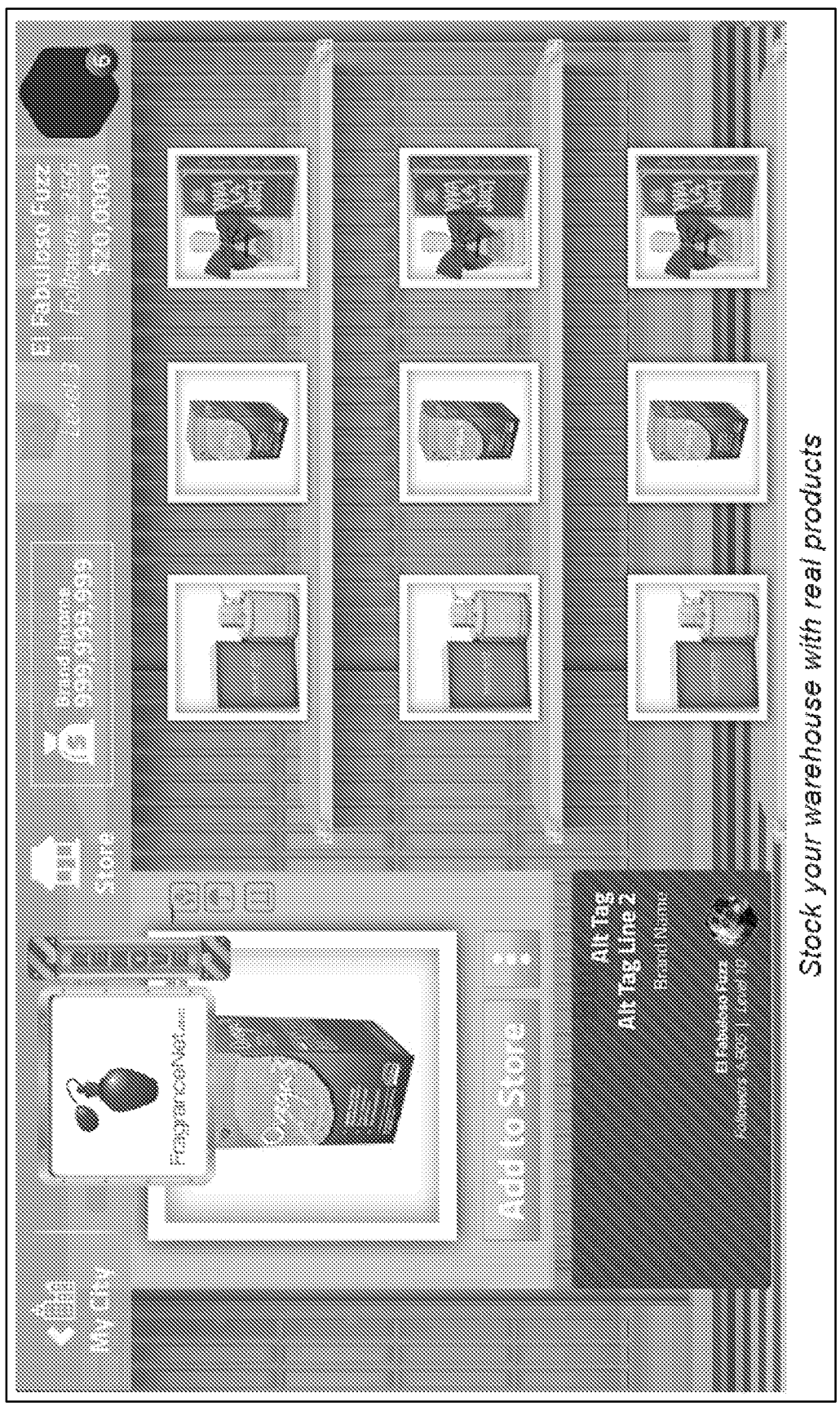
Figure 28:
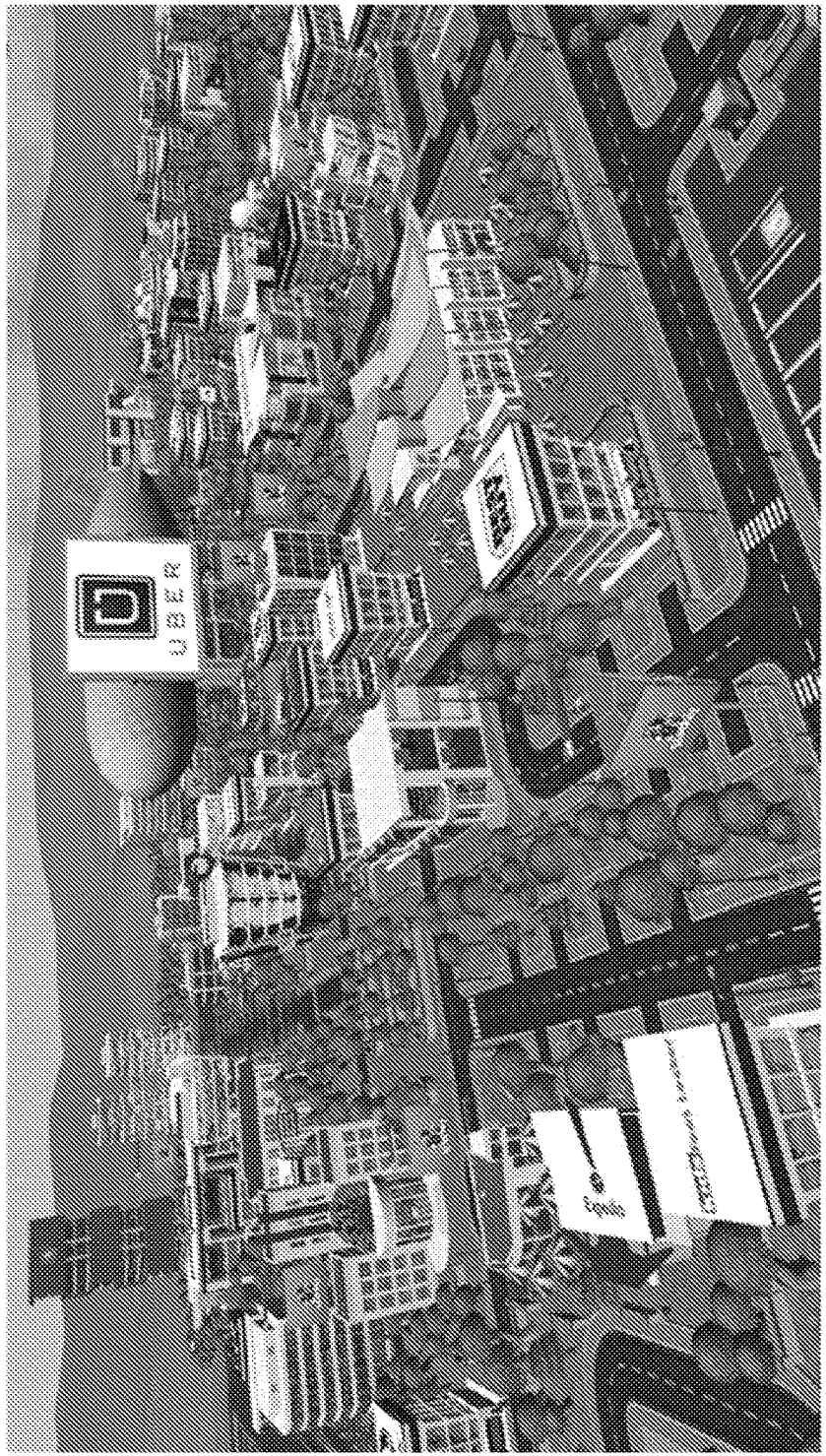
Figure 29:
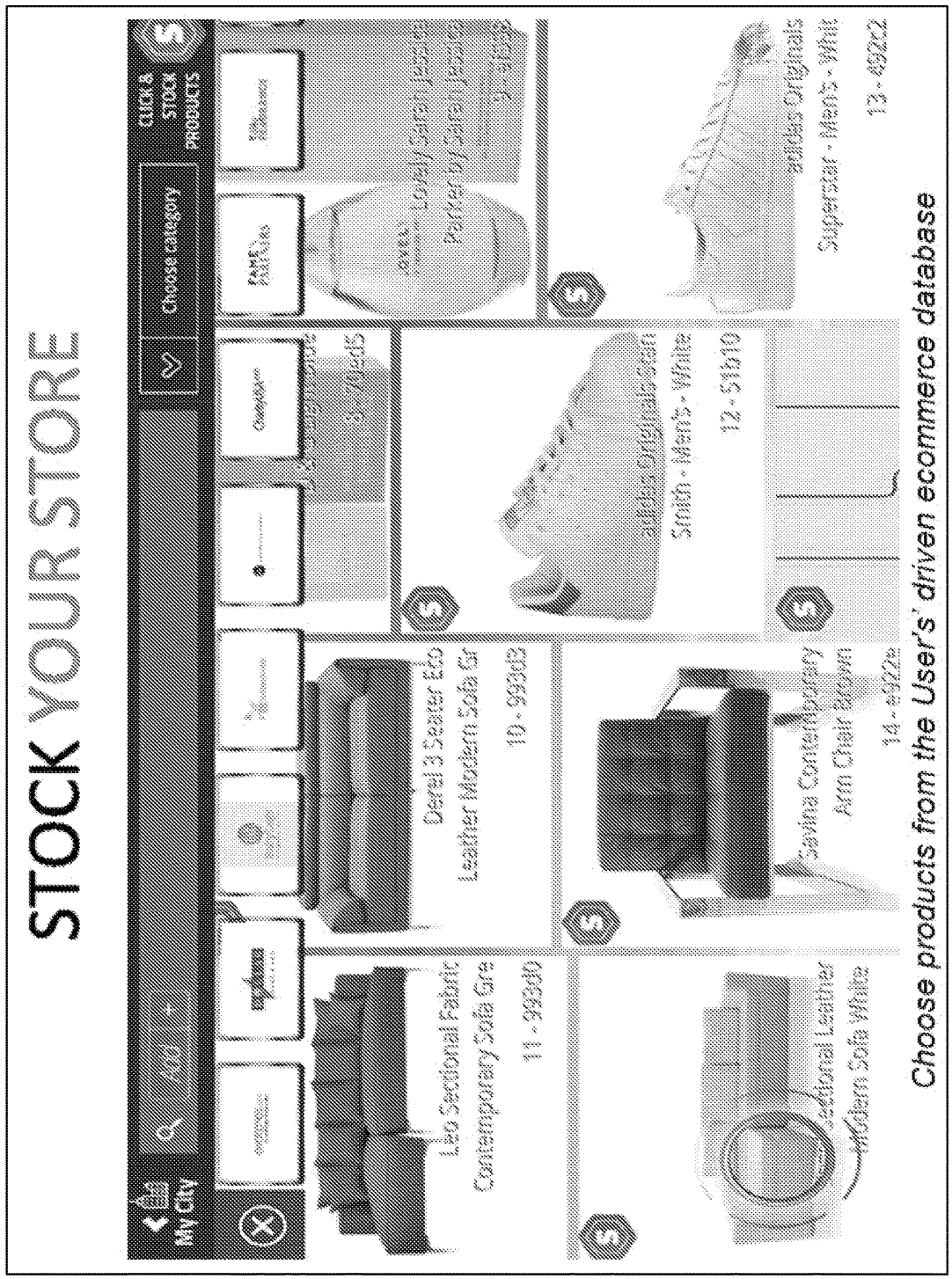
Figure 30:
Figure 31:
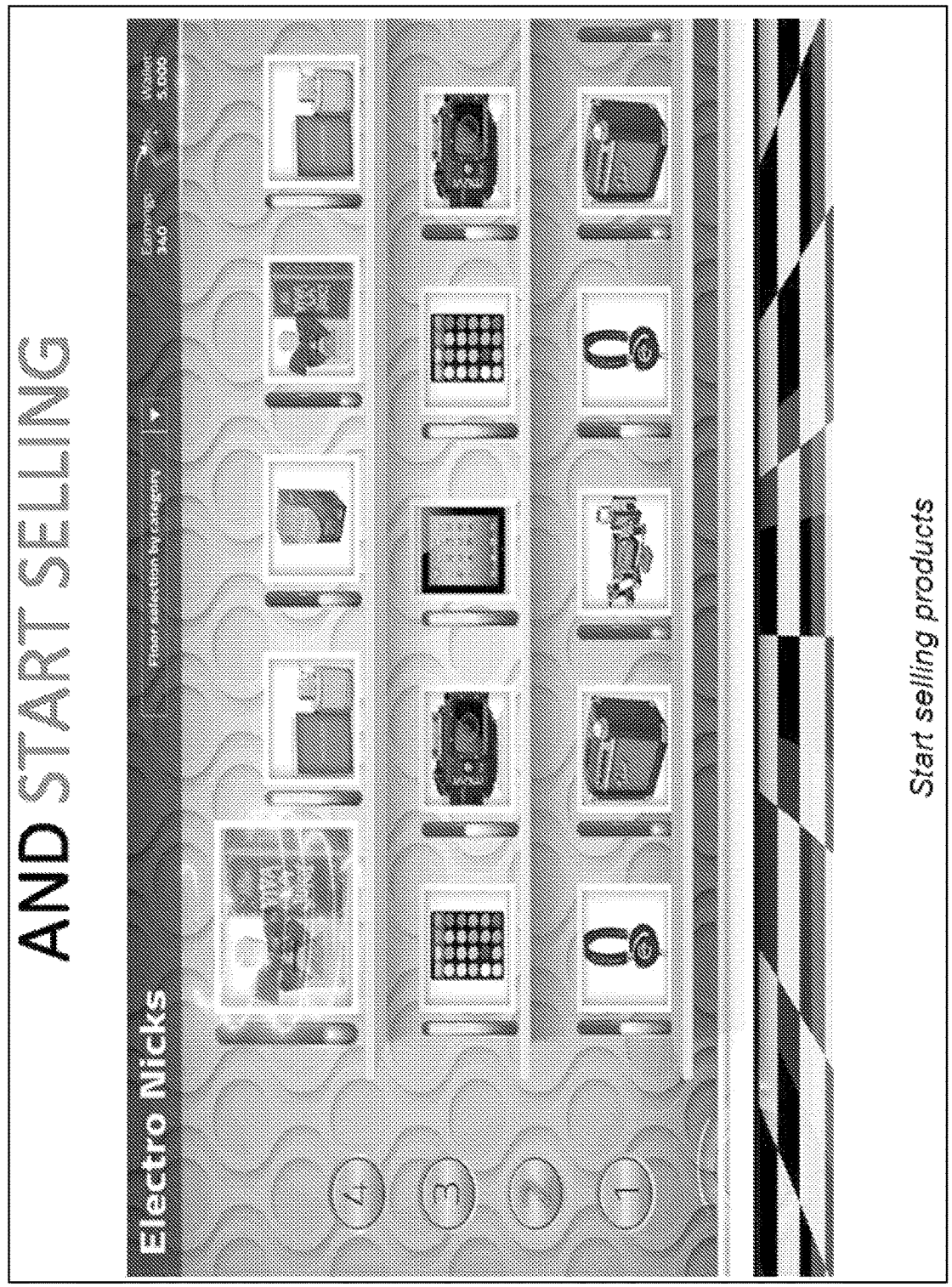
Figure 32:
Figure 33:
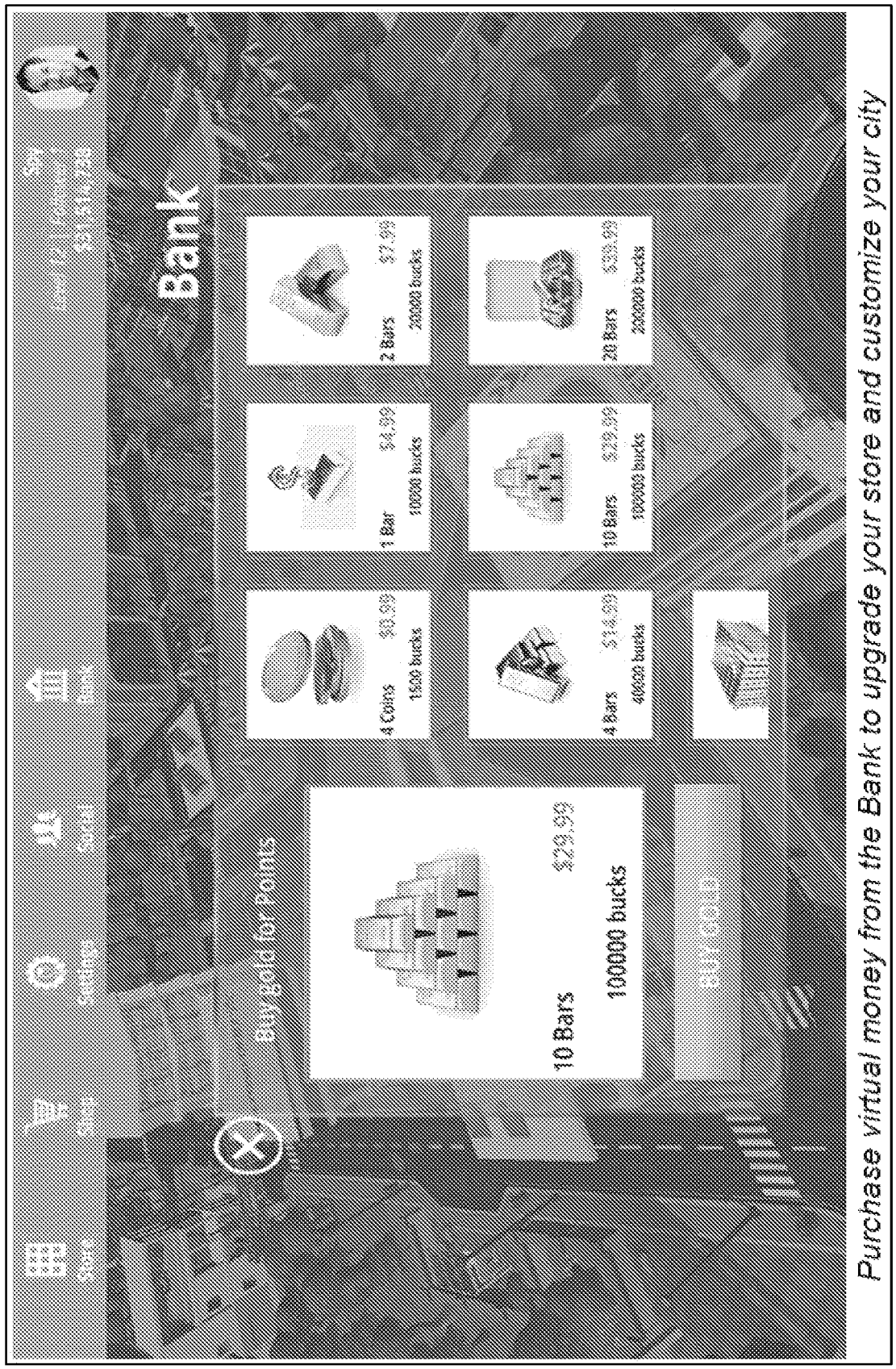
Figure 34:
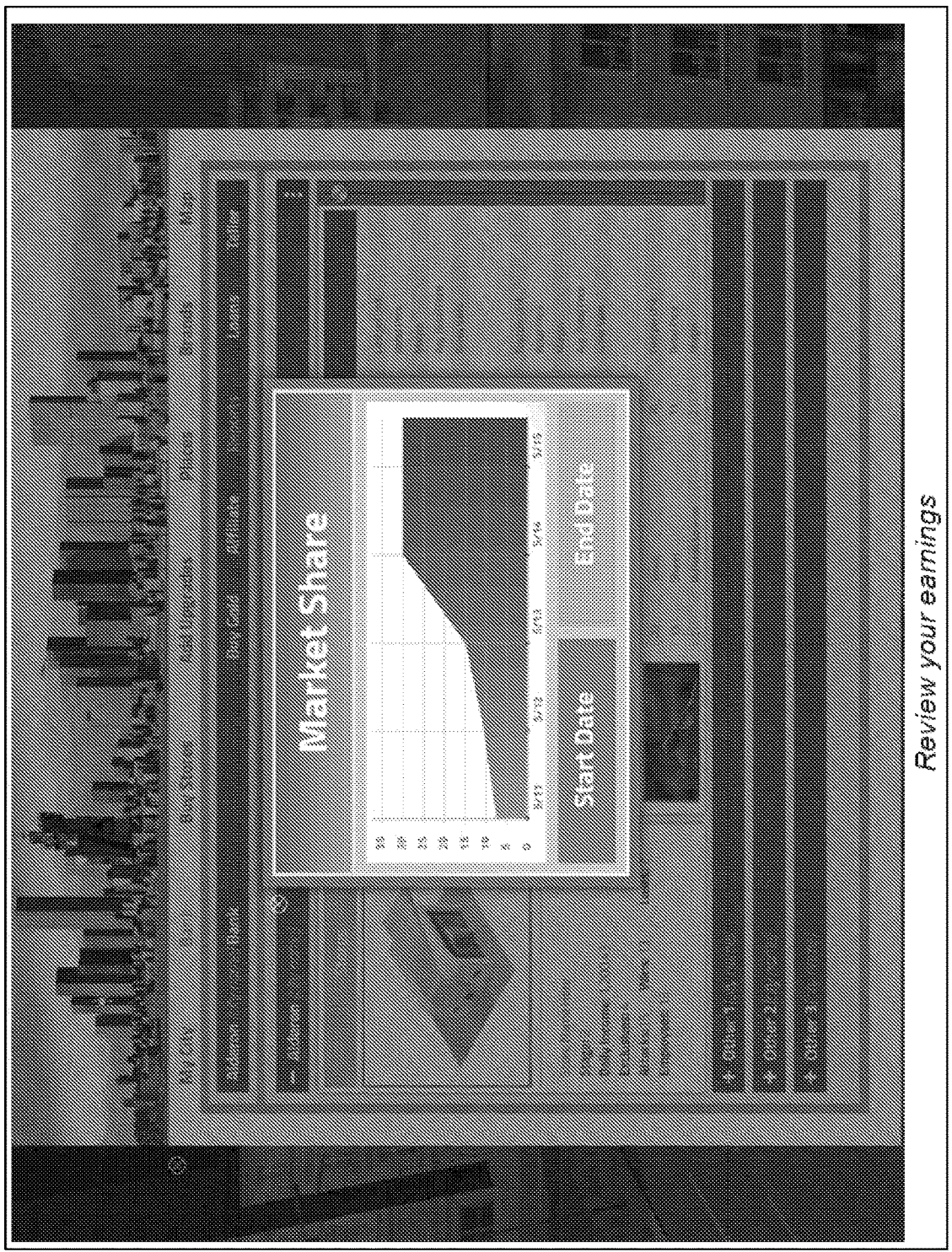
Figure 35:
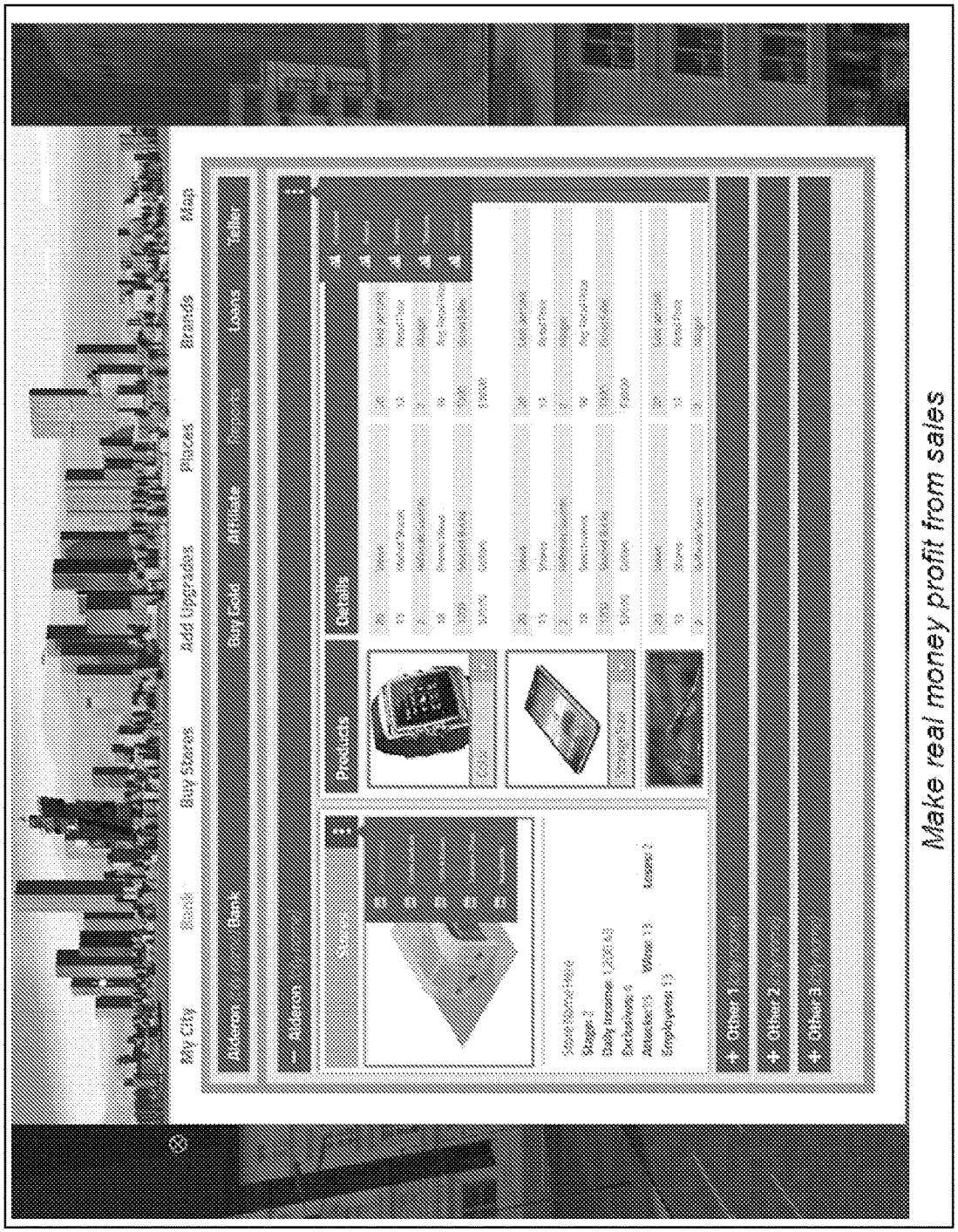
Figure 36:
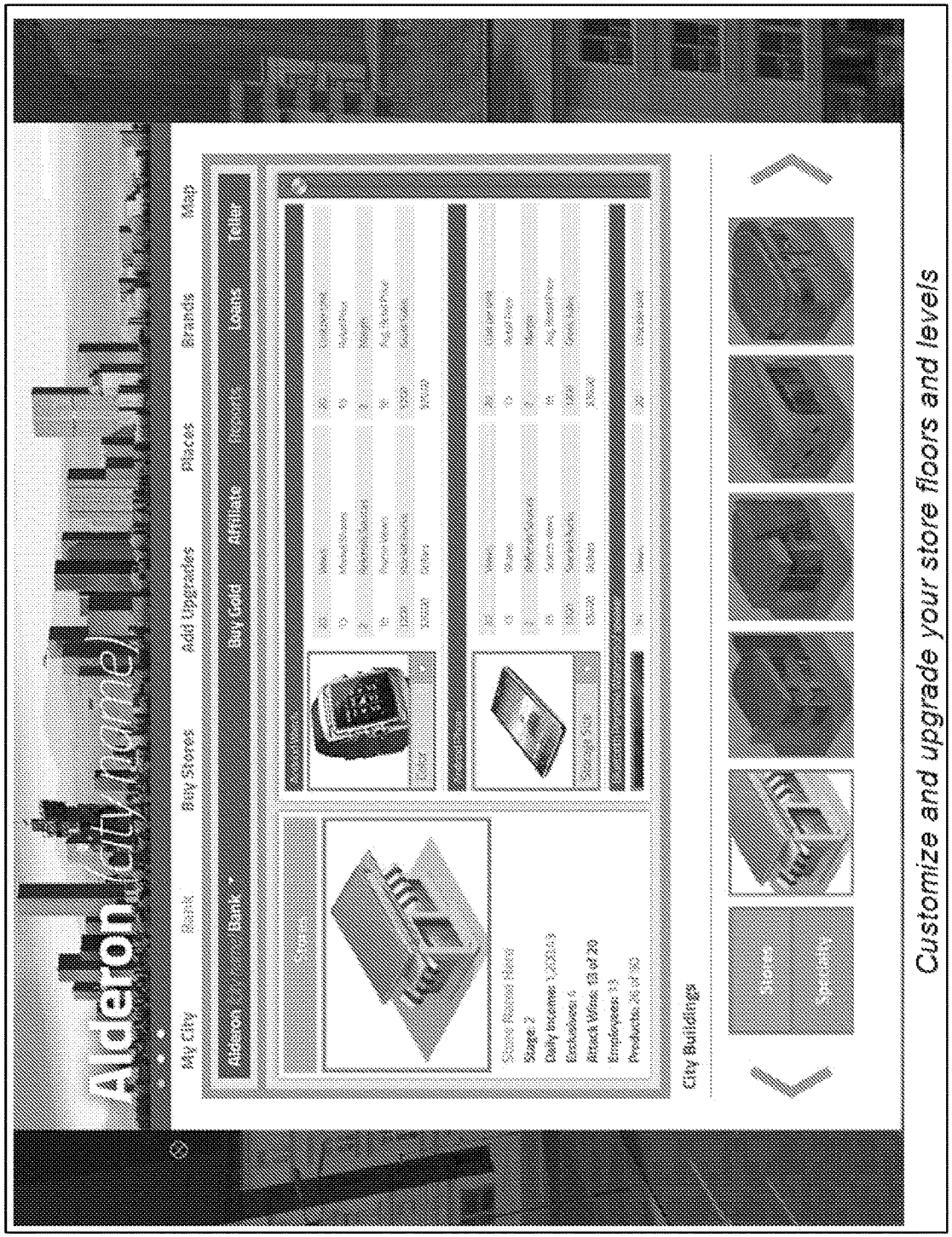
Figure 37:
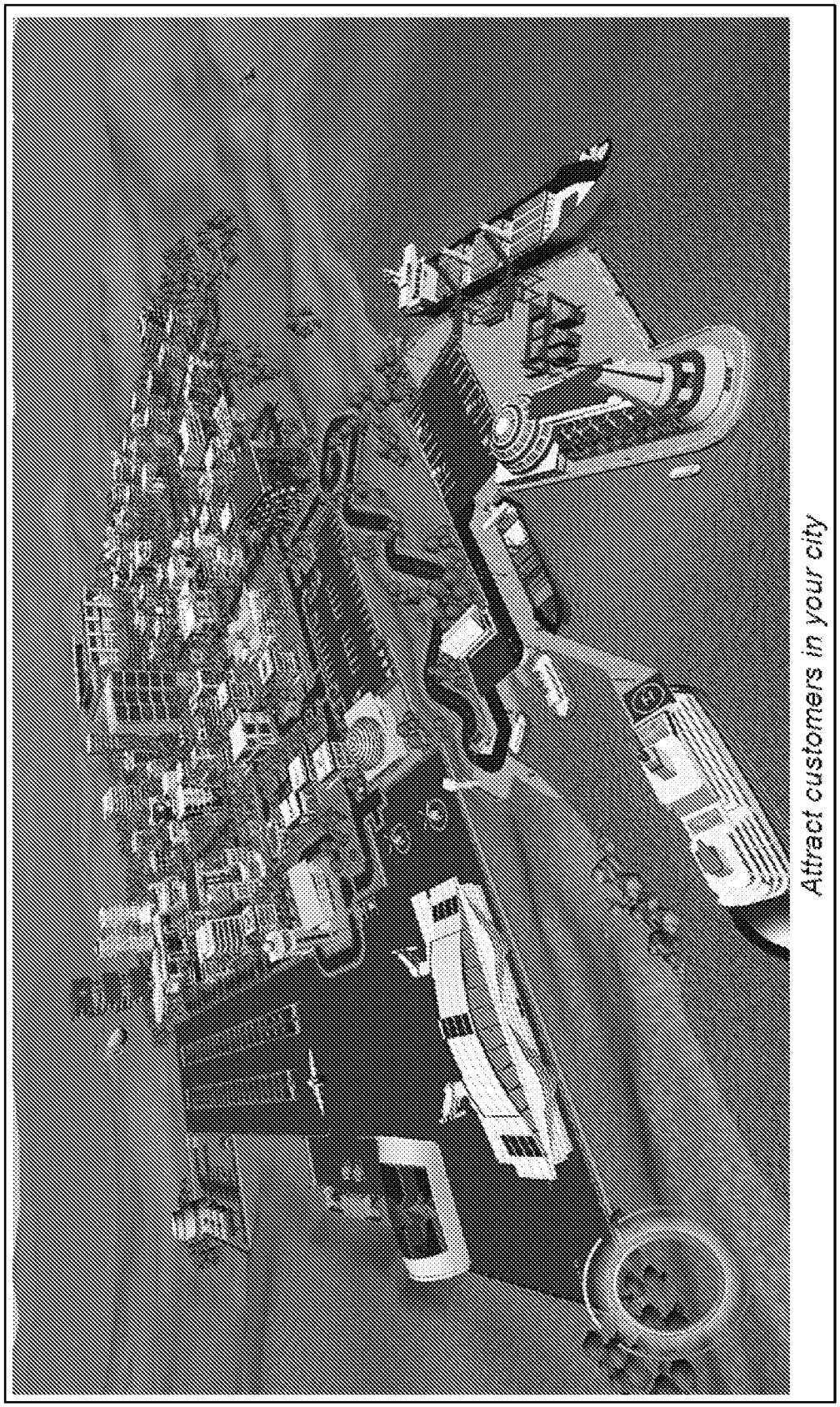
Figure 38:
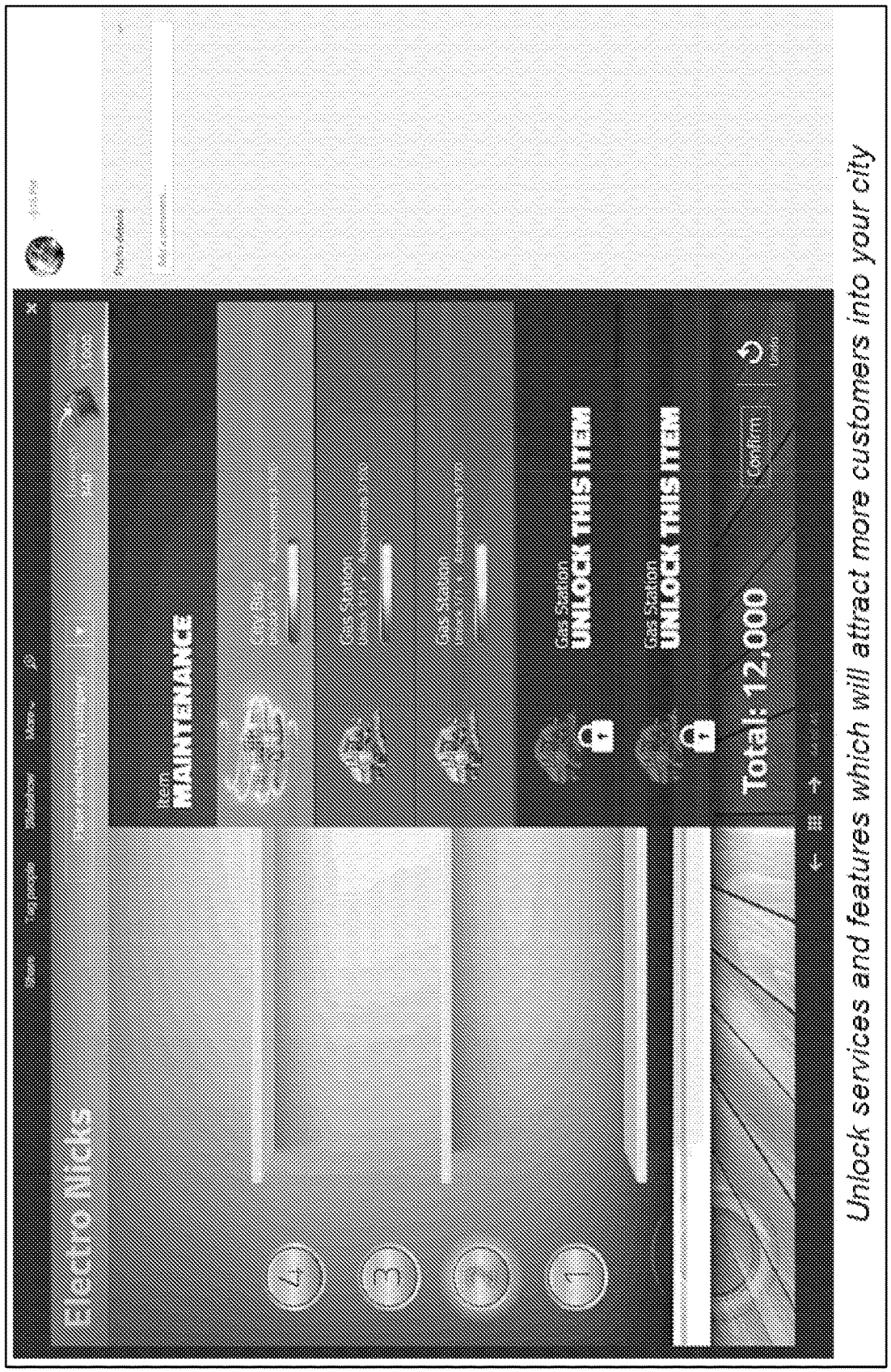
Figure 39:
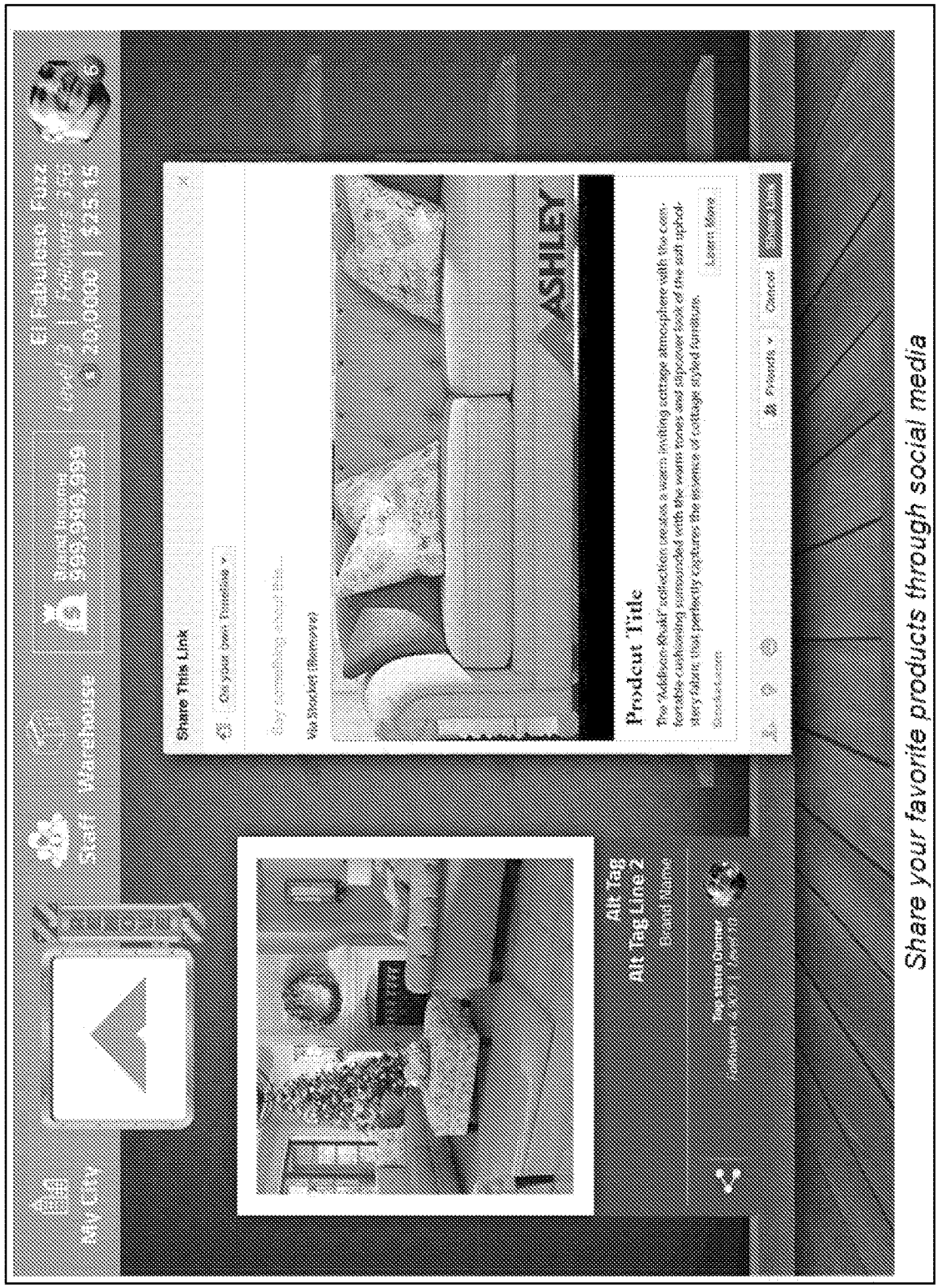
Figure 40:
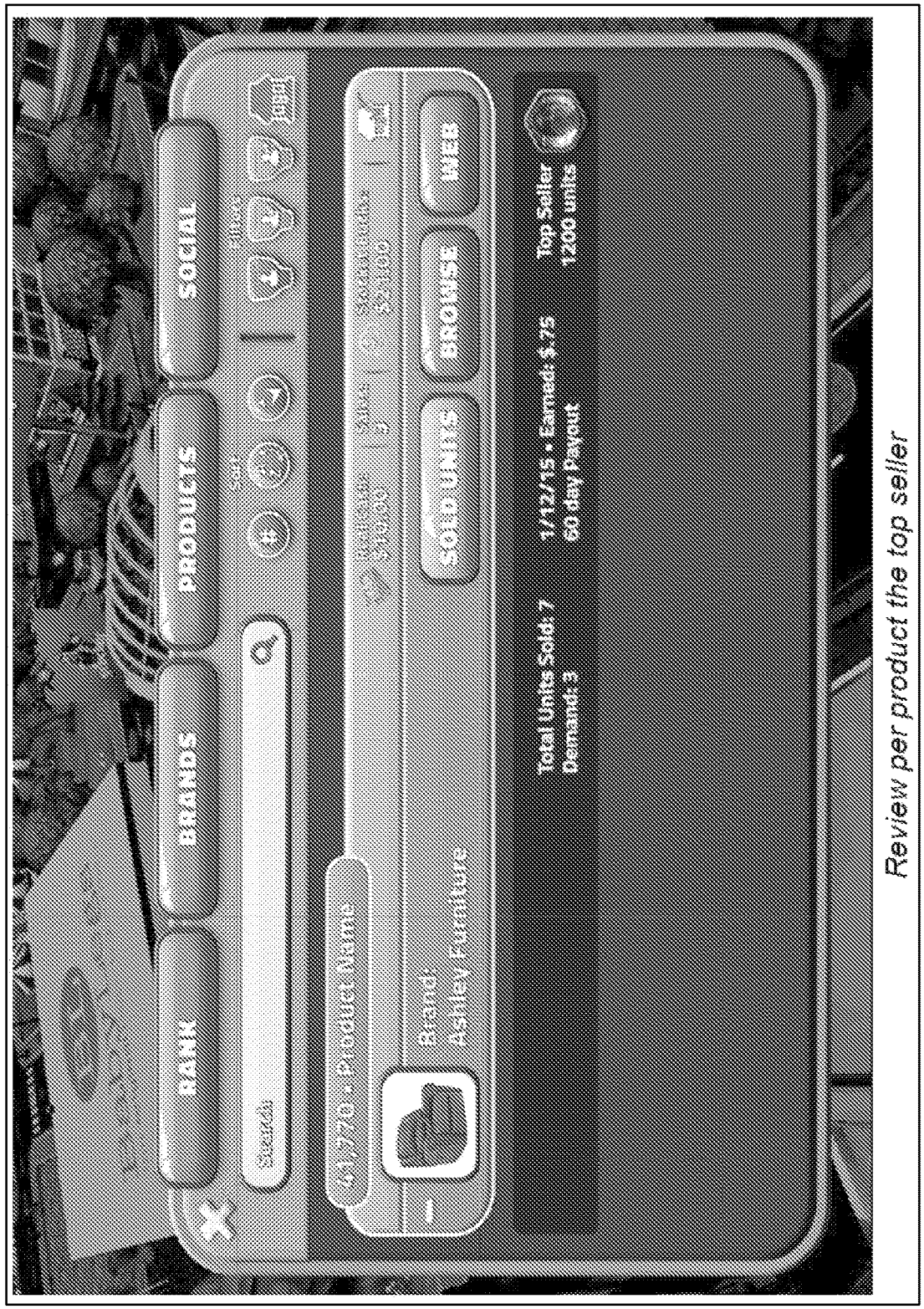
Figure 41:
Figure 42:
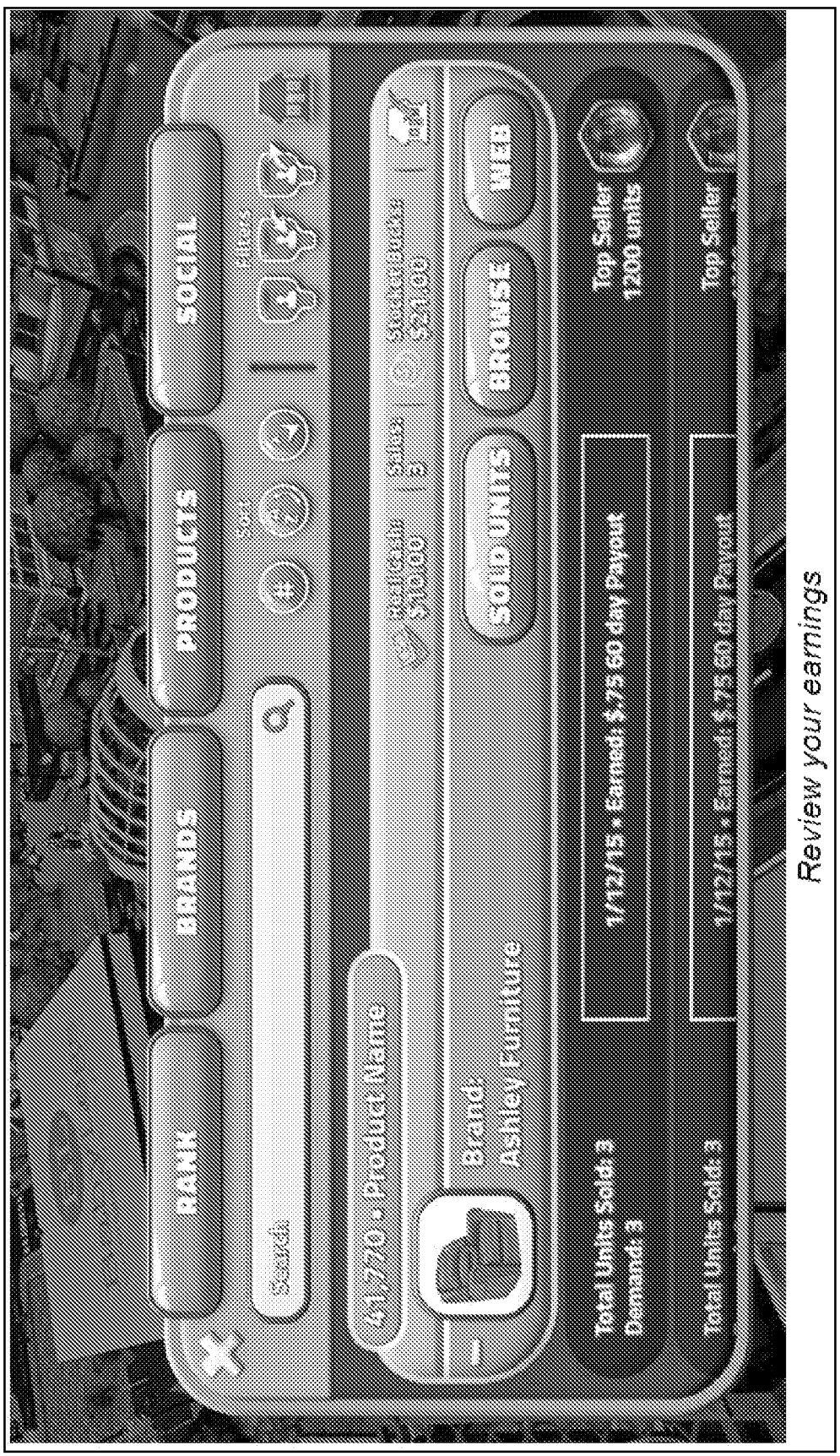
Figure 43:
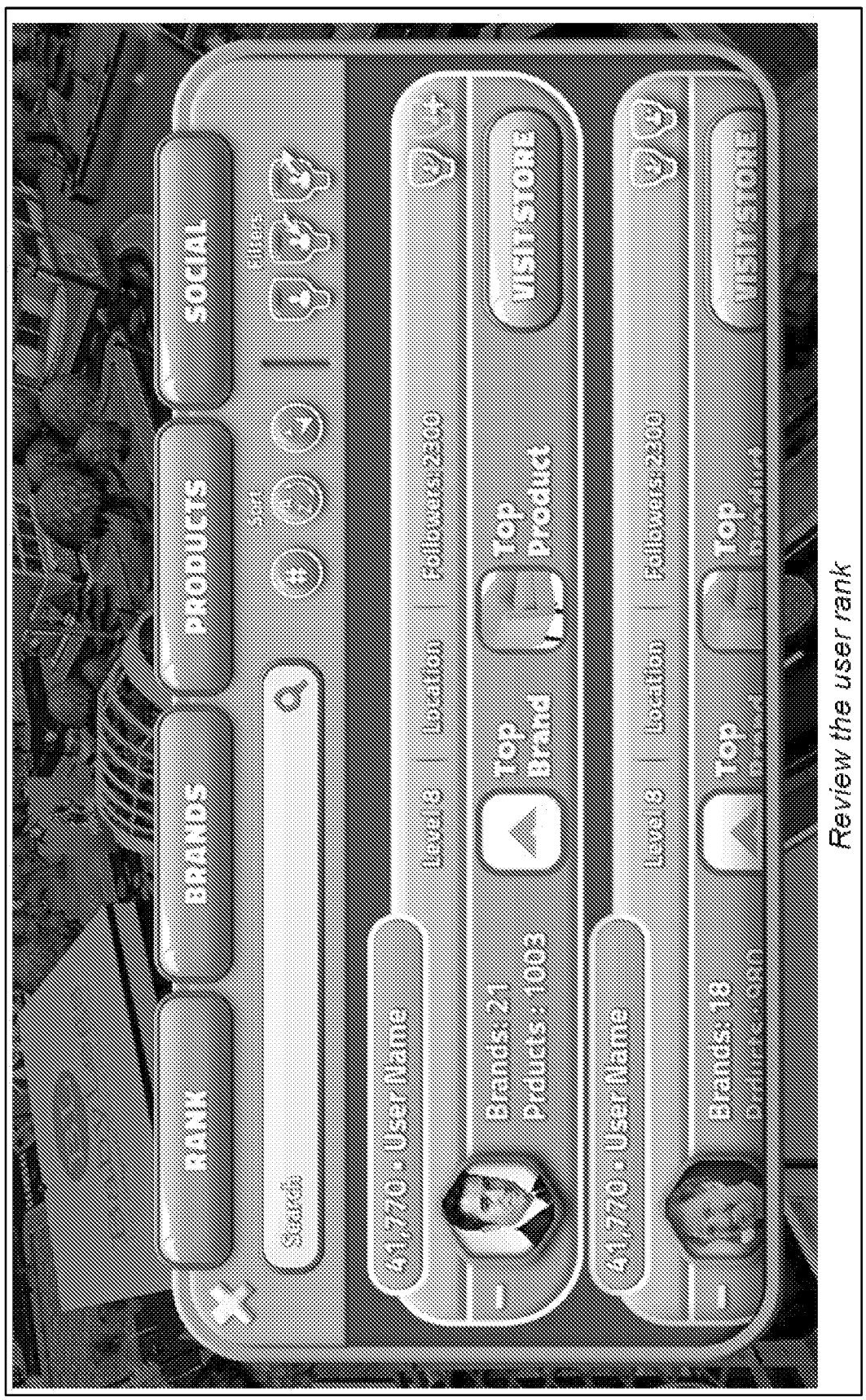
Figure 44:
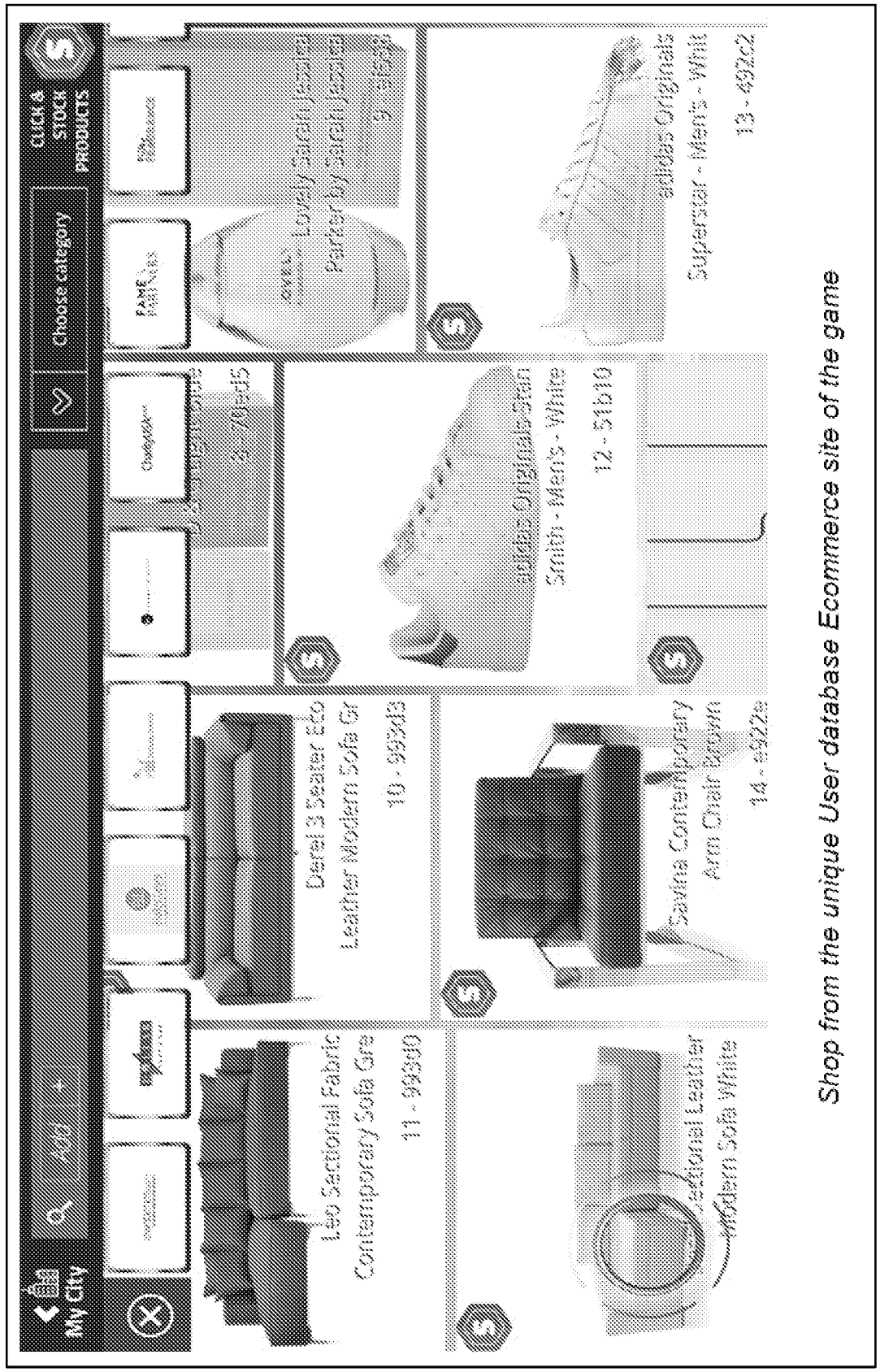

Case 3: If product exists in warehouse, but not in store
Display an icon in FIG. 19C, clickable
Add product to store if space allows, in next available space
If no space in store, display a popup:
  if no more floor possibility available: "No more space available in your store, please upgrade your store.", button "Upgrade"/"Cancel"
  if floor possibility available: "No more space available in your store, please add one floor to your store.", button "Upgrade"/"Cancel"

For example, in some embodiments, the illustrative inventive programmed virtual platform of the present invention can allow a user to delete product from store and/or a warehouse.

Case 4: If the store is full
Call for an update

Case 4bis: If all warehouses in city are taken and there is not a warehouse or store of this brand yet in city/store
Warning popup Case 5: If user store is full and there is still space in warehouse
Add product to warehouse Deleting Products Case 1: Delete products in Warehouse will automatically delete same products in Store:
Display a popup "Are you sure you want to delete the selected products? These products will also be deleted from your Store."
(Yes/Cancel)

Case 2: Delete products in Store will do nothing to same products in Warehouse
Display a popup "Are you sure you want to delete the selected products? Deleting these products will also delete its income. You can double-click on the products to collect income before deleting." (Yes/Cancel)

Case 3: Deleting warehouse will not delete the brand in Store automatically
For example: suppose user has warehouse BestBuy with product A, B
  Example 1: delete Brand
    User deletes warehouse BestBuy, then product A, B will be deleted in Warehouse and in Store
    Display a popup "Would you like to remove the brand in Store?", button "Yes"/"Cancel"
    If "Yes", delete brand BestBuy in Store
    If "Cancel"
  The brand BestBuy in Store still exists
  Example 2: delete all products of the Brand
  User deletes product A, B in warehouse BestBuy, then product A, B will be deleted in Store too
  Display a popup "You have deleted the last product of this brand, would you like to remove the brand?", button "Yes"/"Cancel"
    If "Yes", delete both warehouse and brand BestBuy in Store
    If "Cancel"
      Warehouse BestBuy still exists (i.e., empty warehouse)

The brand BestBuy in Store still exists (i.e., empty brand)

Inventory Management

For example, in some embodiments, each Internal Product will have a limited total inventory in the game initially:

Internal Product Current Supply Allocation (IPCS)=supply_exponential^(IPD-1)*supply_factor supply_exponential & supply_factor are parameters in Settings IPD=max 10 (|temp_level/level_demand_increment|)
temp_level+=search_demand_weight*DSD result+
store_demand_weight*DSTD result+
purchase_demand_weight*DPD result+
like_demand_weight*DLD result search_demand_weight, store_demand_weight, purchase_demand_weight, like_demand_weight are parameters in Settings level_demand_increment is parameter in Settings For example, in some embodiments, each user can add the product to a store, even with no Inventory/Inventory at 0.

When a user adds a product

Store Shelf Spaces per Floor (SSSF)
Number of Product per Floor=Store Level× STORE_SHELF_SPACE_PER_FLOOR_FACTOR Store Shelf Spaces Max (SSSM)
noOfShelfSpacesMaximum=SSSF*(Store Floor Maximum of each Store level)

Store Shelf Spaces Starting (SSSS)
Store Shelf noOfShelfSpacesDefault=SSSF*(Store Floor Starting of each Store level)

When a user stock a product

For example, in some embodiments, a user has a limited maximum size of inventory for a store product inventory (current_store_product_inventory)
current_store_product_inventory<=SPIMS Store Product Inventory Max Size (SPIMS)=SPIMS= (store_floor_inventory_factor*Store Level+ store_floor_inventory_factor_base)*nbFloors
store_floor_inventory_factor=25
store_floor_inventory_factor_base=125 Max inventory for a product in the store Store Total Inventory Max Size (STIMS)=SPIMS Max inventory for all product in the store When a user clicks stock, the user has to buy products (with defined quantity) at a cost per unit value Cost Per Unit (CPU)=|cost_factor (retail price)|×Product Demand (IPD)

The Inventory will be sell at a values revenue per unit (RPU) values following a time lapse (constant)→the inventory will get down automatically, little by little (depletion) by a rate (SPRS)

Revenu Per Unit (RPU)=CPU*revenue_factor revenue_factor=110%

Volume Per Unit (VPU): Each hour unstock nbProduct where nbProduct=IPD; which is a product selling speed For example, in some embodiments, a stock lock system allows the user to keep the stock possibility before it goes back to the global inventory. The stock lock will be release when the inventory for this store product runs out. For example, this specific stock lock can be managed through Supply Allocation; by, for example, setting the maximum and current amount of inventory allowed to be stock by the user for a Store Product. For example, this Supply Allocation is hold on the user side and do not return to the Global Inventory.

Illustrative Operating Environments

FIG. 1 illustrates one embodiment of an environment in which the present invention may operate. However, not all of these components may be required to practice the invention, and variations in the arrangement and type of the components may be made without departing from the spirit or scope of the invention. In some embodiments, the inventive system and method may include a large number of members and/or concurrent transactions. In other embodiments, the inventive system and method are based on a scalable computer and network architecture that incorporates varies strategies for assessing the data, caching, searching, and database connection pooling. An example of the scalable architecture is an architecture that is capable of operating multiple servers.

In embodiments, members of the computer system 102-104 include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, client devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In embodiments, programming may include either Java, .Net, QT, C, C++ or other suitable programming language.

In embodiments, member devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like or a Proprietary protocol.

In embodiments, network 105 may be configured to couple one computing device to another computing device to enable them to communicate. In some embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between client devices 102-104, and servers 106 and 107.

Figure 2:
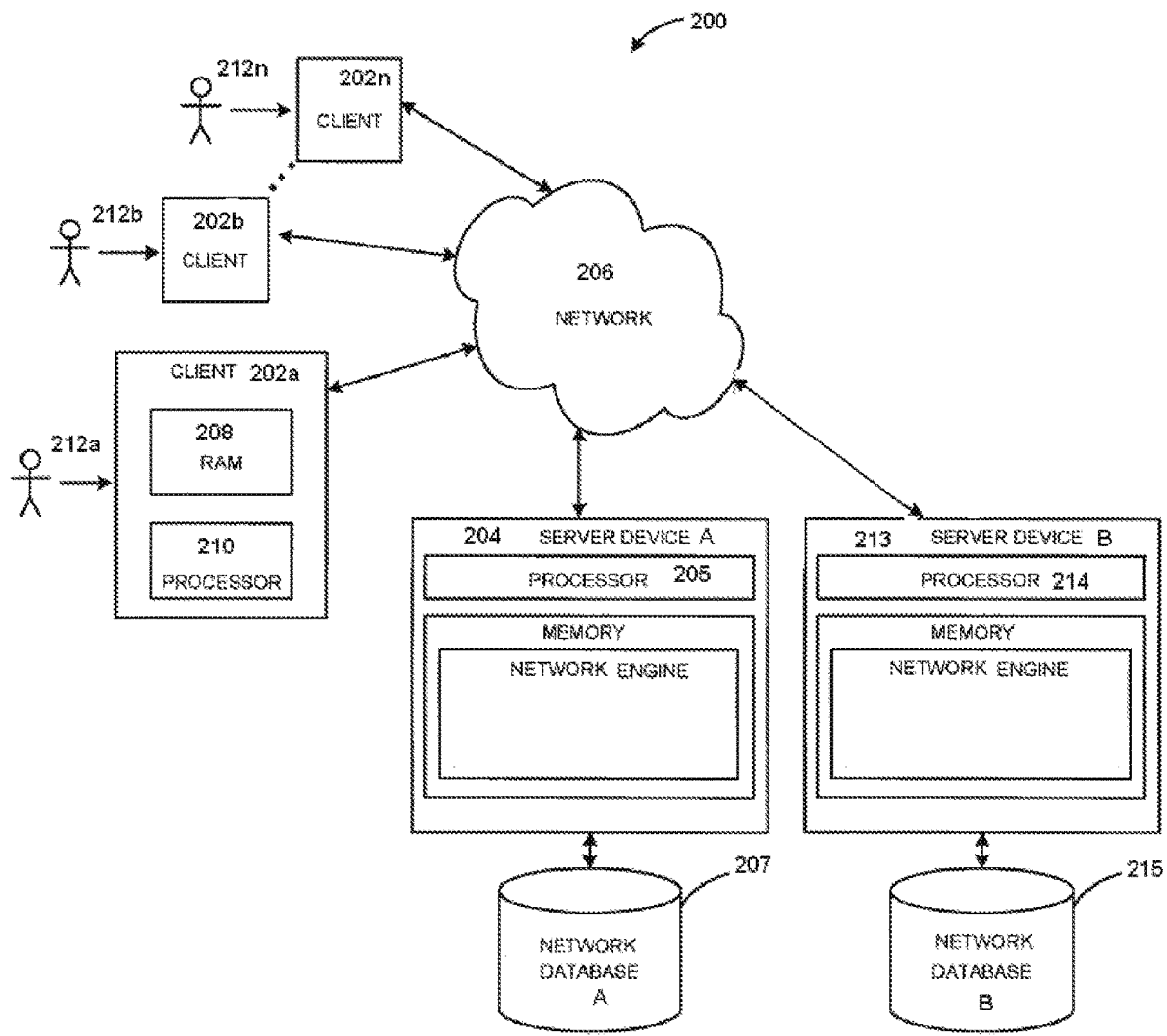
FIG. 2 illustrates a block diagram of an exemplary virtual gaming platform's architecture in accordance with some embodiments of the present invention.

FIG. 2 shows another exemplary embodiment of the computer and network architecture that supports the methods and systems of the instant invention. In some embodiments, the member devices 202a, 202b thru 202n shown each at least includes a computer-readable medium, such as a random access memory (RAM) 208 coupled to a processor 210 or FLASH memory. In some embodiments, the processor 210 may execute computer-executable program instructions stored in memory 208. In some embodiments, such processors comprise a microprocessor, an ASIC, and state machines. In some embodiments, uch processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, and JavaScript.

In some embodiments, member devices 202a-n may also comprise a number of external or internal devices such as a mouse, a CD-ROM, DVD, a keyboard, a display, or other input or output devices. Examples of client devices 202a-n may be personal computers, digital assistants, personal digital assistants, cellular phones, mobile phones, smart phones, pagers, digital tablets, laptop computers, Internet appliances, and other processor-based devices. In general, a client device 202a may be any type of processor-based platform that is connected to a network 206 and that interacts with one or more application programs. Client devices 202a-n may operate on any operating system capable of supporting a browser or browser-enabled application, such as Microsoft™, Windows™, or Linux. The client devices 202a-n shown may include, for example, personal computers executing a browser application program such as Microsoft Corporation's Internet Explorer™, Apple Computer, Inc.'s Safari™, Mozilla Firefox, and Opera. Through the client devices 202a-n, users, 212a-n communicate over the network 206 with each other and with other systems and devices coupled to the network 206. As shown in FIG. 2, server devices 204 and 213 may be also coupled to the network 206. In an embodiment of the present invention, one or more clients can be a mobile client.

In some embodiments, the term "mobile electronic device" may refer to any portable electronic device that may or may not be enabled with location tracking functionality. For example, a mobile electronic device can include, but is not limited to, a mobile phone, Personal Digital Assistant (PDA), Blackberry™, Pager, Smartphone, or any other reasonable mobile electronic device. For ease, at times the above variations are not listed or are only partially listed, this is in no way meant to be a limitation.

In some embodiments, the terms "proximity detection," "locating," "location data," "location information," and "location tracking" as used herein may refer to any form of location tracking technology or locating method that can be used to provide a location of a mobile electronic device, such as, but not limited to, at least one of location information manually input by a user, such as, but not limited to entering the city, town, municipality, zip code, area code, cross streets, or by any other reasonable entry to determine a geographical area; Global Positions Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed, this is in no way meant to be a limitation.

In some embodiments, near-field wireless communication (NFC) can represent a short-range wireless communications technology in which NFC-enabled devices are "swiped," "bumped," "tap" or otherwise moved in close proximity to communicate. In some embodiments, NFC could include a set of short-range wireless technologies, typically requiring a distance of 10 cm or less. In some embodiments, NFC may operate at 13.56 MHz on ISO/IEC 18000-3 air interface and at rates ranging from 106 kbit/s to 424 kbit/s. In some embodiments, NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, NFC peer-to-peer communication can be conducted when a plurality of NFC-enable devices within close proximity of each other.

Figure 3:
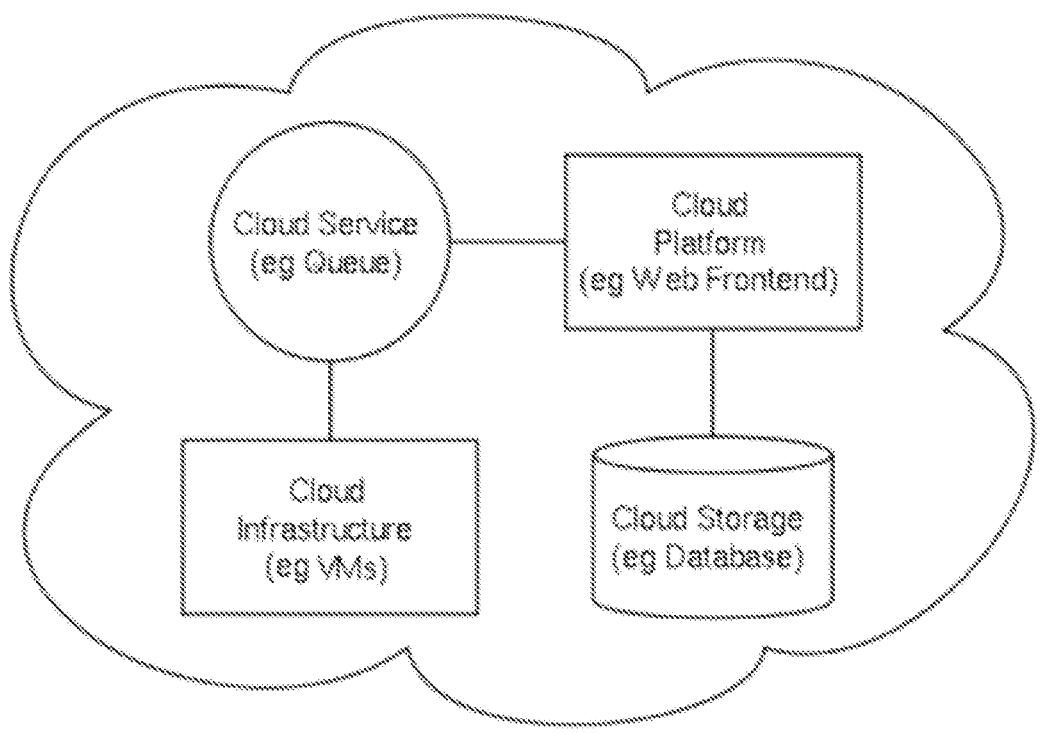
FIGS. 3-44 are screenshots which illustrate certain aspects of an exemplary virtual gaming platform in accordance with some embodiments of the present invention.
Figure 4:
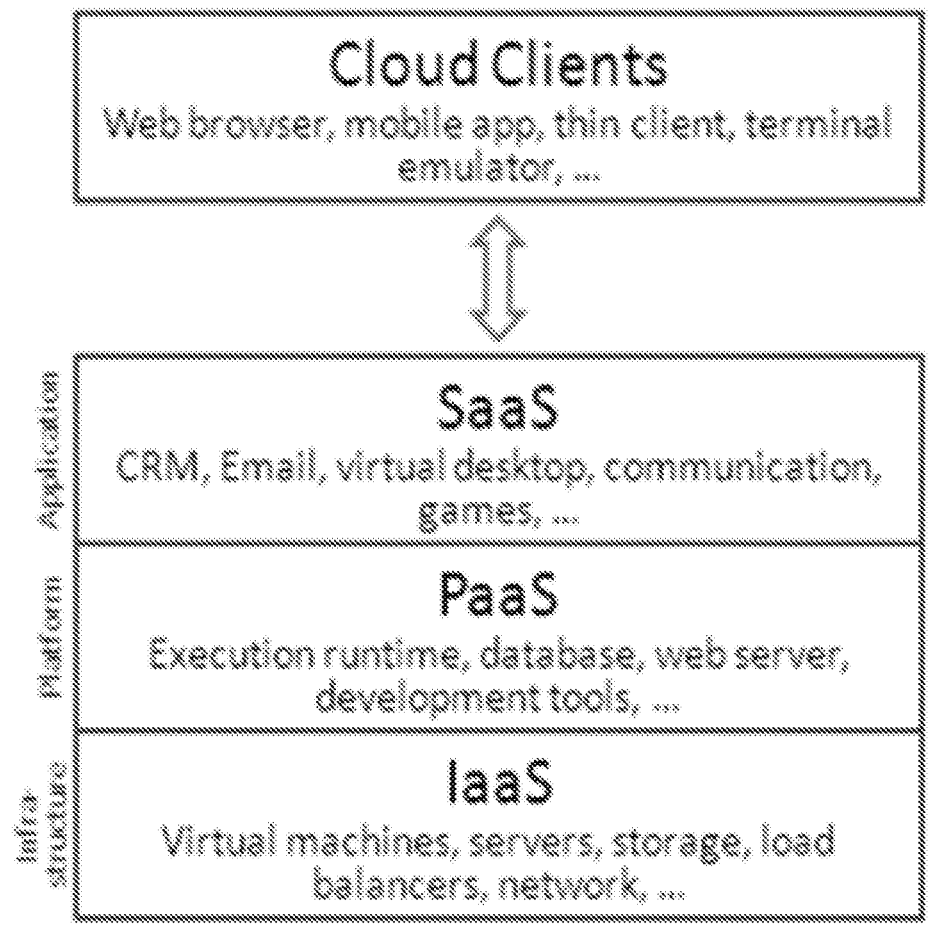

For purposes of the instant description, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). In some embodiments, the instant invention offers/manages the cloud computing/architecture as, but not limiting to: infrastructure a service (IaaS), platform as a service (PaaS), and software as a service (SaaS). FIGS. 3 and 4 illustrate schematics of exemplary implementations of the cloud computing/architecture.

FIGS. 20-44 are screenshots illustrating certain aspects of the illustrative inventive programmed virtual platform of the present invention.

Of note, he embodiments described herein may, of course, be implemented using any appropriate computer system hardware and/or computer system software. In this regard, those of ordinary skill in the art are well versed in the type of computer hardware that may be used (e.g., a mainframe, a mini-computer, a personal computer ("PC"), a network (e.g., an intranet and/or the internet)), the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, the present invention is directed to a specifically programmed virtual gaming computer system, including: at least one specialized computer machine, including: a non-transient memory, electronically storing particular computer executable program code; and at least one computer processor which, when executing the particular program code, becomes a specifically programmed computer processor of the specifically programmed virtual gaming computer system that is configured to concurrently perform, for each of at least a thousand of users, at least the following operations: electronically causing, via a first computer network, to display at least one specialized dynamic real-time updatable graphical user interface, including: a plurality of specialized tools programmed to allow each user to operate a virtual business offering real-life products, services, or both in a virtual reality realm; where the plurality of programmed specialized tools comprises: at least one tool programmed to allow a particular user to add to a visual representation of a particular virtual business at least one real-life product, service, or both, which are being displayed via an electronic on-line presence of a third party; where the specifically programmed virtual gaming computer system is configured to at least: i) create at least one software object to represent the at least one real-life product or the at least one service and 2) maintain an electronic interface with a computer inventory management program of the third party to track availability and fulfillment of the at least one real-life product and the at least one real-life service; electronically and continuously calculating a product placement priority score value for each of at least a thousand products, services, or both; where the calculating the product placement priority score value is based, at least in part, on: i) a product value of a particular product or a particular service, ii) a product advertisement value of the particular product or the particular service, iii) a user status value of the particular user who offers the particular product or the particular service, and iv) a business value of the particular virtual business that the particular user uses to offer the particular product or the particular service; and electronically and visually promoting each product and each service within the virtual reality realm, based on a corresponding product placement score value.

In some embodiments, the electronic on-line presence is a website.

In some embodiments, the electronic on-line presence is an application programmed for portable electronic devices.

In some embodiments, the product value is based, at least in part, on: a quality rating of the particular product or the particular service and profitability value of the particular product or the particular service.

In some embodiments, the product advertisement value is based, at least in part, on: a number of unique shares and a pre-determined advertising factor.

In some embodiments, the user status value is based, at least in part, on: points accumulated by the particular user within the virtual reality realm.

In some embodiments, the electronically and visually promoting each product and each service based on the corresponding product placement score value, including: adjusting a visual presentation of each product and each service based on the corresponding product placement score value.

In some embodiments, the present invention is directed to a computer-implemented method, including: electronically causing, by a specifically programmed virtual gaming processor, via a first computer network to display at least one specialized dynamic real-time updatable graphical user interface, including: a plurality of specialized tools programmed to allow each user to operate a virtual business offering real-life products, services, or both in a virtual reality realm; where the plurality of programmed specialized tools comprises: at least one tool programmed to allow a particular user to add to a visual representation of a particular virtual business at least one real-life product, service, or both, which are being displayed via an electronic on-line presence of a third party; creating, by the specifically programmed virtual gaming processor, at least one software object to represent the at least one real-life product or the at least one service; maintaining, by the specifically programmed virtual gaming processor, an electronic interface with a computer inventory management program of the third party to track availability and fulfillment of the at least one real-life product and the at least one real-life service; electronically and continuously calculating, by the specifically programmed virtual gaming processor, a product placement priority score value for each of at least a thousand products, services, or both; where the calculating the product placement priority score value is based, at least in part, on: i) a product value of a particular product or a particular service, ii) a product advertisement value of the particular product or the particular service, iii) a user status value of the particular user who offers the particular product or the particular service, and iv) a business value of the particular virtual business that the particular user uses to offer the particular product or the particular service; and electronically and visually promoting, by the specifically programmed virtual gaming processor, each product and each service within the virtual reality realm, based on a corresponding product placement score value.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A system comprising:
a non-transient memory, electronically storing particular computer executable program code; and
at least one computer processor, when executing the particular computer executable program code, is at least configured to:
cause to display each respective instance of at least one specialized dynamic real-time updatable graphical user interface to a plurality of users;
manage a virtual business, offering at least one real-life third-party product of a third party, at least one real-life third-party service of the third party, or both, in a virtual reality realm;
wherein the virtual business is separate from the third party;
wherein the at least one specialized dynamic real-time updatable graphical user interface comprises each respective visual representation of each respective real-life third-party product, each respective real-life third-party service, or both;
receive near-field communications from a plurality of physical computing devices associated with the plurality of users to select a plurality of programmed visual objects linked to at least one third-party computer inventory of the third party to enable to place, by activating each respective programmed visual object, a plurality of real-life orders for each respective real-life third-party product, each respective real-life third-party service, or both, while remaining within the virtual reality realm;
wherein the plurality of physical computing devices comprises a mobile electronic device;
wherein the mobile electronic device comprises a transmitter that is configured to transmit a GPS coordinate as a near-field communication,
wherein the GPS coordinate comprises information regarding a direction that the mobile electronic device is facing;
cause to display on a display of the mobile electronic device a first group of real-life third-party products when the direction that the GPS coordinate indicates is a first direction; and
cause to display on the display of the mobile electronic device a second group of real-life third-party products when the direction that the GPS coordinate indicates is a second direction.

2. The system of claim 1, wherein the at least one computer processor, when executing the particular computer executable program code, is at least configured to manage the virtual business offering both the at least one real-life third-party product of the third party and the at least one real-life third-party service of the third party, in a virtual reality realm.

3. The system of claim 1, wherein the first direction is a different direction than the second direction.

4. The system of claim 1, wherein the mobile electronic device comprises at least one of a mobile phone, a tablet, or a watch.

5. The system of claim 1, wherein the at least one real-life third-party product is purchasable on the mobile electronic device.

6. The system of claim 1, wherein the at least one real-life third-party service is purchasable on the mobile electronic device.

7. The system of claim 1, wherein the at least one computer processor, when executing the particular computer executable program code, is at least configured to cause to display on the display of the mobile electronic device at least one real-life third-party service when the direction that the GPS coordinate indicates is a third direction.

8. A system comprising:
a non-transient memory, electronically storing particular program code; and
at least one computer processor, when executing the particular program code, is at least configured to:
cause to display each respective instance of at least one specialized dynamic real-time updatable graphical user interface to a plurality of users;
manage a virtual business, offering at least one real-life third-party product of a third party, at least one real-life third-party service of the third party, or both, in a virtual reality realm;
wherein the virtual business is separate from the third party;
wherein the at least one specialized dynamic real-time updatable graphical user interface comprises each respective visual representation of each respective real-life third-party product, each respective real-life third-party service, or both;
receive near-field communications from a plurality of portable physical computing devices associated with the plurality of users to select a plurality of programmed visual objects linked to at least one third-party computer inventory of the third party to enable to place, by activating each respective programmed visual object, a plurality of real-life orders for each respective real-life third-party product, each respective real-life third-party service, or both, while remaining within the virtual reality realm;
wherein the plurality of portable physical computing devices comprises a mobile electronic device;
wherein the mobile electronic device comprises a transmitter that is configured to transmit a GPS coordinate as a near-field communication,
wherein the GPS coordinate comprises information regarding a direction that the mobile electronic device is facing;
cause to display on a display of the mobile electronic device a first group of real-life third-party products when the direction that the GPS coordinate indicates is a first direction;
cause to display on the display of the mobile electronic device a second group of real-life third-party products when the direction that the GPS coordinate indicates is a second direction; and
cause to display on the display of the mobile electronic device at least one real-life third-party service when the direction that the GPS coordinate indicates is a third direction.

9. The system of claim 8, wherein the at least one computer processor, when executing the particular program code, is at least configured to manage the virtual business offering both the at least one real-life third-party product of the third party and the at least one real-life third-party service of the third party, in a virtual reality realm.

10. The system of claim 8, wherein the first direction is a different direction than the second direction.

11. The system of claim 8, wherein the mobile electronic device comprises at least one of a mobile phone, a tablet, or a watch.

12. The system of claim 8, wherein the at least one real-life third-party product is purchasable on the mobile electronic device.

13. The system of claim 8, wherein the at least one real-life third-party service is purchasable on the mobile electronic device.

14. A system comprising:
a non-transient memory, electronically storing particular program code; and
at least one computer processor, when executing the particular program code, is at least configured to:
cause to display each respective instance of at least one specialized dynamic real-time updatable graphical user interface to a plurality of users;
manage a virtual business, offering at least one real-life third-party product of a third party, at least one real-life third-party service of the third party, or both, in a virtual reality realm;
wherein the virtual business is separate from the third party;
wherein the at least one specialized dynamic real-time updatable graphical user interface comprises each respective visual representation of each respective real-life third-party product, each respective real-life third-party service, or both;
receive near-field communications from a plurality of physical computing devices associated with the plurality of users to select a plurality of programmed visual objects linked to at least one third-party computer inventory of the third party to enable to place, by activating each respective programmed visual object, a plurality of real-life orders for each respective real-life third-party product, each respective real-life third-party service, or both, while remaining within the virtual reality realm;
wherein the plurality of physical computing devices comprises a mobile electronic device;
wherein the mobile electronic device comprises a transmitter that is configured to transmit a GPS coordinate as a near-field communication,
wherein the GPS coordinate comprises information regarding a direction that the mobile electronic device is facing;
cause to display on a display of the mobile electronic device a graphical representation of a first group of real-life third-party products when the direction that the GPS coordinate indicates is a first direction; and
cause to display on the display of the mobile electronic device a graphical representation of a second group of real-life third-party products when the direction that the GPS coordinate indicates is a second direction.

15. The system of claim 14, wherein the at least one computer processor, when executing the particular program code, is at least configured to manage the virtual business offering both the at least one real-life third-party product of the third party and the at least one real-life third-party service of the third party, in a virtual reality realm.

16. The system of claim 14, wherein the first direction is a different direction than the second direction.

17. The system of claim 14, wherein the mobile electronic device comprises at least one of a mobile phone, a tablet, or a watch.

18. The system of claim 14, wherein the at least one real-life third-party product is purchasable on the mobile electronic device.

19. The system of claim 14, wherein the at least one real-life third-party service is purchasable on the mobile electronic device.

20. The system of claim 14, wherein the at least one computer processor, when executing the particular program code, is at least configured to cause to display on the display of the mobile electronic device at least one real-life third-party service when the direction that the GPS coordinate indicates is a third direction.

* * * * *